United States Patent
Takahashi

(10) Patent No.: US 10,613,690 B2
(45) Date of Patent: Apr. 7, 2020

(54) TOUCH PANEL

(71) Applicant: Semiconductor Energy Laboratory Co., Ltd., Atsugi-shi, Kanagawa-ken (JP)

(72) Inventor: Kei Takahashi, Isehara (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 36 days.

(21) Appl. No.: 15/575,487

(22) PCT Filed: May 18, 2016

(86) PCT No.: PCT/IB2016/052882
§ 371 (c)(1),
(2) Date: Nov. 20, 2017

(87) PCT Pub. No.: WO2016/189426
PCT Pub. Date: Dec. 1, 2016

(65) Prior Publication Data
US 2018/0088705 A1   Mar. 29, 2018

(30) Foreign Application Priority Data

May 28, 2015 (JP) .................. 2015-108110
May 28, 2015 (JP) .................. 2015-108111

(51) Int. Cl.
G06F 3/044 (2006.01)
G02F 1/1333 (2006.01)
G06F 3/041 (2006.01)

(52) U.S. Cl.
CPC .......... *G06F 3/044* (2013.01); *G02F 1/13338* (2013.01); *G06F 3/0412* (2013.01);
(Continued)

(58) Field of Classification Search
CPC ....... G06F 3/044; G06F 3/0412; G06F 3/0418
See application file for complete search history.

(56) References Cited

U.S. PATENT DOCUMENTS 8,884,921 B2   11/2014   Kim et al.
9,250,740 B2   2/2016   Akai et al.
(Continued)

FOREIGN PATENT DOCUMENTS

CN   103365509 A   10/2013
CN   103713788 A   4/2014
(Continued)

OTHER PUBLICATIONS

International Search Report (Application No. PCT/IB2016/052882) dated Sep. 20, 2016.
(Continued)

*Primary Examiner* — Nelson M Rosario
(74) *Attorney, Agent, or Firm* — Robinson Intellectual Property Law Office; Eric J. Robinson

(57) ABSTRACT

A touch panel or the like having a novel structure in which an influence of noise of an electrode included in an organic EL element on an electrode for touch sensing can be suppressed is provided.

A voltage of the electrode for touch sensing and a voltage for reference are input to input terminals of an operational amplifier, and in an integrator circuit in which a change in capacitance due to touch sensing is sensed, the input terminal to which the voltage for reference is supplied is connected to a common electrode included in the organic EL element. Such a structure does not amplify but can cancel noise of the electrode for touch sensing, on which noise of the common electrode is superimposed.

12 Claims, 39 Drawing Sheets

(52) U.S. Cl.
CPC .. *G06F 3/0418* (2013.01); *G06F 2203/04102* (2013.01); *G06F 2203/04103* (2013.01); *G06F 2203/04111* (2013.01); *G06F 2203/04112* (2013.01)

(56) References Cited

U.S. PATENT DOCUMENTS

| | | |
|---|---|---|
| 2013/0257798 A1 | 10/2013 | Tamura et al. |
| 2013/0265244 A1 | 10/2013 | Kim et al. |
| 2014/0043546 A1 | 2/2014 | Yamazaki et al. |
| 2014/0092061 A1 | 4/2014 | Akai et al. |
| 2014/0240617 A1 | 8/2014 | Fukutome et al. |
| 2014/0285732 A1 | 9/2014 | Tanabe et al. |
| 2014/0292687 A1* | 10/2014 | Yamada ................ G06F 3/0488 345/173 |
| 2014/0362000 A1* | 12/2014 | Seo ..................... G02F 1/13394 345/173 |
| 2014/0368467 A1* | 12/2014 | Park ........................ G06F 3/044 345/174 |
| 2015/0060817 A1 | 3/2015 | Sato et al. |
| 2015/0091868 A1 | 4/2015 | Nakanishi et al. |
| 2015/0144920 A1 | 5/2015 | Yamazaki et al. |
| 2015/0261332 A1 | 9/2015 | Nakamura et al. |
| 2015/0261333 A1 | 9/2015 | Kaneyasu et al. |
| 2015/0310793 A1 | 10/2015 | Kawashima et al. |
| 2015/0317015 A1 | 11/2015 | Eguchi et al. |
| 2015/0317020 A1 | 11/2015 | Watanabe et al. |
| 2015/0318339 A1 | 11/2015 | Nakamura et al. |
| 2015/0346776 A1 | 12/2015 | Miyake |
| 2015/0346897 A1 | 12/2015 | Irri et al. |
| 2015/0349041 A1 | 12/2015 | Miyake |
| 2015/0355763 A1 | 12/2015 | Miyake et al. |
| 2015/0362776 A1 | 12/2015 | Jikumaru et al. |
| 2015/0372026 A1 | 12/2015 | Sato |
| 2016/0154263 A1 | 6/2016 | Hatsumi et al. |
| 2016/0179259 A1 | 6/2016 | Watanabe et al. |
| 2016/0195956 A1* | 7/2016 | Zhao ...................... G06F 3/044 345/174 |
| 2016/0195983 A1 | 7/2016 | Miyake |
| 2016/0224166 A1 | 8/2016 | Yamazaki et al. |
| 2016/0253030 A1 | 9/2016 | Tada et al. |
| 2016/0274398 A1 | 9/2016 | Hirakata et al. |
| 2016/0274699 A1 | 9/2016 | Shishido et al. |
| 2016/0282989 A1 | 9/2016 | Hirakata et al. |
| 2016/0282990 A1 | 9/2016 | Kimura et al. |
| 2016/0299601 A1 | 10/2016 | Yamazaki et al. |
| 2016/0328080 A1 | 11/2016 | Miyake |
| 2016/0349557 A1 | 12/2016 | Shishido et al. |
| 2016/0349558 A1 | 12/2016 | Shishido et al. |

FOREIGN PATENT DOCUMENTS

| | | |
|---|---|---|
| CN | 105765498 A | 7/2016 |
| EP | 2650762 A | 10/2013 |
| JP | 2013-218659 A | 10/2013 |
| JP | 2014-071626 A | 4/2014 |
| KR | 2013-0114421 A | 10/2013 |
| WO | WO-2010/088666 | 8/2010 |
| WO | WO-2015/059995 | 4/2015 |

OTHER PUBLICATIONS

Written Opinion (Application No. PCT/IB2016/052882) dated Sep. 20, 2016.

* cited by examiner

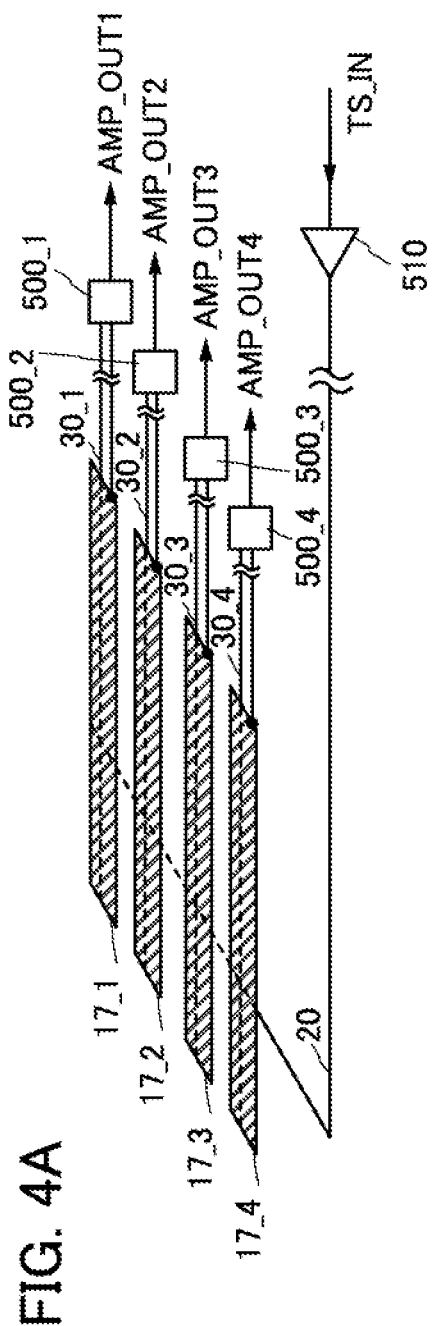
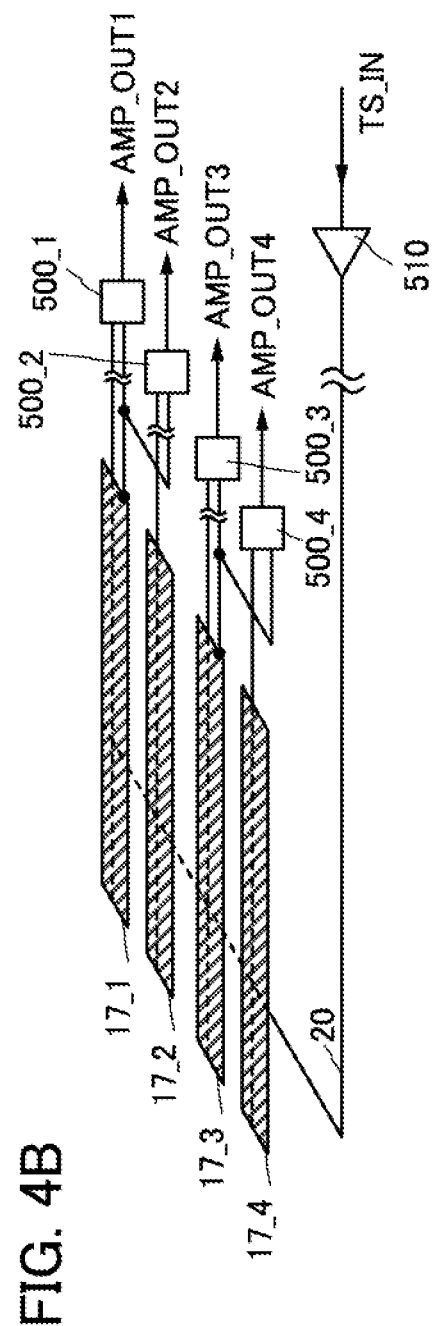

FIG. 5A
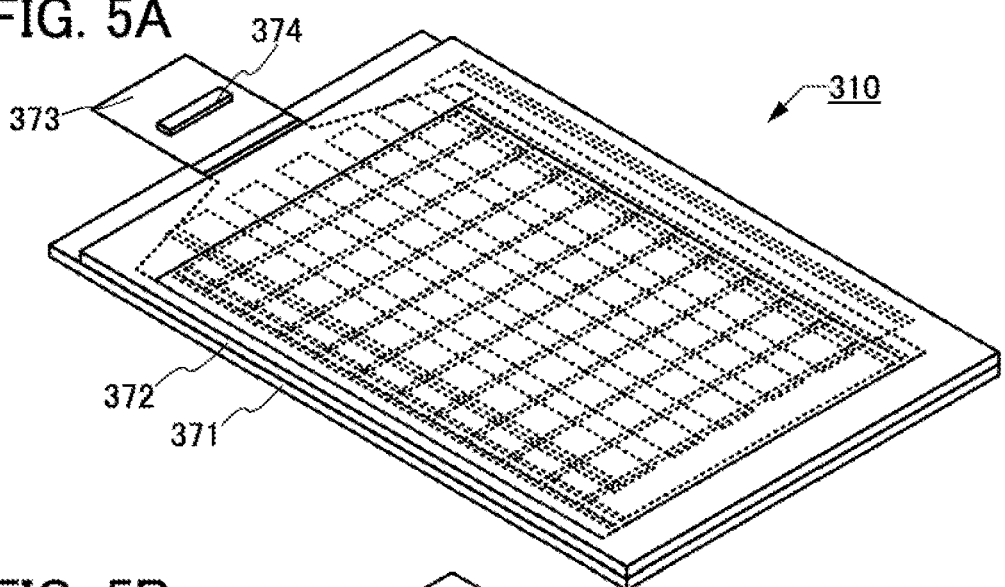
FIG. 5B
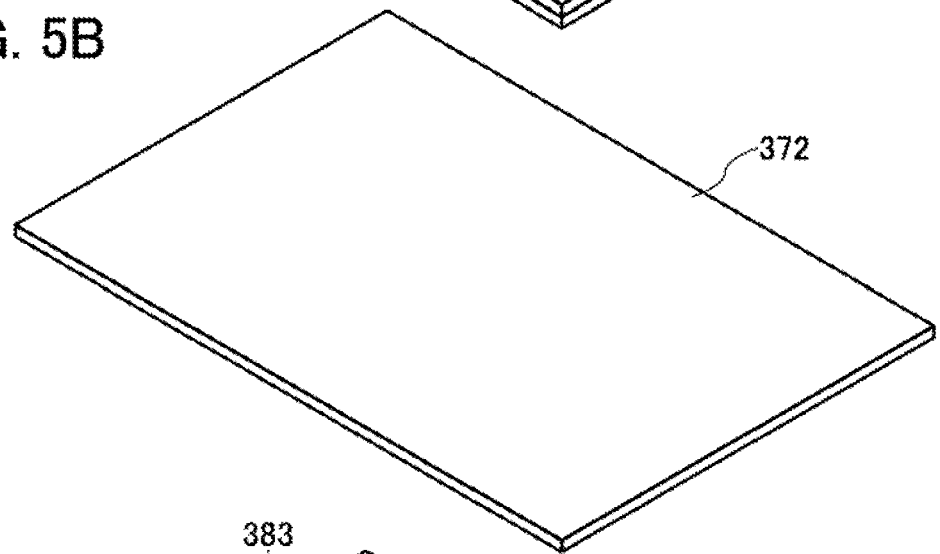
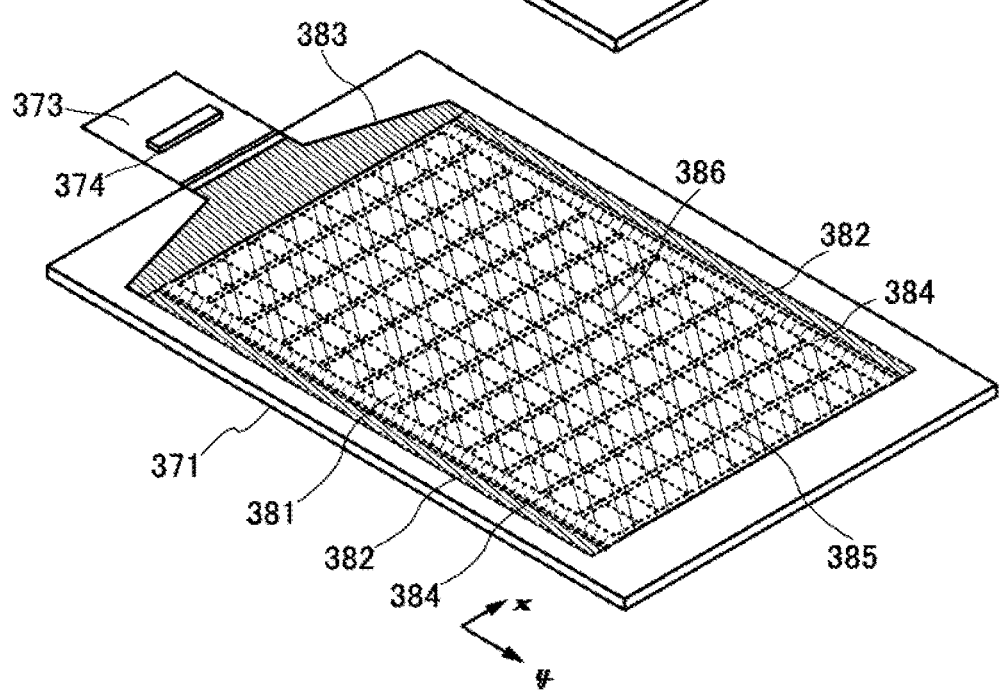

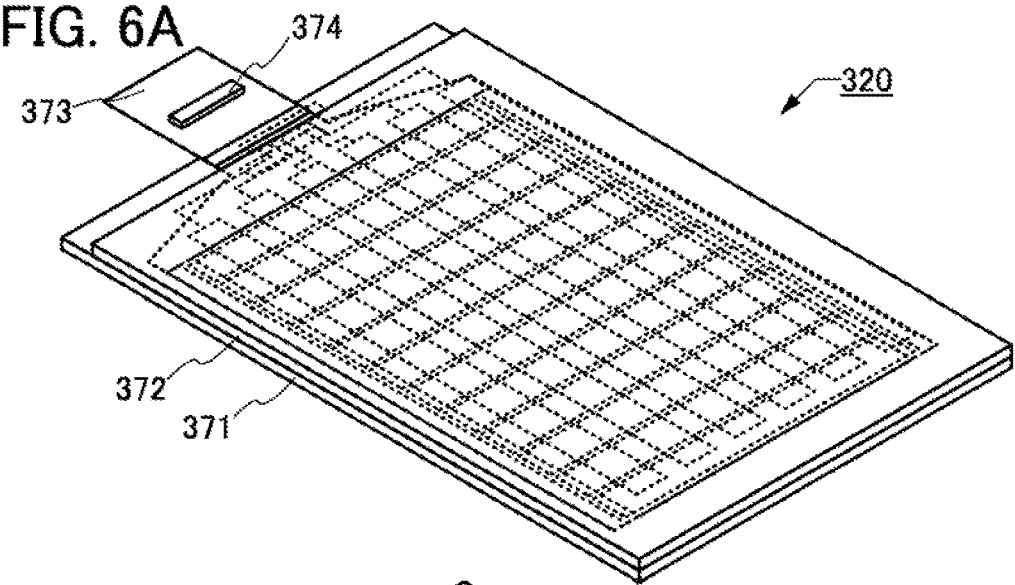
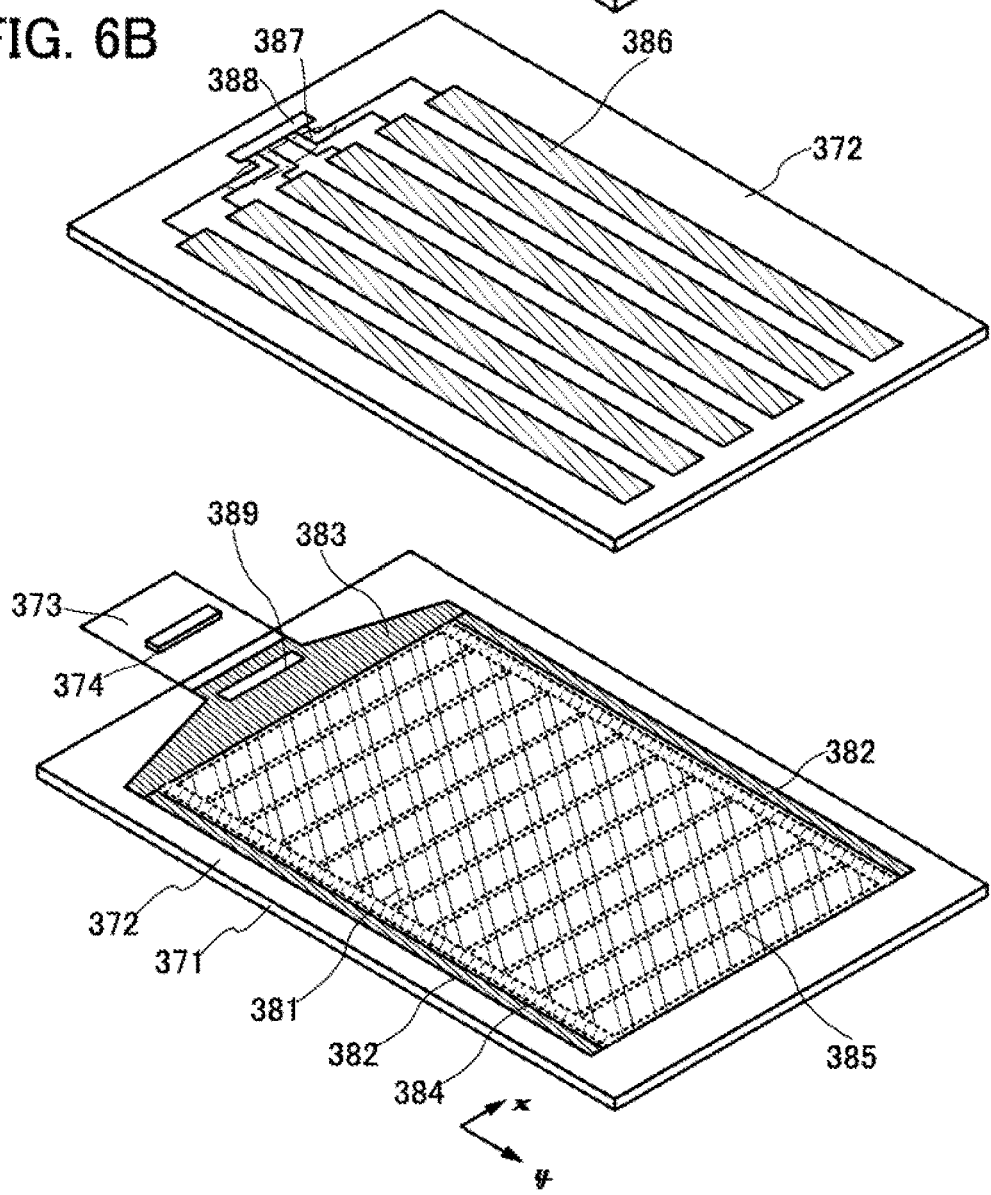

FIG. 24A1
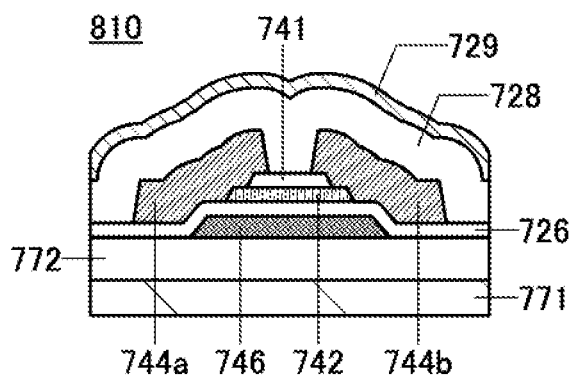
FIG. 24A2
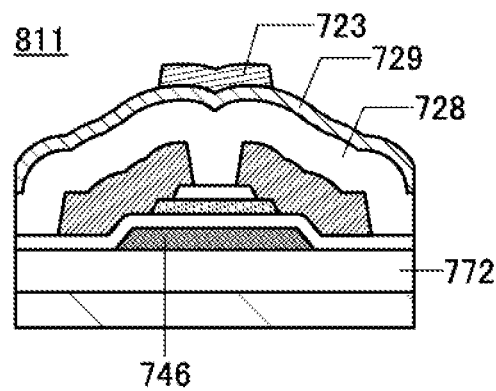
FIG. 24B1
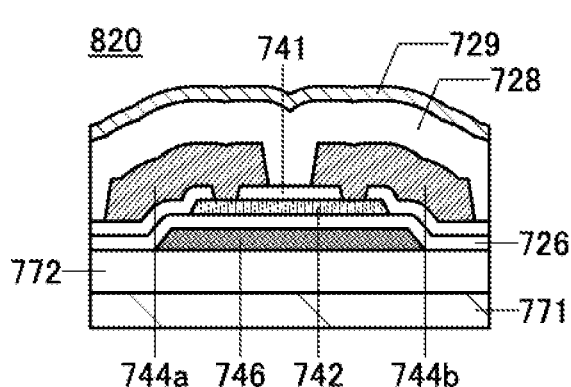
FIG. 24B2
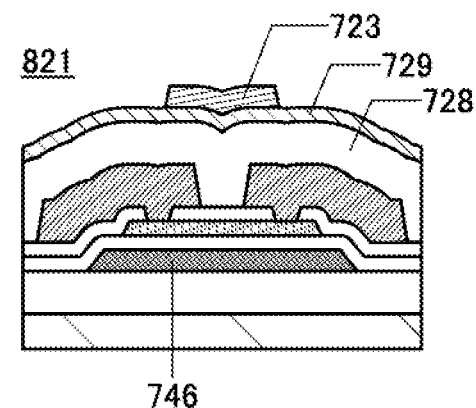
FIG. 24C1
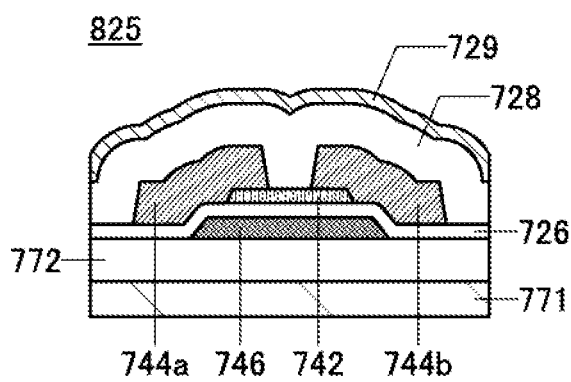
FIG. 24C2
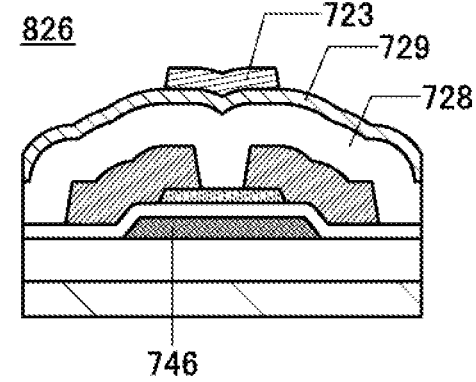

FIG. 25A1
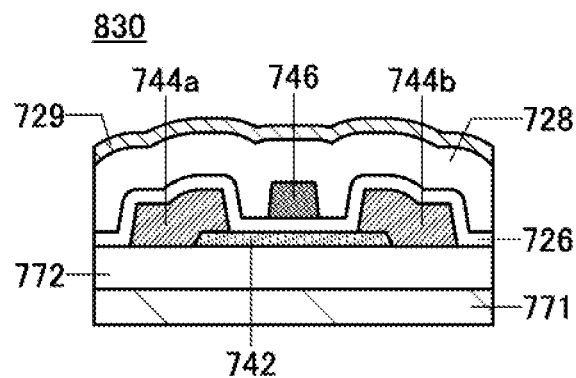
FIG. 25A2
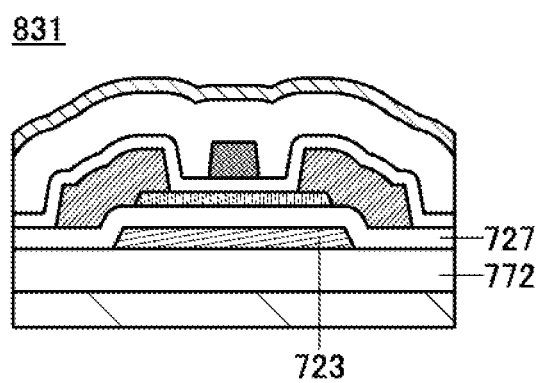
FIG. 25A3
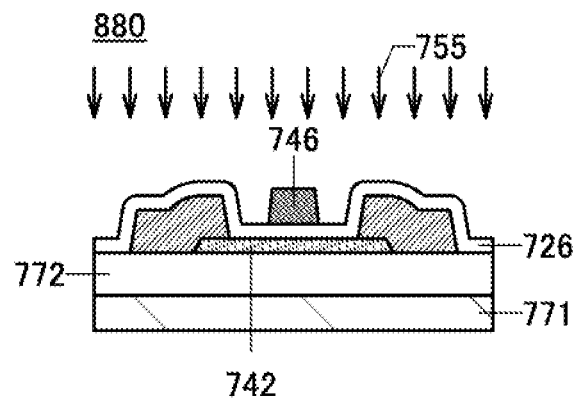
FIG. 25B1
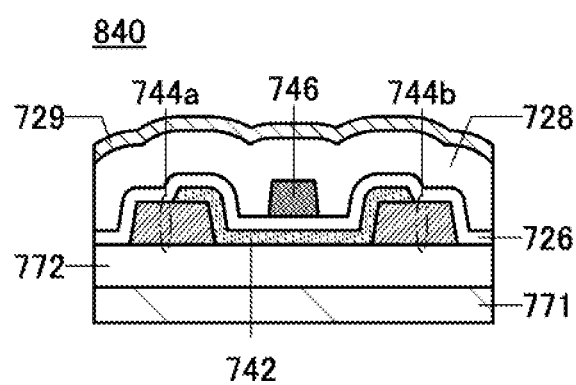
FIG. 25B2
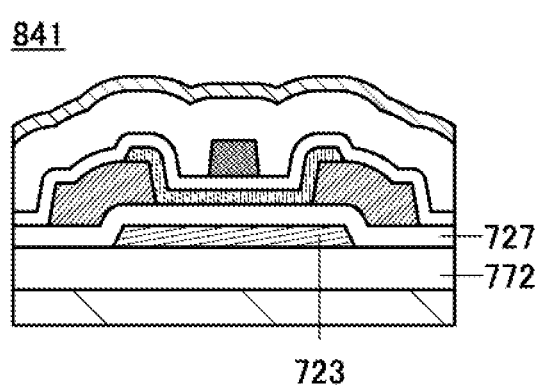

FIG. 26A1
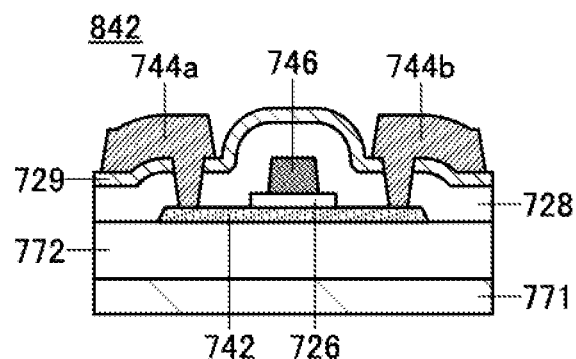
FIG. 26A2
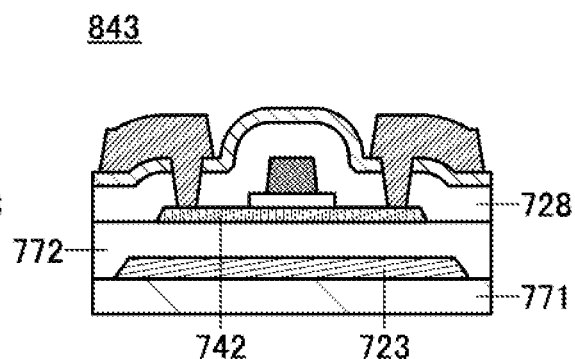
FIG. 26A3
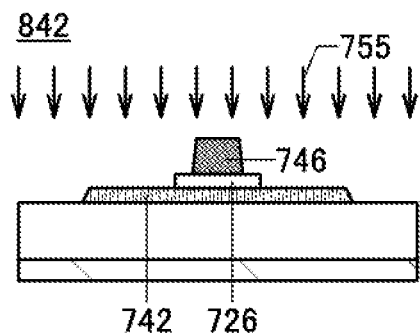
FIG. 26B1
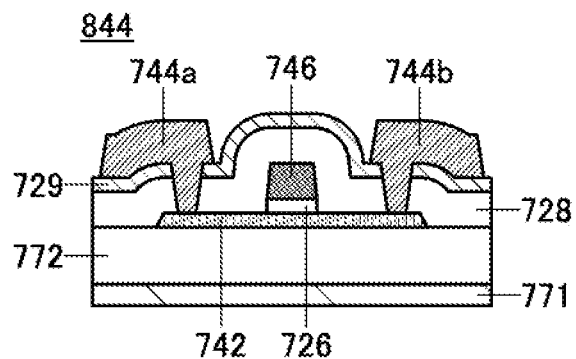
FIG. 26B2
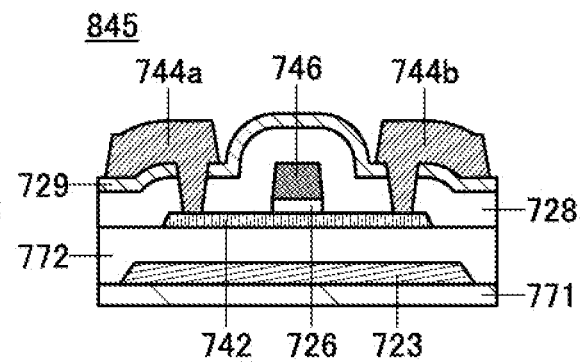
FIG. 26C1
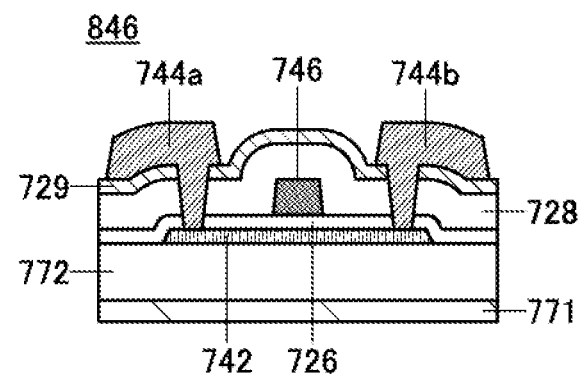
FIG. 26C2
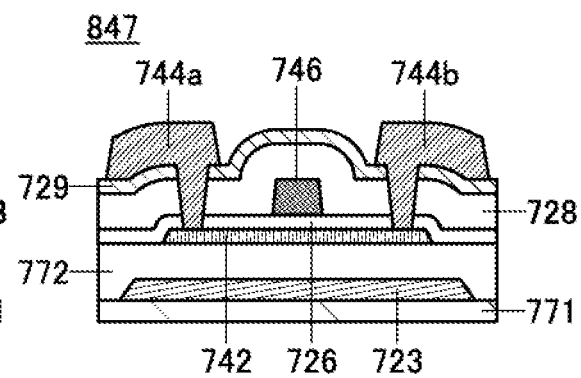

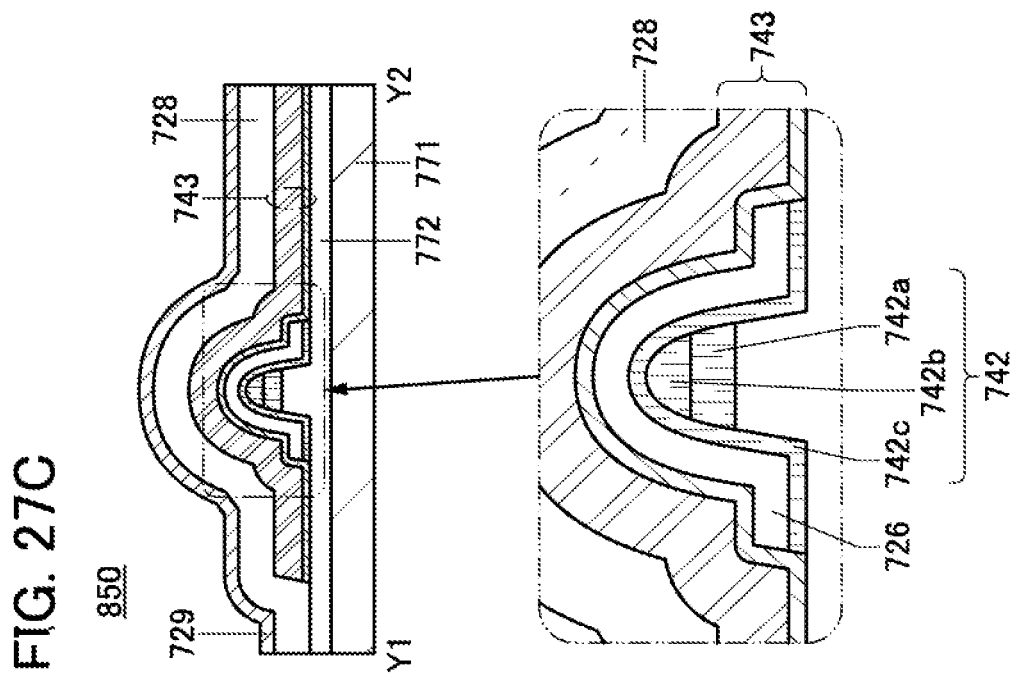
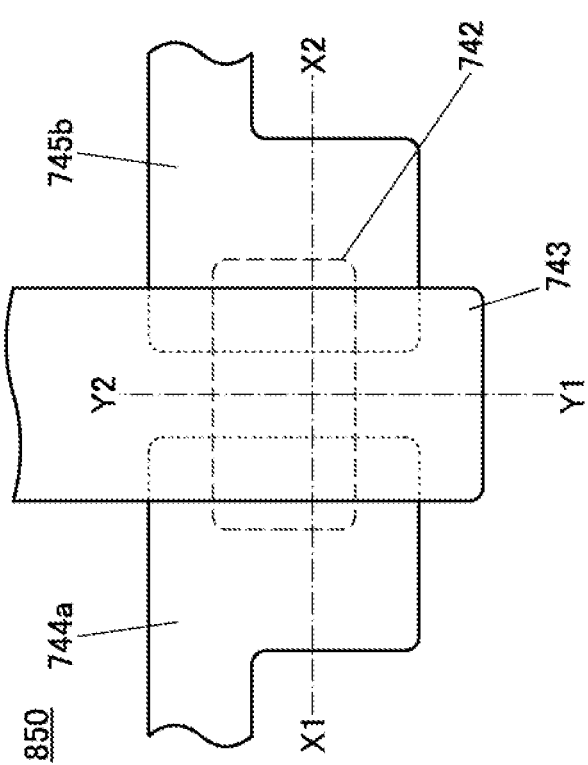
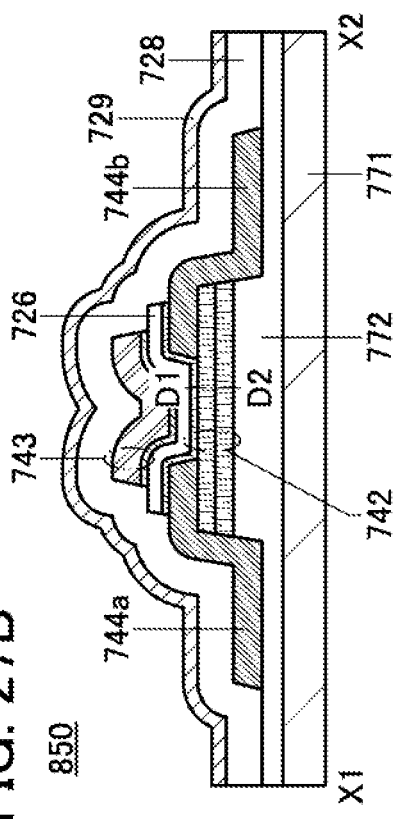

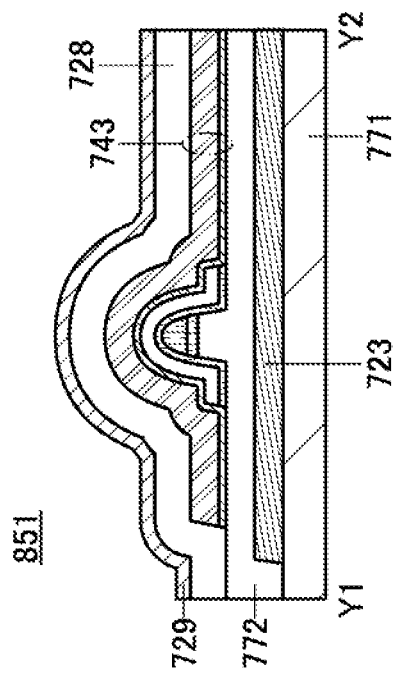
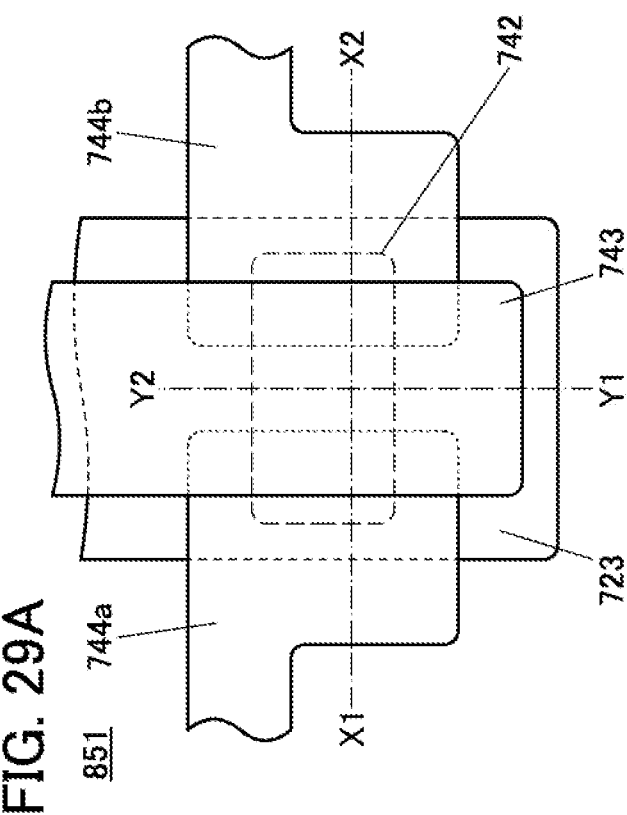
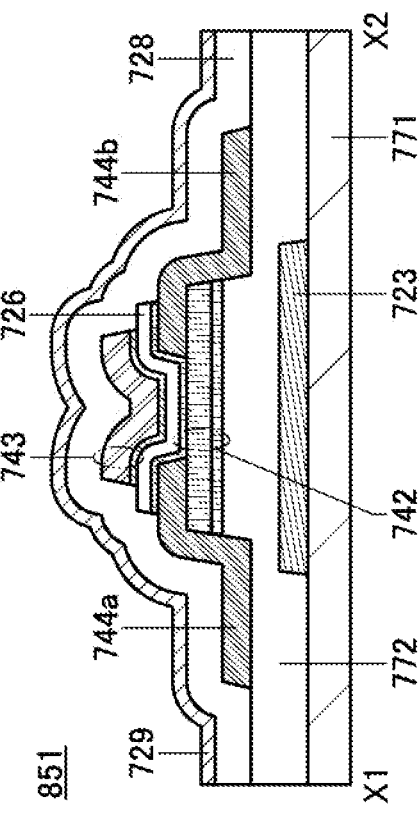

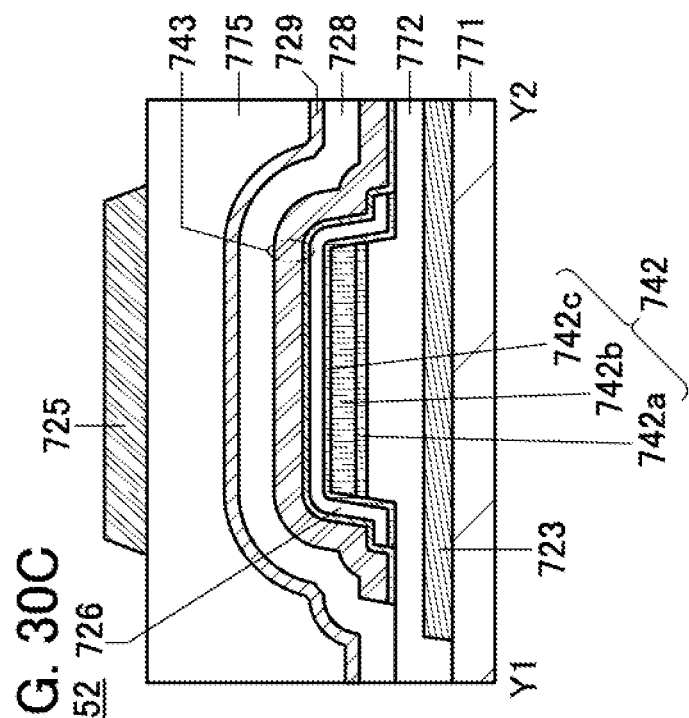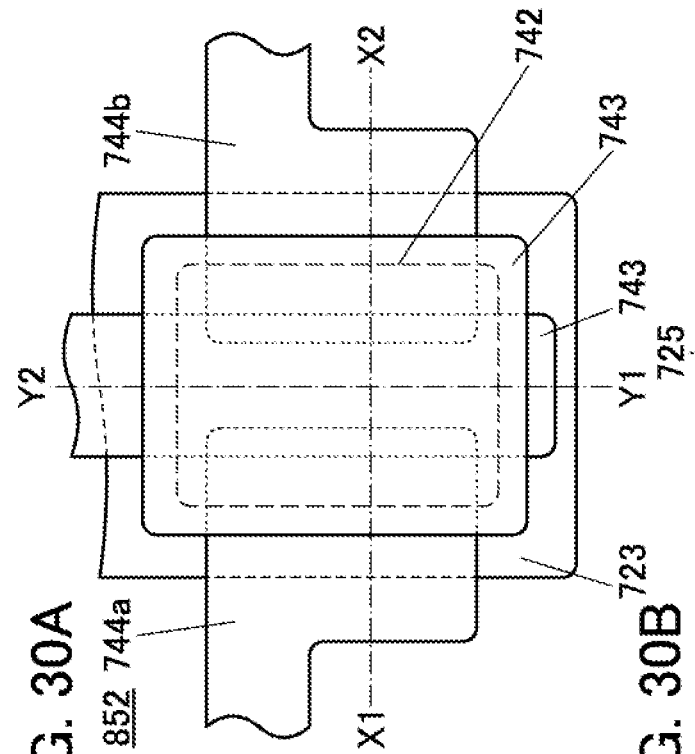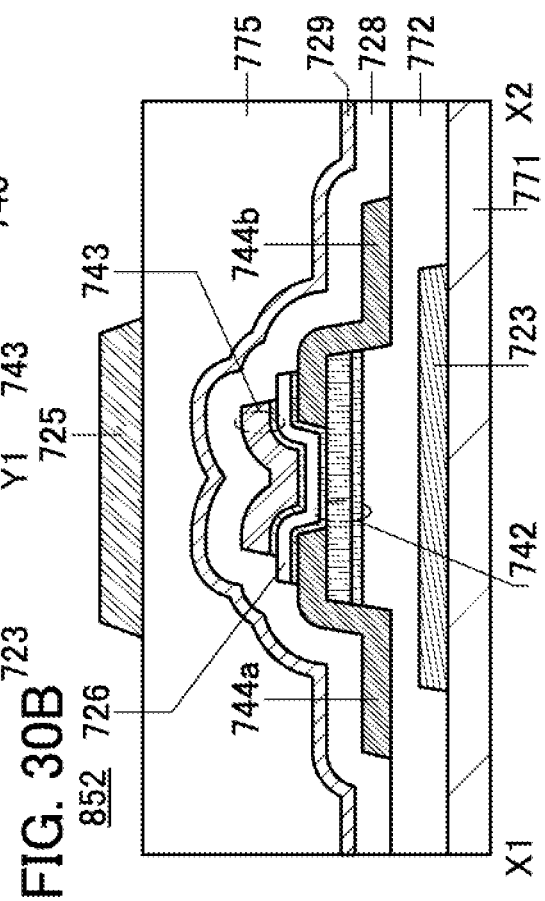

TOUCH PANEL

TECHNICAL FIELD

One embodiment of the present invention relates to a touch panel.

Note that one embodiment of the present invention is not limited to the above technical field. One embodiment of the invention disclosed in this specification and the like relates to an object, a method, or a manufacturing method. One embodiment of the present invention relates to a process, a machine, manufacture, or a composition of matter. Specifically, examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof.

Note that in this specification and the like, a touch panel refers to a display device (or a display module) provided with a touch sensor. In some cases, a touch panel is called a touch screen. Note that a device which does not include a display device and includes only a touch sensor is called a touch panel in some cases. A display device that is provided with a touch sensor is also called a touch sensor equipped display device, a display device equipped touch panel, a display module, or the like in some cases.

Note that in this specification and the like, a display device in which an electrode of a touch sensor is incorporated on the element substrate side is called a full in-cell touch panel (or a full in-cell touch sensor equipped display device), in some cases. In the full in-cell touch panel, for example, an electrode formed on the element substrate side is also used as an electrode for the touch sensor.

In this specification and the like, a display device in which an electrode of a touch sensor is incorporated on the counter substrate side as well as on the element substrate side is sometimes called a hybrid in-cell touch panel (or a hybrid in-cell touch sensor equipped display device). The hybrid in-cell touch panel uses an electrode formed on the element substrate side and an electrode formed on the counter substrate side as electrodes for a touch sensor, for example.

BACKGROUND ART

Hybrid in-cell touch panels, which can offer thinner and more inexpensive display devices than those externally provided with touch sensors, have been actively researched and developed (see Patent Document 1). Furthermore, in order to achieve further reduction in thickness and cost, full in-cell touch panels have been also actively researched and developed (see Patent Document 2).

Hybrid in-cell touch panels and full in-cell touch panels are used in liquid crystal display devices and have been practically used for smartphones, tablet terminals, and the like. Furthermore, a full in-cell touch panel has been attempted to be used in an organic EL display device (see Patent Document 3).

PRIOR ART DOCUMENT

Patent Document

[Patent Document 1] United States Patent Application Publication No. 2015/0091868

[Patent Document 2] PCT International Publication No. 2010/088666

[Patent Document 3] United States Patent Application Publication No. 2015/0060817

SUMMARY OF THE INVENTION

Problems to be Solved by the Invention

As described above, there are many structures for a touch panel. The structures have merits and demerits, and an appropriate structure is selected in accordance with circumstances. A proposal of a novel structure for a touch panel and the like leads to a higher degree of freedom of selection.

An object of one embodiment of the present invention is to provide a novel touch panel or the like.

In the case where a hybrid in-cell touch panel and a full in-cell touch panel are used for an organic EL display device, there is a risk of false touch sensing when an electrode for touch sensing is affected by noise of an electrode included in an organic EL element.

An object of one embodiment of the present invention is to provide a touch panel or the like having a novel structure in which an influence of noise of an electrode included in an organic EL element on an electrode for touch sensing can be suppressed.

Note that the objects of one embodiment of the present invention are not limited to the above objects. The objects described above do not disturb the existence of other objects. The other objects are the ones that are not described above and will be described below. The objects that are not described above will be apparent from and can be derived from the description of the specification, the drawings, and the like by those skilled in the art. Note that one embodiment of the present invention solves at least one of the above objects and the other objects.

Means for Solving the Problems

One embodiment of the present invention is a touch panel including a pixel, a touch sensor, and an integrator circuit. The pixel includes a transistor and a light-emitting element. The light-emitting element includes a light-emitting layer between a pixel electrode and a common electrode. The touch sensor includes a first electrode and a second electrode. The first electrode has a function capable of supplying a pulse signal. The second electrode has a function capable of sensing a signal in accordance with the pulse signal. The integrator circuit includes an operational amplifier. The operational amplifier includes a first input terminal and a second input terminal. The first input terminal is electrically connected to the second electrode. The second input terminal is electrically connected to the common electrode.

One embodiment of the present invention is a touch panel including a pixel, a touch sensor, and an integrator circuit. The pixel includes a transistor and a light-emitting element. The light-emitting element is electrically connected to a current supply line through the transistor. The touch sensor includes a first electrode and a second electrode. The first electrode has a function capable of supplying a pulse signal. The second electrode has a function capable of sensing a signal in accordance with the pulse signal. The integrator circuit includes an operational amplifier. The operational amplifier includes a first input terminal and a second input terminal. The first input terminal is electrically connected to the second electrode. The second input terminal is electrically connected to the current supply line.

One embodiment of the present invention is preferably the touch panel where the first electrode and the second substrate are provided on a side of a substrate over which the transistor is formed.

One embodiment of the present invention is preferably the touch panel where one of the first electrode and the second electrode is an electrode formed in the same layer as a conductive layer included in the transistor.

One embodiment of the present invention is preferably the touch panel where the other of the first electrode and the second electrode is provided on a counter substrate side.

One embodiment of the present invention is preferably the touch panel where the one of the first electrode and the second electrode is an electrode provided in the same layer as the pixel electrode or a layer therebelow.

One embodiment of the present invention is preferably the touch panel where the touch sensor is a mutual capacitive touch sensor.

Note that other embodiments of the present invention will be shown in the following embodiments and the drawings.

EFFECT OF THE INVENTION

One embodiment of the present invention can provide a novel touch panel or the like.

Another embodiment of the present invention can provide a touch panel or the like having a novel structure in which an influence of noise of an electrode included in an organic EL element on an electrode for touch sensing can be suppressed.

BRIEF DESCRIPTION OF DRAWINGS

FIG. 4 Schematic diagrams for illustrating embodiments of the present invention.

FIG. 5 Schematic perspective views for illustrating one embodiment of the present invention.

FIG. 6 Schematic perspective views for illustrating one embodiment of the present invention.

FIG. 24 Cross-sectional views for illustrating embodiments of the present invention.

FIG. 25 Cross-sectional views for illustrating embodiments of the present invention.

FIG. 26 Cross-sectional views for illustrating embodiments of the present invention.

FIG. 27 A top view and cross-sectional views for illustrating one embodiment of the present invention.

FIG. 29 A top view and cross-sectional views for illustrating one embodiment of the present invention.

MODE FOR CARRYING OUT THE INVENTION

Figure 1A:
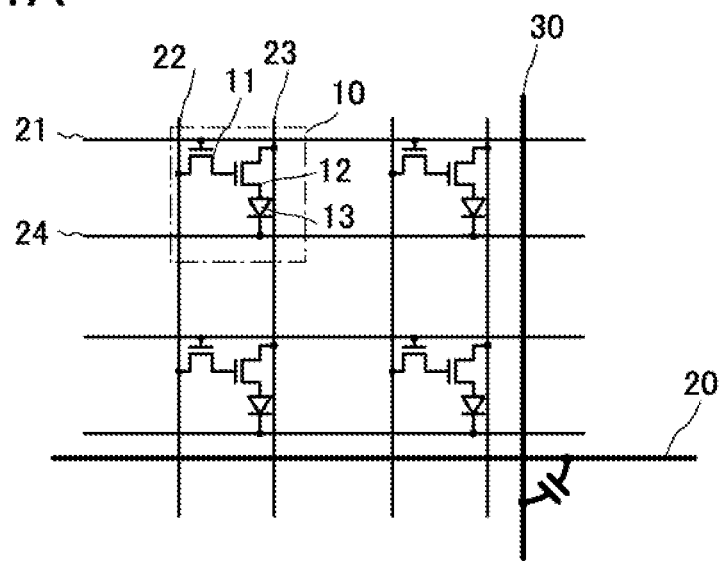
FIG. 1 A circuit diagram and a schematic cross-sectional view for illustrating one embodiment of the present invention.

Embodiments will be described in detail with reference to the drawings. Note that the present invention is not limited to the following description. It will be readily appreciated by those skilled in the art that modes and details thereof can be modified in various ways without departing from the spirit and scope of the present invention. Thus, the present invention should not be construed as being limited to what is described in the following embodiments.

Note that in the structures of the invention described below, the same portions or portions having similar functions are denoted by the same reference numerals in different drawings, and a repeated description thereof is omitted. Furthermore, the same hatching pattern is applied to similar functions, and the portions are not especially denoted by reference numerals in some cases.

Note that in each drawing described in this specification, the size, the layer thickness, or the region of each component is exaggerated for clarity in some cases. Therefore, it is not necessarily limited to the illustrated scale.

Note that in this specification and the like, ordinal numbers such as "first" and "second" are used in order to avoid confusion between components and do not limit the number.

Note that the terms "film" and "layer" can be interchanged with each other in some cases. For example, in some cases, the term "conductive film" can be used instead of the term "conductive layer", and the term "insulating layer" can be used instead of the term "insulating film".

(Embodiment 1)

In this embodiment, a structural example of a touch panel that is a display device (or a display module) provided with a touch sensor is described with reference to drawings.

<Noise in EL Display Device Provided with Touch Sensor>

A touch panel of one embodiment of the present invention is an EL display device provided with a touch sensor. Such a touch panel includes, for example, an EL element, a transistor for driving the EL element, and an electrode of the touch sensor.

A circuit diagram of FIG. 1(A) illustrates an EL element, a pixel including a transistor for driving the EL element, and an electrode of a touch sensor. In the circuit diagram of FIG. 1(A), pixels 10 in two rows and two columns and a pair of an electrode 20 and an electrode 30 of the touch sensor are illustrated as an example.

The pixel 10 includes, for example, a transistor 11, a transistor 12, and an EL element 13. The pixel 10 is connected to, for example, a scan line 21, a signal line 22, a current supply line 23, and a common electrode line 24.

The electrode 20 and the electrode 30 can sense approach or contact of a sensing target by a mutual capacitive method, for example. Specifically, by applying a pulse voltage to the electrode 20 functioning as a driving electrode (Tx), a current flowing through the electrode 30 functioning as a sensing electrode (Rx) is sensed. An electric field between Tx-Rx is blocked depending on the presence of an interrupting object such as a finger or a pen, so that the capacitance is changed. The change in capacitance is sensed with the use of the change in current flowing through the sensing electrode (Rx), so that approach or contact of a sensing target can be sensed. The change in current can be sensed by an integrator circuit.

Figure 1B:
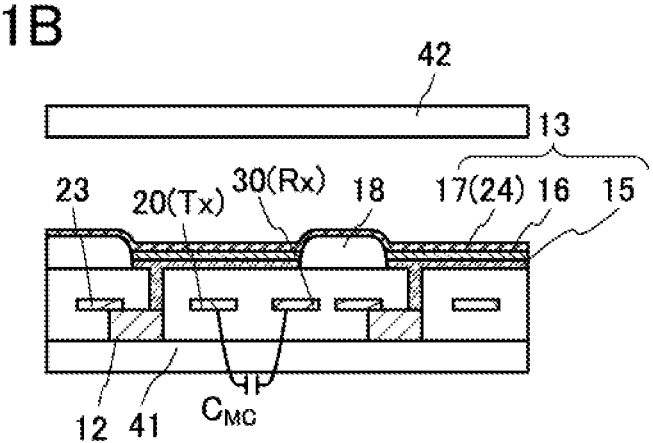

FIG. 1(B) illustrates an example of a schematic cross-sectional view for illustrating a layout of the structure illustrated in the circuit diagram of FIG. 1(A).

In the schematic cross-sectional view of FIG. 1(B), a pair of a substrate 41 and a substrate 42 are illustrated as an example. The transistor 12, the EL element 13, the current supply line 23, and a partition layer 18 are illustrated over the substrate 41.

The EL element 13 includes, for example, a pixel electrode 15, a light-emitting layer 16, and a common electrode 17. The common electrode 17 corresponds to the above-described common electrode line 24 and can function as a cathode of the EL element 13. Furthermore, the pixel electrode 15 can function as an anode of the EL element 13.

Furthermore, the electrode 20 functioning as the driving electrode (Tx) and the electrode 30 functioning as the sensing electrode (Rx) are included between the substrate 41 and the EL element 13, for example. The electrodes 20 and 30 are formed over the substrate 42 and/or over the substrate 43 and can be used in a hybrid in-cell touch panel or a full in-cell touch panel in accordance with the positions of the electrodes. In the following description, an example of application to a full in-cell touch panel is described for easy understanding.

The transistor 12 has a function of supplying current to the EL element 13 in accordance with a gate potential. The transistor 12 includes an electrode functioning as a gate, an electrode functioning as a source or a drain, and a semiconductor layer. Note that in FIG. 1(B), although not illustrated, an electrode functioning as a source or a drain of the transistor 11 is connected to the gate of the transistor 12. The details of the structures of the transistors 11 and 12 are described later.

In FIG. 1(B) illustrated as an example, the electrodes 20 and 30 are provided on a side of the substrate 41 over which the transistor 12 is formed. In addition, the electrodes 20 and 30 can be conductive layers provided in the same layer as the electrode functioning as the source or the drain of the transistor 11 or as an electrode formed in the same layer as the gate of the transistor 12. Alternatively, the electrodes 20 and 30 can be conductive layers provided in the same layer as the pixel electrode 15. With such a structure, an electrode functioning as a touch sensor can be additionally formed without an additional step.

FIG. 1(B) illustrates an example in which the common electrode 17 included in the EL element 13 is formed on the entire surfaces over the electrodes 20 and 30. Thus, capacitance $C_{MC}$ formed between the electrodes 20 and 30 is generated on the substrate 41 side.

Note that in the case of the hybrid in-cell touch panel in FIG. 1(B), one electrode of the touch sensor is provided on the substrate 41 side, and the other electrode of the touch sensor is provided on the substrate 42 side. In that case, an opening is preferably provided in the common electrode 17 so that capacitance is formed between the electrodes included in the touch sensor.

In the above-described structure of the touch panel, the electrode 30 functioning as the sensing electrode (Rx) is located close to the common electrode 17 formed on the entire surface. Thus, the electrode 30 is likely to be affected by noise generated in the common electrode 17. In the electrode 30, a change in the signal obtained with the use of a change in the capacitance $C_{MC}$ is sensed by the integrator circuit so that a touch is sensed. When the signal obtained by the electrode 30 is affected by the noise, it is difficult to judge that a change in the signal obtained by the integrator circuit is caused by touch sensing or by noise, and accurate sensing of a touch becomes difficult.

Like the electrode 30, the current supply line located close to the common electrode line is also likely to be affected by noise generated in the common electrode 17. In the case where the current supply line is formed using a conductive layer whose material is the same as that of the electrode 30, their parasitic capacitance components or resistance components are similar to each other; thus, similar waveforms of noise can be easily obtained.

The integrator circuit which senses a change in a signal of the electrode 30 includes an operational amplifier. The operational amplifier amplifies and outputs a potential difference between two input terminals. In the integrator circuit, an input signal is connected to one input terminal, and a voltage which is a reference is supplied to the other input terminal so that the circuit is operated. Thus, when an input signal which is affected by noise and obtained by the electrode 30 is input to the one input terminal, the noise is amplified, and it is difficult to sense a touch accurately.

<Structural Example 1 of Touch Panel>

Figure 2:
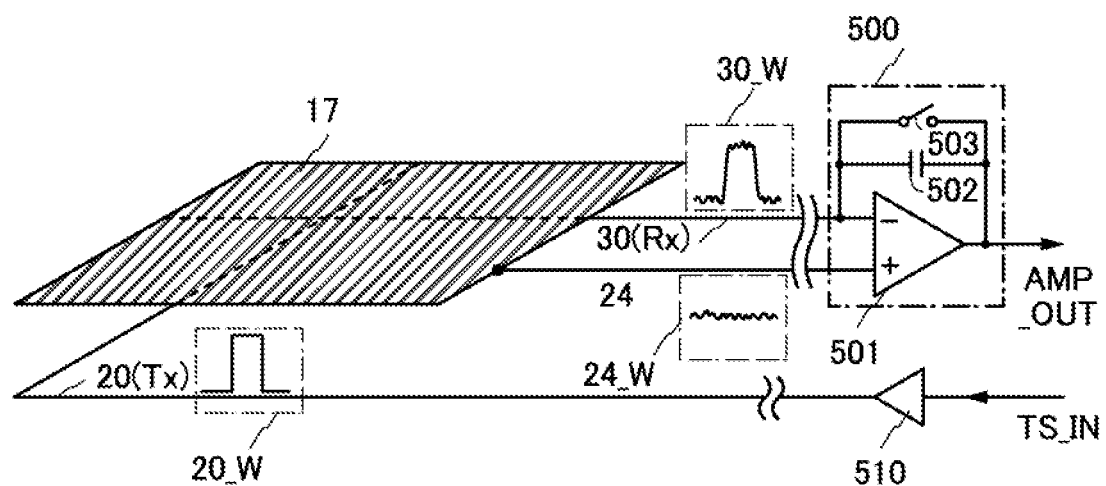
FIG. 2 A schematic diagram for illustrating one embodiment of the present invention.

In one embodiment of the present invention, a structure in a schematic diagram illustrated in FIG. 2 suppresses the above-described influence of noise. FIG. 2 illustrates an integrator circuit 500 and a level shifter circuit 501 in addition to the electrode 20 functioning as the driving electrode (Tx), the electrode 30 functioning as the sensing electrode (Rx), the common electrode 17, and the common electrode line 24, which are described in FIGS. 1(A) and (B). The integrator circuit 500 includes, for example, a capacitor 502 and a switch 503. Output of the integrator circuit 500 is shown as a signal AMP_OUT. A signal supplied to the electrode 20 functioning as the driving electrode (Tx) through a level shifter circuit 510 is shown as a signal TS_IN.

Furthermore, FIG. 2 illustrates a signal waveform 20_W applied to the electrode 20. FIG. 2 also illustrates a signal waveform 30_W obtained by the electrode 30. FIG. 2 also illustrates a noise waveform 24_W of the common electrode line 24.

Sensing a touch in the touch panel is performed by supplying a pulse signal as the signal TS_IN. Then, the waveform 20_W that is a pulse signal is input to the electrode 20 functioning as the driving electrode (Tx). A change in the signal of the electrode 20 is transmitted to the electrode 30 functioning as the sensing electrode (Rx) by a capacitance component of electrodes (Tx-Rx). The signal waveform 30_W obtained by the electrode 30 changes depending on a change in capacitance between the electrodes due to whether a touch is sensed. This change in the signal waveform 30_W is sensed by the integrator circuit, and the signal AMP_OUT including whether a touch is sensed can be output.

In the structure in FIG. 2, the electrode 30 functioning as the sensing electrode (Rx) is connected to one input terminal of the operational amplifier 501. Furthermore, the common electrode line 24 connected to the common electrode 17 is connected to the other input terminal of the operational amplifier 501. In other words, in one embodiment of the present invention, a signal including the noise waveform 24_W is supplied as a reference voltage of the operational amplifier 501 included in the integrator circuit 500. With such a structure, in the case where noise generated in the common electrode 17 is also generated in the electrode 30 functioning as the sensing electrode (Rx), the output of the operational amplifier 501 can be obtained as a signal where the noise is canceled. Thus, in one embodiment of the present invention, the signal AMP_OUT which is less affected by noise can be obtained.

Figure 3:
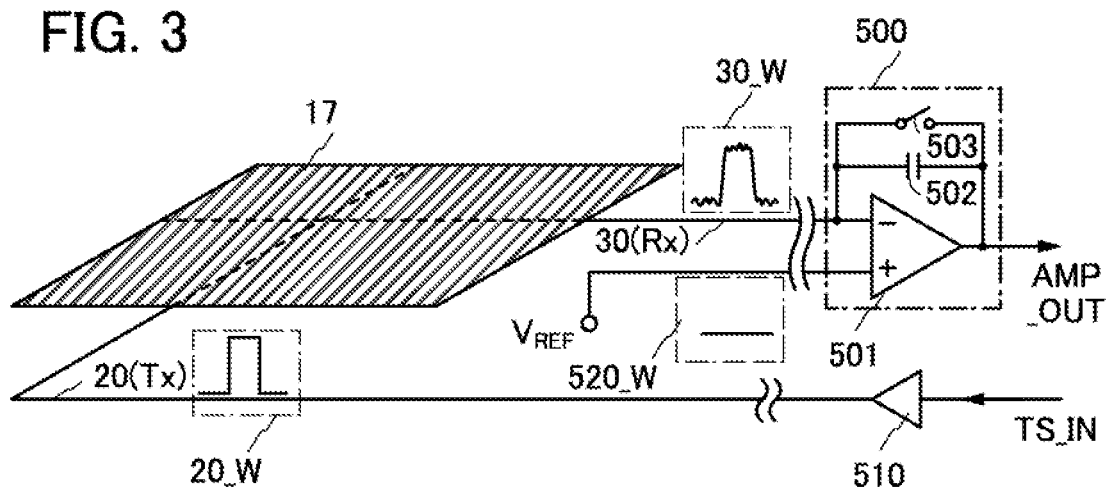
FIG. 3 A schematic diagram for illustrating one embodiment of the present invention.

FIG. 3 is a schematic diagram illustrating the case where the reference voltage input to the other input terminal of the operational amplifier 501 included in the integrator circuit 500 is a fixed voltage $V_{REF}$. As in the schematic diagram of FIG. 3, the waveform 30_W including noise is input to the one input terminal of the operational amplifier 501 included in the integrator circuit 500, and a waveform 520_W not including noise is input to the other input terminal. The operational amplifier 501 has a function of amplifying and outputting a difference in signal between the input terminals. Thus, there is a risk of reducing a signal-noise ratio (S/N ratio) and failing in accurate touch sensing.

Meanwhile, as described above, in one embodiment of the present invention illustrated in the schematic diagram of FIG. 2, a signal including noise is input to the one input terminal of the operational amplifier 501 included in the integrator circuit 500, and a signal including noise is input to the other input terminal. The operational amplifier 501 has a function of amplifying and outputting a difference in signal between the input terminals. Thus, the noise is canceled and the S/N ratio is increased, so that accurate sensing of a touch can be performed.

A schematic diagram illustrated in FIG. 4(A) illustrates the case where a plurality of common electrodes 17 illustrated in FIG. 2 are provided. The common electrode illustrated in FIG. 4(A) is divided into a plurality of electrodes 17_1 to 17_4. The plurality of electrodes 17_1 to 17_4 are preferably arranged parallel to the electrode 30 that is a sensing electrode of the touch sensor. For example, FIG. 4(A) illustrates electrodes 30_1 to 30_4 that are sensing electrodes of the touch sensor, and the electrode 30_1 and the electrode 17_1 which are arranged parallel to each other are connected to input terminals of an operational amplifier included in an integrator circuit 500_1. Similarly, the electrode 30_2 and the electrode 17_2, the electrode 30_3 and the electrode 17_3, and the electrode 30_4 and the electrode 17_4 are connected to input terminals of operational amplifiers included in integrator circuits 500_2 to 500_4. The integrator circuits 500_1 to 500_4 output output signals AMP_OUT1 to AMP_OUT4, respectively.

The output signals AMP_OUT1 to AMP_OUT4 can suppress an influence of noise owing to canceling the noise as in the structure illustrated in FIG. 2. For example, in the structure in FIG. 4(A), the electrode 17_1 and the electrode 30_1 are provided to overlap with each other. Thus, the electrode 17_1 and the electrode 30_1 are affected by noise having the same waveform. In other words, by dividing a region and inputting a waveform of a common electrode which is to be input to the integrator circuit, noise having the same waveform can be easily added to the common electrode and the sensing electrode. Thus, noise of the common electrode and noise of an electrode for touch sensing can be canceled more easily.

Furthermore, FIG. 4(B) illustrates a structure different from that in FIG. 4(A). In FIG. 4(B), as in FIG. 4(A), the plurality of electrodes 17_1 to 17_4 and the integrator circuits 500_1 to 500_4 are included. In FIG. 4(B), the electrode 17_1 is connected to the integrator circuits 500_1 and 500_2, and the electrode 17_3 is connected to the integrator circuits 500_3 and 500_4. The electrode 17_1 and the electrode 17_2, adjacent to each other, are easily affected by noise having the same waveform, and the electrode 17_3 and the electrode 17_4, adjacent to each other, are easily affected by noise having the same waveform. Thus, the same effect as that of FIG. 2 can be obtained even when an electrode which is an adjacent common electrode is connected to an input terminal of each of the integrator circuits 500_1 to 500_4 to have a reference voltage.

In a touch panel of one embodiment of the present invention, a voltage of an electrode for touch sensing and a voltage for reference are input to input terminals of an operational amplifier; in an integrator circuit which senses a change in capacitance caused by touch sensing, the input terminal to which the voltage for reference is supplied is connected to a common electrode included in an organic EL element. Such a structure can cancel noise of the electrode for touch sensing on which noise of the common electrode is superimposed, and thus can reduce an influence of the noise.

<Structural Example 2 of Touch Panel>

Figure 37:
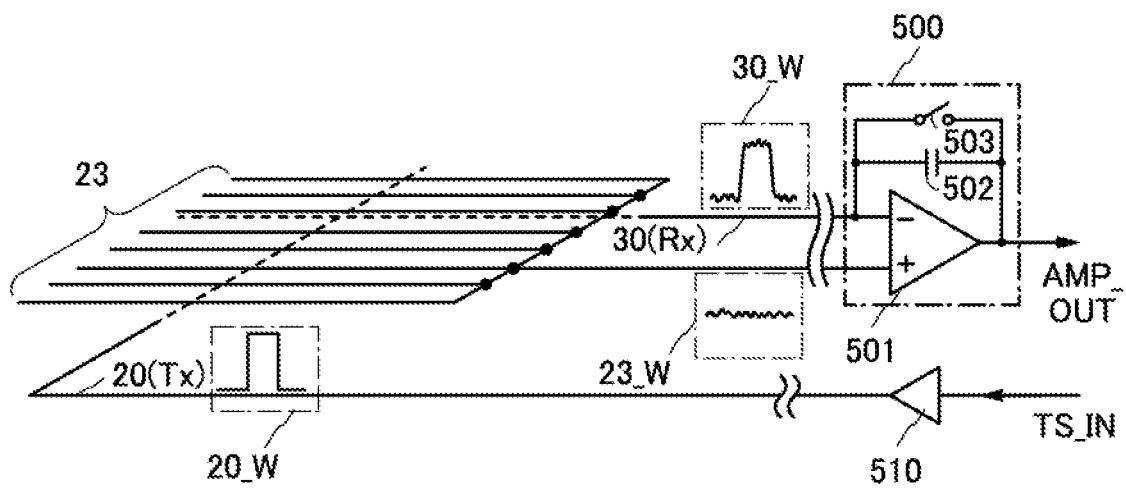
FIG. 37 A schematic diagram for illustrating one embodiment of the present invention.

In one embodiment of the present invention, a structure in a schematic diagram illustrated in FIG. 2 suppresses the above-described influence of noise. FIG. 37 illustrates the integrator circuit 500 and the level shifter circuit 510 in addition to the electrode 20 functioning as the driving electrode (Tx), the electrode 30 functioning as the sensing electrode (Rx), and the current supply line 23, which are described in FIGS. 1(A) and (B). The integrator circuit 500 includes, for example, the capacitor 502 and the switch 503.

Output of the integrator circuit 500 is shown as the signal AMP_OUT. A signal supplied to the electrode 20 functioning as the driving electrode (Tx) through the level shifter circuit 510 is shown as the signal TS_IN.

Furthermore, FIG. 37 illustrates the signal waveform 20_W applied to the electrode 20. FIG. 37 also illustrates the signal waveform 30_W obtained by the electrode 30. FIG. 37 also illustrates a noise waveform 23_W of the current supply line 23.

Sensing the touch in the touch panel is performed by supplying a pulse signal as the signal TS_IN. Then, the waveform 20_W that is a pulse signal is input to the electrode 20 functioning as the driving electrode (Tx). A change in the signal of the electrode 20 is transmitted to the electrode 30 functioning as the sensing electrode (Rx) by a capacitance component of electrodes (Tx-Rx). The signal waveform 30_W obtained by the electrode 30 changes depending on a change in capacitance between the electrodes due to whether a touch is sensed. This change in the signal waveform 30_W is sensed by the integrator circuit, and the signal AMP_OUT including whether a touch is sensed can be output.

In the structure of FIG. 37, the electrode 30 functioning as the sensing electrode (Rx) is connected to one input terminal of the operational amplifier 501. Furthermore, the current supply line 23 is connected to the other input terminal of the operational amplifier 501. In other words, in one embodiment of the present invention, a signal including the noise waveform 23_W is supplied as a reference voltage of the operational amplifier 501 included in the integrator circuit 500. With such a structure, in the case where noise generated in the current supply line 23 also appears in the electrode 30 functioning as the sensing electrode (Rx), the output of the operational amplifier 501 can be obtained as a signal where the noise is canceled. Thus, in one embodiment of the present invention, the signal AMP_OUT which is less affected by noise can be obtained.

Figure 38:
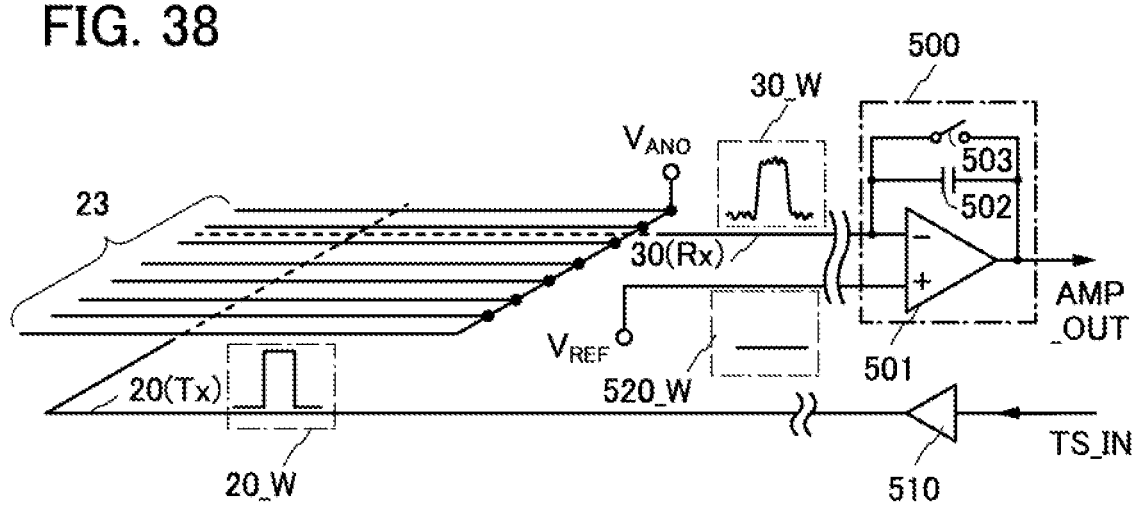
FIG. 38 A schematic diagram for illustrating one embodiment of the present invention.

FIG. 38 is a schematic diagram illustrating the case where the reference voltage input to the other input terminal of the operational amplifier 501 included in the integrator circuit 500 is the fixed voltage $V_{REF}$. As in the schematic diagram of FIG. 38, the waveform 30_W including noise is input to the one input terminal of the operational amplifier 501 included in the integrator circuit 500, and the waveform 520_W not including noise is input to the other input terminal. The operational amplifier 501 has a function of amplifying and outputting a difference in signal between the input terminals. Thus, there is a risk of reducing a signal-noise ratio (S/N ratio) and failing in accurate touch sensing.

Meanwhile, as described above, in one embodiment of the present invention illustrated in the schematic diagram of FIG. 37, a signal including noise is input to one input terminal of the operational amplifier 501 included in the integrator circuit 500, and a signal including noise is input to the other input terminal. The operational amplifier 501 has a function of amplifying and outputting a difference in signal between the input terminals. Thus, the noise is canceled and the S/N ratio is increased, so that accurate sensing of a touch can be performed.

Figure 39A:
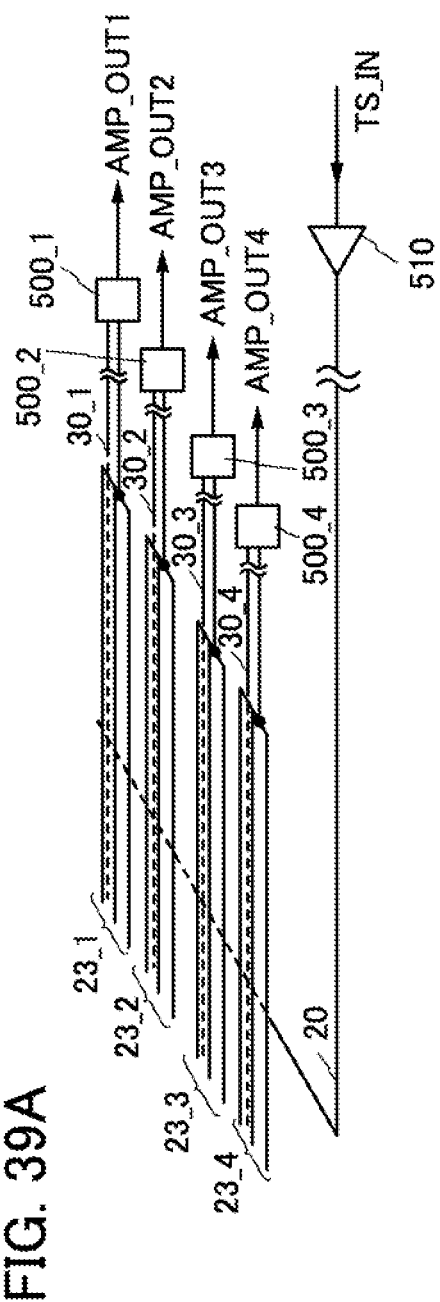
FIG. 39 Schematic diagrams for illustrating embodiments of the present invention.

A schematic diagram illustrated in FIG. 39(A) illustrates the case where a plurality of current supply lines 23 illustrated in FIG. 37 are provided. The current supply line illustrated in FIG. 39(A) is divided into a plurality of current supply lines 23_1 to 23_4. The plurality of current supply lines 23_1 to 23_4 are preferably arranged parallel to the electrode 30 that is a sensing electrode of the touch sensor. For example, FIG. 39(A) illustrates the electrodes 30_1 to 30_4 that are sensing electrodes of the touch sensor, and the electrode 30_1 and the current supply line 23_1 which are arranged parallel to each other are connected to input terminals of an operational amplifier of the integrator circuit 500_1. Similarly, the electrode 30_2 and the current supply line 23_2, the electrode 30_3 and the current supply line 23_3, and the electrode 30_4 and the current supply line 23_4 are connected to input terminals of operational amplifiers included in the integrator circuits 500_2 to 500_4. The integrator circuits 500_1 to 500_4 output the output signals AMP_OUT1 to AMP_OUT4, respectively.

The output signals AMP_OUT1 to AMP_OUT4 can suppress an influence of noise owing to canceling the noise as in the structure illustrated in FIG. 37. For example, in the structure in FIG. 39(A), the current supply line 23_1 and the electrode 30_1 are provided to overlap with each other. Thus, the current supply line 23_1 and the electrode 30_1 are affected by noise having the same waveform. In other words, by dividing a region and inputting a waveform of a current supply line which is to be input to the integrator circuit, noise having the same waveform can be easily added to the current supply line and the sensing electrode. Thus, noise of the current supply line and noise of an electrode for touch sensing can be canceled more easily.

Figure 39B:
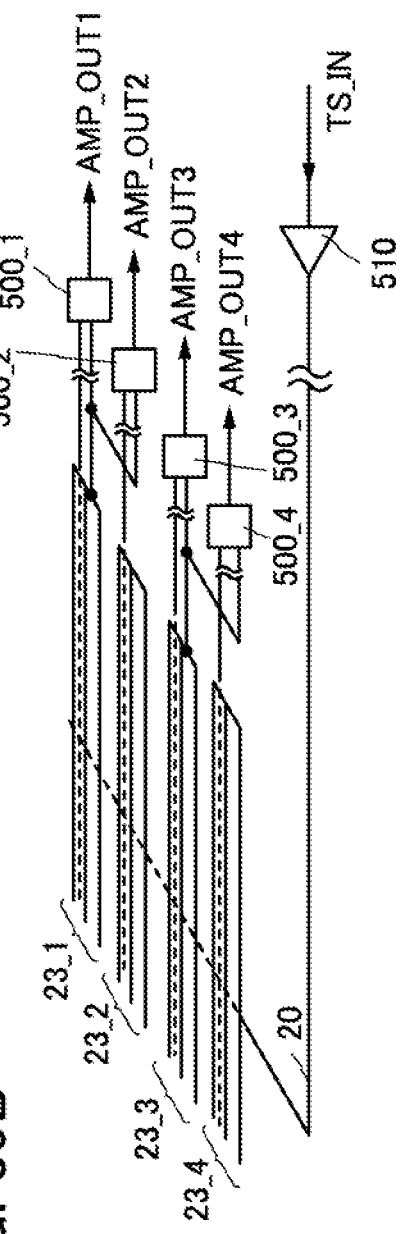

Furthermore, FIG. 39(B) illustrates a structure different from that in FIG. 39(A). In FIG. 39(B), as in FIG. 39(A), a plurality of current supply lines 23_1 to 23_4 and the integrator circuits 500_1 to 500_4. In FIG. 39(B), the current supply line 23_1 is connected to the integrator circuits 500_1 and 500_2, and the current supply line 23_3 is connected to the integrator circuits 500_3 and 500_4. The current supply line 23_1 and the current supply line 23_2, adjacent to each other, are easily affected by noise having the same waveform, and the current supply line 23_3 and the current supply line 23_4, adjacent to each other, are easily affected by noise having the same waveform. Thus, the same effect as that of FIG. 37 can be obtained even when an electrode which is an adjacent common electrode is connected to an input terminal of each of the integrator circuits 500_1 to 500_4 to have a reference voltage.

In a touch panel of one embodiment of the present invention, a voltage of an electrode for touch sensing and a voltage for reference are input to input terminals of an operational amplifier; in an integrator circuit which senses a change in capacitance caused by touch sensing, the input terminal to which the voltage for reference is supplied is connected to a current supply line which supplies current to an organic EL element. Such a structure can cancel noise of the electrode for touch sensing on which noise of the common electrode is superimposed, and thus, can reduce an influence of the noise.

<Schematic Perspective View of Full in-Cell Touch Panel>

FIG. 5(A) is a schematic perspective view of a touch panel 310 of one embodiment of the present invention. The touch panel 310 is a full in-cell touch panel. FIG. 5(B) is a developed view of the schematic perspective view of FIG. 5(A). Note that only typical components are illustrated for simplicity.

The touch panel 310 includes a substrate 371 and a substrate 372 which are provided so as to face each other.

A display portion 381, a driver circuit 382, a wiring 383, a driver circuit 384, and the like are provided over the substrate 371. A conductive layer 385 is formed in the display portion 381 in the x direction. A plurality of conductive layers 386 and the like are formed over the substrate 371 in the direction orthogonal to the conductive layer 385, i.e., in the y direction.

The display portion 381 includes at least a plurality of pixels. The pixel includes a transistor and an EL element.

The driver circuit 382 can be a scan line driver circuit that is a display driver circuit for performing display, for example.

The substrate 371 is provided with an FPC 373 which is electrically connected to the wiring 383. In the example illustrated in FIGS. 5(A) and (B), an IC 374 is provided over the FPC 373.

In the example illustrated in FIGS. 5(A) and (B), the IC 374 is mounted on the FPC 373 by a COF (Chip On Film) method. As the IC 374, an IC having functions of, for example, a signal line driver circuit that is a display driver circuit for performing display and a touch sensor driver circuit for processing a signal obtained by the conductive layer 385 provided in the y direction can be used.

The wiring 383 has a function of supplying a signal or electric power to the display portion 381, the driver circuit 382, the driver circuit 384, or the like. The signal or the electric power is input to the wiring 383 from the outside through the FPC 373 or from the IC 374.

The driver circuit 384 can be a touch sensor driver circuit for driving the conductive layer 385 provided in the x direction, for example. The driver circuit 384 can be omitted when the IC 374 also serves the function thereof.

The touch sensor includes the conductive layer 385 and the conductive layer 386 which are provided over the substrate 371. In other words, the conductive layer 385 or the conductive layer 386 can function as the driving electrode (Tx) or the sensing electrode (Rx). The touch sensor can perform sensing by utilizing capacitance formed between the conductive layer 385 and the conductive layer 386.

With such a structure, components for performing display, such as a transistor, an EL element, and a driver circuit, and components for performing touch sensing, such as an electrode and a driver circuit, can be provided only on one substrate side (here, the substrate 371 side). Thus, functions can be shared; for example, the display driver circuit and the touch sensor driver circuit can be integrated.

<Schematic Perspective View of Hybrid in-Cell Touch Panel>

FIG. 6(A) is a schematic perspective view of a touch panel 320 of one embodiment of the present invention, which has a structure different from that in FIG. 5(A). The touch panel 320 is a hybrid in-cell touch panel. FIG. 6(B) is a developed view of the schematic perspective view of FIG. 6(A). Note that only typical components are illustrated for simplicity.

The touch panel 320 includes the substrate 371 and the substrate 372 which are provided to face each other as in FIGS. 5(A) and (B) which illustrate the full in-cell type.

Over the substrate 371, the display portion 381, the driver circuit 382, the wiring 383, the driver circuit 384, and the like are provided as in FIGS. 5(A) and (B) which illustrate the full in-cell type. In the display portion 381, the conductive layer 385 is formed in the x direction as in FIGS. 5(A) and (B) which illustrate the full in-cell type.

Over the substrate 372, unlike in FIGS. 5(A) and (B) which illustrate the full in-cell type, a plurality of conductive layers 386 and the like are formed in the direction orthogonal to the conductive layer 385, i.e., in the y direction. Over the substrate 372, unlike in FIGS. 5(A) and (B) which illustrate the full in-cell type, the conductive layer 387 and the like are formed. The conductive layer 387 is electrically connected to any of the plurality of conductive layers 386. The conductive layer 387 is electrically connected to the FPC 373 through a connection portion 388 and through a connection portion 389 provided on the substrate 371 side.

The display portion 381 includes at least a plurality of pixels as in FIGS. 5(A) and (B) which illustrate the full in-cell type. The pixel includes a transistor and an EL element.

As in FIGS. 5(A) and (B) which illustrate the full in-cell type, the driver circuit 382 can be a scan line driver circuit that is a display driver circuit which displays an image, for example.

Over the substrate 371, as in FIGS. 5(A) and (B) which illustrate the full in-cell type, the FPC 373 electrically connected to the wiring 383 is provided. In the example illustrated in FIGS. 6(A) and (B), the IC 374 is provided over the FPC 373.

In the example illustrated in FIGS. 6(A) and (B), as in FIGS. 5(A) and (B) which illustrate the full in-cell type, the IC 374 is mounted on the FPC 373 by a COF (Chip On Film) method. As the IC 374, an IC having functions of, for example, a signal line driver circuit that is a display driver circuit for performing display and a touch sensor driver circuit for processing a signal obtained by the conductive layer 385 provided in the y direction can be used.

The wiring 383 has a function of supplying a signal or electric power to the display portion 381, the driver circuit 382, the driver circuit 384, or the like as in FIGS. 5(A) and (B) which illustrate the full in-cell type. The signal or the electric power is input to the wiring 383 from the outside through the FPC 373 or from the IC 374.

As in FIGS. 5(A) and (B) which illustrate the full in-cell type, the driver circuit 384 can be a touch sensor driver circuit for driving the conductive layer 385 provided in the x direction. The driver circuit 384 can be omitted when the IC 374 also serves the function thereof.

Unlike in FIGS. 5(A) and (B) which illustrate the full in-cell type, the touch sensor includes the conductive layer 385 provided over the substrate 371 and the conductive layer 386 provided over the substrate 372. In other words, the conductive layer 385 or the conductive layer 386 can function as the driving electrode (Tx) or the sensing electrode (Rx). The touch sensor can perform sensing by utilizing the capacitance formed between the conductive layer 385 and the conductive layer 386.

With such a structure, even in the case where electrodes included in the touch sensor are formed over different substrates, components for performing display, such as a transistor, an EL element, and a driver circuit, and components for performing touch sensing, such as an electrode and a driver circuit, can be provided only on one substrate side (here, the substrate 371 side). Thus, functions can be shared; for example, the display driver circuit and the touch sensor driver circuit can be integrated.

<Structural Example of Block Diagram of Touch Panel>

A structural example of a block diagram of a touch panel of one embodiment of the present invention will be described below. Note that the block diagram of the touch panel described below can be applied to a full in-cell touch panel or a hybrid in-cell touch panel.

Figure 7:
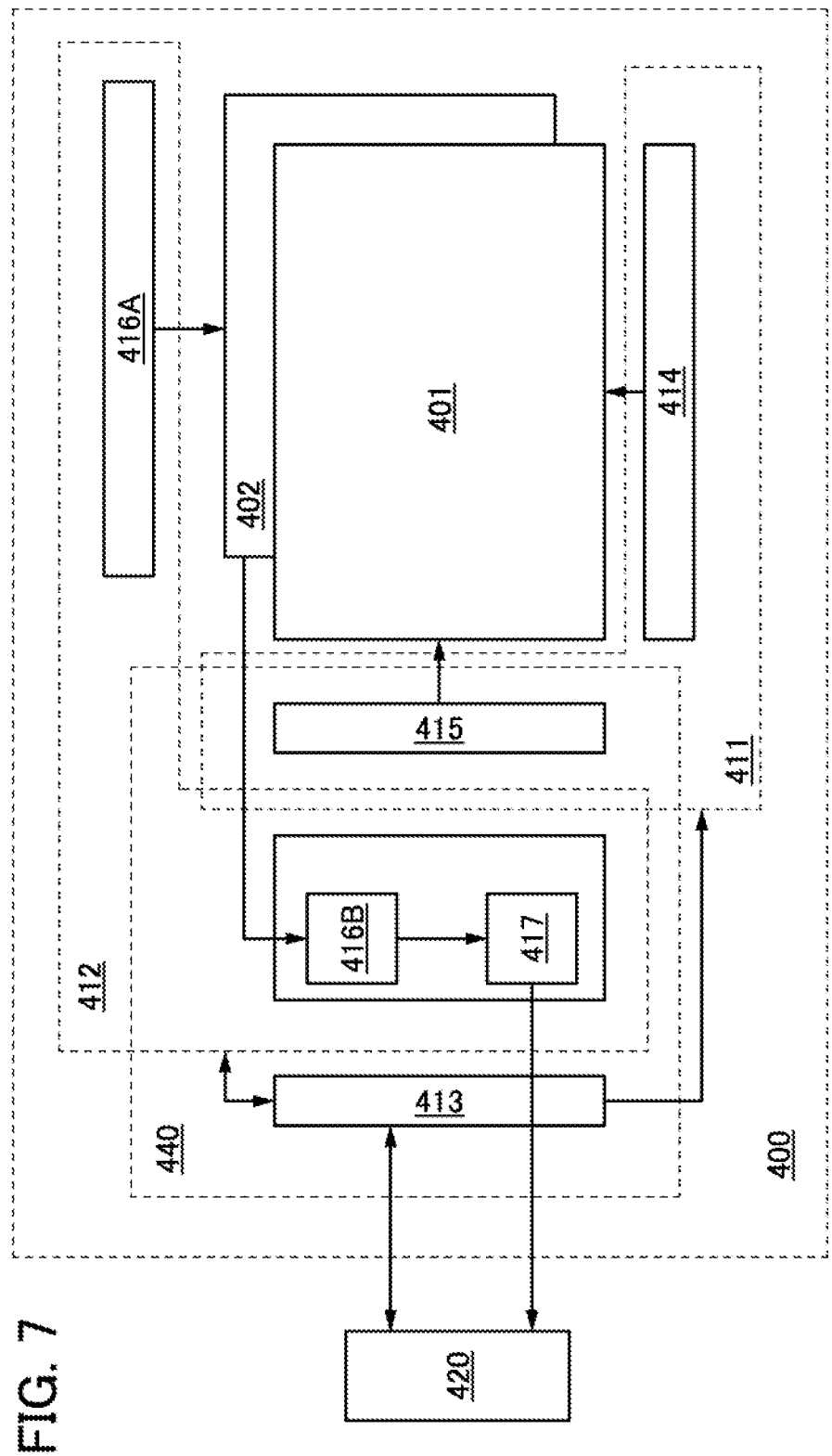
FIG. 7 A block diagram for illustrating one embodiment of the present invention.

FIG. 7 is a block diagram of a touch panel and its peripheral circuits. A touch panel 400 includes a display portion 401 and a touch sensor portion 402. Furthermore, the touch panel 400 includes, as examples of peripheral circuits for driving the display portion 401 and the touch sensor portion 402, a display driver circuit 411, a touch sensor driver circuit 412, and a timing controller 413. As another peripheral circuit, a power supply circuit or the like for generating a power supply voltage needed for the display portion 401 and the touch sensor portion 402 may also be provided.

The display driver circuit 411 includes a scan line driver circuit 414 and a signal line driver circuit 415, for example. The scan line driver circuit 414 and the signal line driver circuit 415 are capable of controlling display by sequentially driving pixels (not illustrated) provided in a matrix in the display portion 401.

Note that in the case where the number of pixels or the frame frequency is increased, two or more scan line driver circuits 414 and signal line driver circuits 415 may be provided and the pixels may be divided into a plurality of display regions to be controlled on a region basis. With such a structure, the definition of a displayed image, the signal writing speed, or the like can be higher.

The touch sensor driver circuit 412 includes analog circuits 416A and 416B and a digital signal processing circuit 417, for example. The analog circuits 416A and 416B mainly process an analog signal. The digital signal processing circuit 417 mainly processes a digital signal.

The analog circuit 416A has a function of applying a pulse voltage to the driving electrode (Tx) side of the touch sensor portion 402, for example. As the analog circuit 416A, a level shifter circuit, a buffer circuit, or the like can be used.

The analog circuit 416B has a function of, for example, receiving an analog signal from the sensing electrode (Rx) side of the touch sensor portion 402 and converting it into a digital signal. As the analog circuit 416B, an integrator circuit, a sample-and-hold circuit, an A/D (analog/digital) converter, or the like can be used.

The digital signal processing circuit 417 is a circuit that performs signal processing such as noise removal from a digital signal output from the analog circuit 416B, sensing of a touch position, and tracking of the touch position, for example. As the digital signal processing circuit 417, a circuit only for signal processing, such as an ASIC (Application Specific Integrated Circuit) or an FPGA (Field Programmable Gate Array), can be used. Data that can be obtained by signal processing in the digital signal processing circuit 417 can be output to a host controller 420 that is positioned outside the touch panel 400.

The timing controller 413 is, for example, a circuit that receives a video signal or the like from the host controller 420 and generates a signal for controlling the display driver circuit 411, such as a clock signal, a vertical synchronization signal, or a horizontal synchronization signal. Furthermore, the timing controller 413 is, for example, a circuit that receives a signal from the host controller 420 and generates a signal for controlling the touch sensor driver circuit 412, or the like.

Note that a variety of signals received from the outside host controller 420 can be input to the timing controller 413 through an interface such as a DVI (Digital Visual Interface), an LVDS (Low Voltage Differential Signaling), or an RSDS (Reduced Swing Differential Signaling).

The host controller 420 is a circuit for receiving and sending a variety of signals from/to the peripheral circuits of the touch panel. For example, the host controller 420 includes an arithmetic circuit or a frame memory, and receives and sends signals from/to the touch panel 400 or another device.

When some circuits of the display driver circuit 411, the touch sensor driver circuit 412, and the timing controller 413 described above are formed using an integrated circuit (IC: Integrated Circuit) that is formed on a silicon substrate, they can be provided over a substrate where the touch panel 400 is provided, an FPC (Flexible Printed Circuit) connected to the substrate where the touch panel 400 is provided, or the like. Thus, in the block of the touch panel 400 in FIG. 7, an IC 440 includes the signal line driver circuit 415, the analog circuit 416B, the digital signal processing circuit 417, and the timing controller 413.

When an IC has a function of driving the display portion 401 and a function of driving the touch sensor portion 402 as described above, the number of ICs mounted on the touch panel 400 can be reduced; accordingly, cost can be reduced.

Figure 8A:
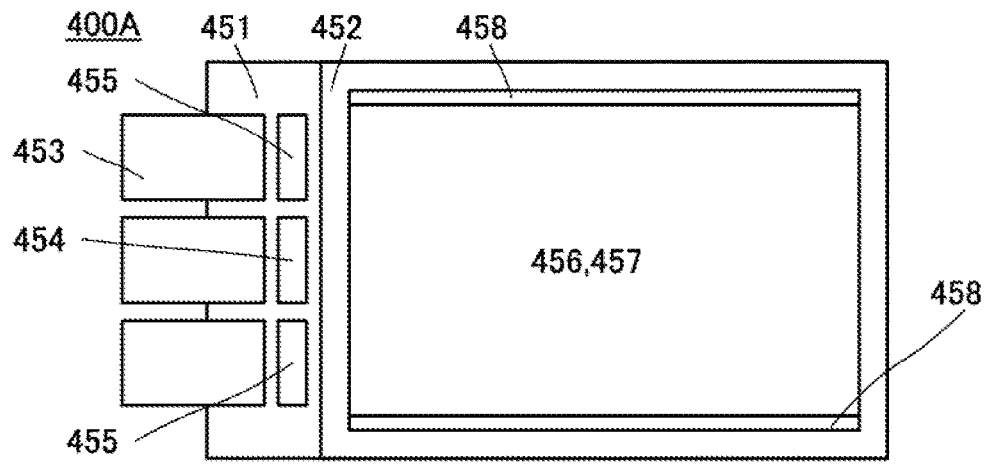
FIG. 8 Block diagrams for illustrating embodiments of the present invention.

FIGS. 8(A), (B), and (C) are each a schematic diagram illustrating an example of mounting an IC on a touch panel.

In FIG. 8(A), a touch panel module 400A includes a substrate 451, a counter substrate 452, a plurality of FPCs 453, an IC 454, ICs 455, and the like. A display portion 456, a touch sensor portion 457, and scan line driver circuits 458 are provided between the substrate 451 and the counter substrate 452. The IC 454 and the ICs 455 are mounted on the substrate 451 by a COG (Chip On Glass) method or the like.

The IC 454 includes a circuit functioning as the signal line driver circuit 415 in the IC 440 illustrated in FIG. 7. The IC 454 further includes circuits functioning as the analog circuit 416B, the digital signal processing circuit 417, and the timing controller 413 in the IC 440 illustrated in FIG. 7. The IC 454 and the ICs 455 are supplied with signals from the outside through the FPCs 453. Furthermore, signals can be output to the outside from the IC 454 and the ICs 455 through the FPCs 453.

FIG. 8(A) illustrates an example in which the display portion 456 is positioned between two scan line driver circuits 458. The ICs 455 are provided in addition to the IC 454. Such a structure is preferable in the case where pixels are arranged with high density in the display portion 456.

Figure 8B:
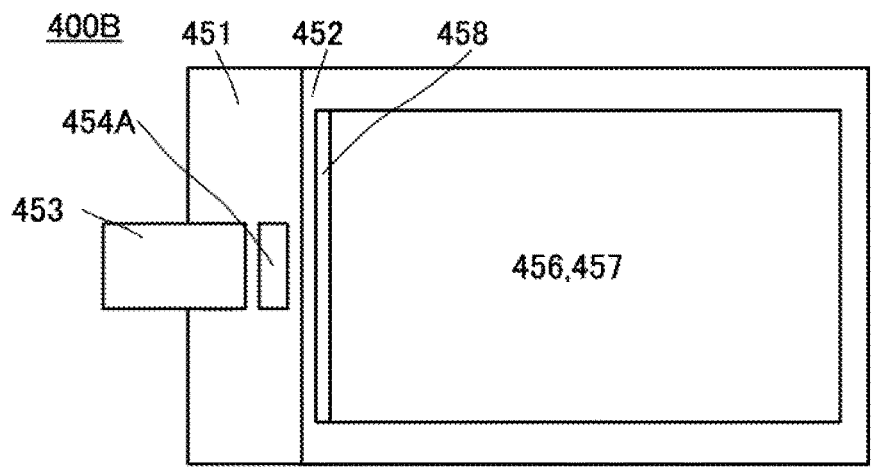

FIG. 8(B) illustrates an example in which one IC 454A and one FPC 453 are mounted on a touch panel module 400B. The IC 454A includes circuits functioning as the signal line driver circuit 415, the analog circuit 416B, the digital signal processing circuit 417, and the timing controller 413 in the IC 440 illustrated in FIG. 7. It is preferable to bring functions into one IC 454A in this manner because the number of components can be reduced. In the example of FIG. 8(B), the scan line driver circuit 458 is provided along a side on the FPC 453 side of two short sides of the display portion 456.

Figure 8C:
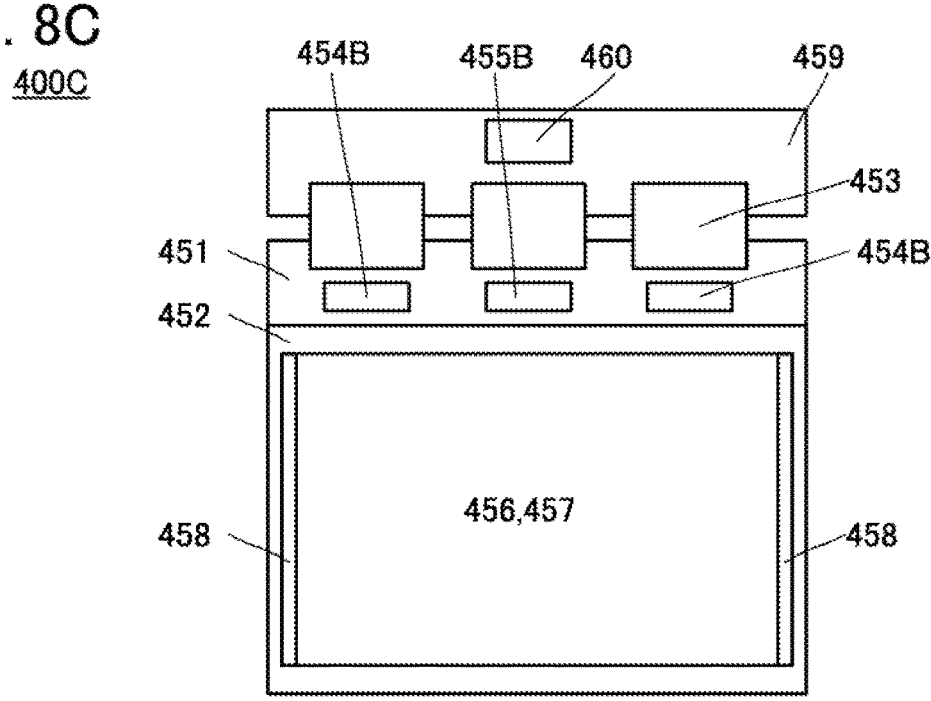

FIG. 8(C) illustrates an example of the structure including a PCB (Printed Circuit Board) 459 on which an IC 460 having some functions of the IC 454 and the IC 454A illustrated in FIGS. 8(A) and (B) or the like is mounted. ICs 454B and an IC 455B on the substrate 451 are electrically connected to the PCB 459 through the FPCs 453.

In FIGS. 8(A), (B), and (C), the ICs 454, 454A, and 454B, the IC 455, and the IC 455B may be mounted on the FPC 453, not on the substrate 451. For example, the C454, 454A, and 454B, the IC 455, and the IC 455B may be mounted on the FPC 453 by a mounting method such as a COF (Chip On Film) method or a TAB (Tape Ammounted Bonding) method.

A structure where the FPC 453 and the ICs 454 and 454A are provided on a short side of the display portion 456 as illustrated in FIGS. 8(A) and (B) enables the frame of the display device to be narrowed; thus, the structure is preferably used for electronic devices such as smartphones, mobile phones, and tablet terminals, for example. The structure with the PCB 459 illustrated in FIG. 8(C) can be preferably used for television devices, monitors, tablet terminals, or laptop personal computers, for example.

<Structural Example of Cross-Sectional View of Touch Panel>

Cross-sectional views of a touch panel of one embodiment of the present invention are described below to give a plurality of examples of full in-cell touch panels and hybrid in-cell touch panels. Cross-sectional structural examples 1 to 4 described below correspond to full in-cell touch panels, and Cross-sectional structural examples 5 and 6 correspond to hybrid in-cell touch panels.

<Cross-Sectional Structural Example 1>

Figure 9:
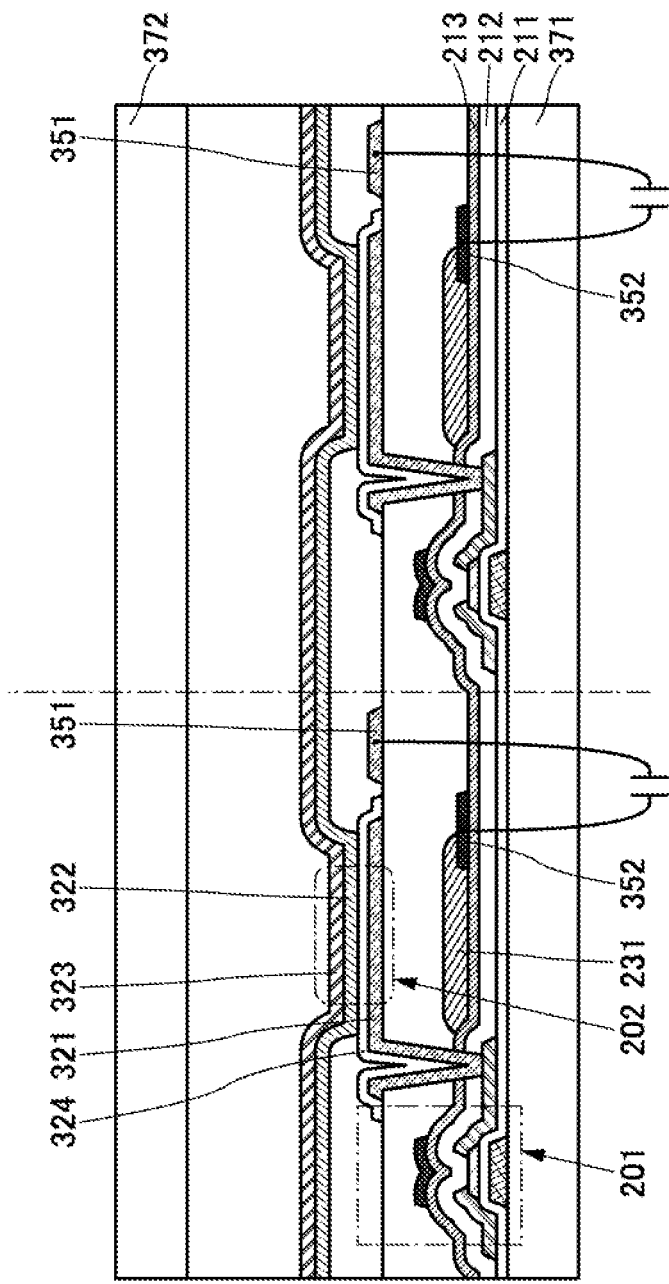
FIG. 9 A cross-sectional view for illustrating one embodiment of the present invention.

A touch panel illustrated in FIG. 9 has a function of a full in-cell touch panel. FIG. 9 illustrates a cross-sectional structural example of a region including two sub-pixels. The structure in FIG. 9 includes a bottom emission light-emitting device which emits light to a side of a substrate (element substrate) that is provided with the transistor 201 and the like.

The touch panel includes a light-emitting element 202. The light-emitting element 202 includes a conductive layer 321 (pixel electrode), an EL layer 322, and a conductive layer 323 (common electrode) which are stacked. An optical adjustment layer 324 may be provided between the conductive layer 321 and the conductive layer 323. Light is emitted from the light-emitting element 202 to the substrate 371 side. The conductive layer 321 has a function of the pixel electrode and a function of an anode of the light-emitting element 202. The conductive layer 323 has a function of the common electrode and a function of a cathode of the light-emitting element 202.

Although a transistor or the like is not illustrated on the substrate 372 (counter substrate) side, a transistor or the like may be formed. A drying agent or the like may be provided between the light-emitting element 202 and the substrate 372. Alternatively, a structure filled with a filler such as a heat curable resin or the like to prevent entry of moisture from the outside and to enhance impact resistance may be used.

The conductive layer 321 preferably has a light-transmitting property. The conductive layer 323 preferably has reflectivity.

A coloring layer 231 is provided closer to the substrate 371 than the light-emitting element 202. In the structure illustrated in FIG. 9, the coloring layer 231 is provided over the insulating layer 213.

One of a conductive layer 351 and a conductive layer 352 functions as one electrode of the touch sensor, and the other functions as the other electrode of the touch sensor. The conductive layer 351 is formed on the same plane as the conductive layer 321. The conductive layer 352 is formed on the same plane as one of two gate electrodes of the transistor 201. Accordingly, the touch panel can be manufactured without an increase in manufacturing steps.

As illustrated in FIG. 9, sensing can be performed by utilizing capacitance formed between the conductive layer 351 and the conductive layer 352 on the substrate 371 side.

<Cross-Sectional Structural Example 2>

Figure 10:
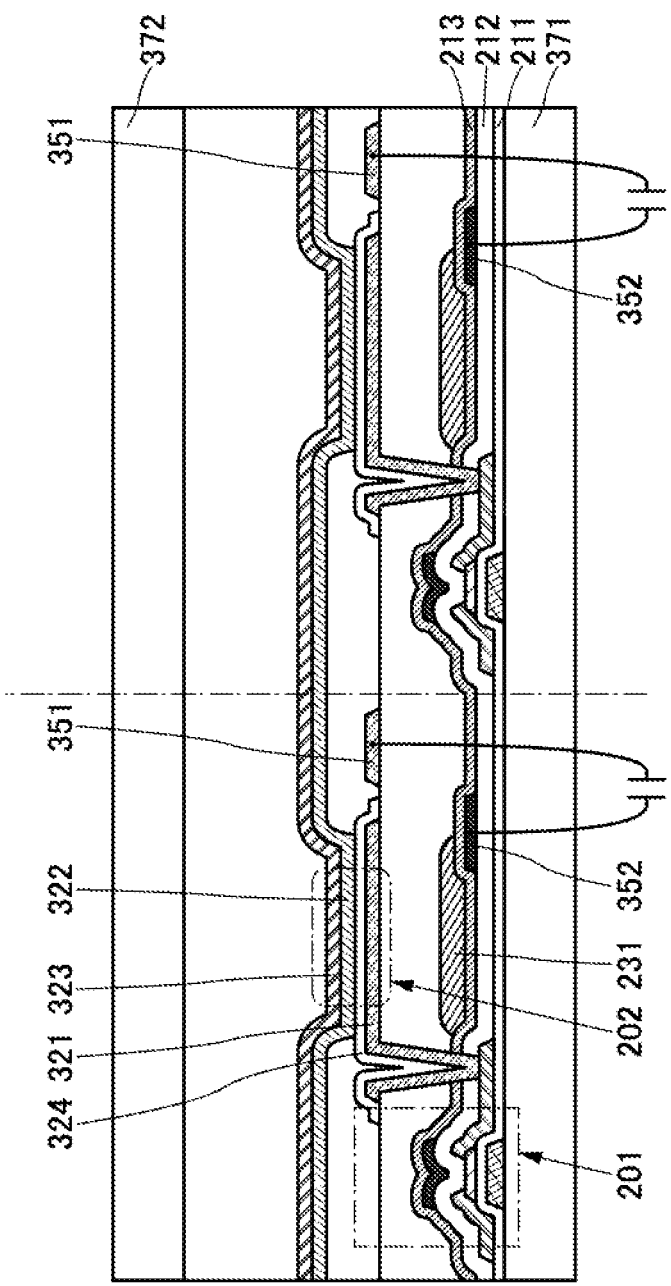
FIG. 10 A cross-sectional view for illustrating one embodiment of the present invention.

FIG. 10 is different from FIG. 9 in the position of the conductive layer 352. In FIG. 10, the conductive layer 352 and one of the gate electrodes of the transistor 201 are provided between the insulating layer 212 and the insulating layer 213.

Figure 11:
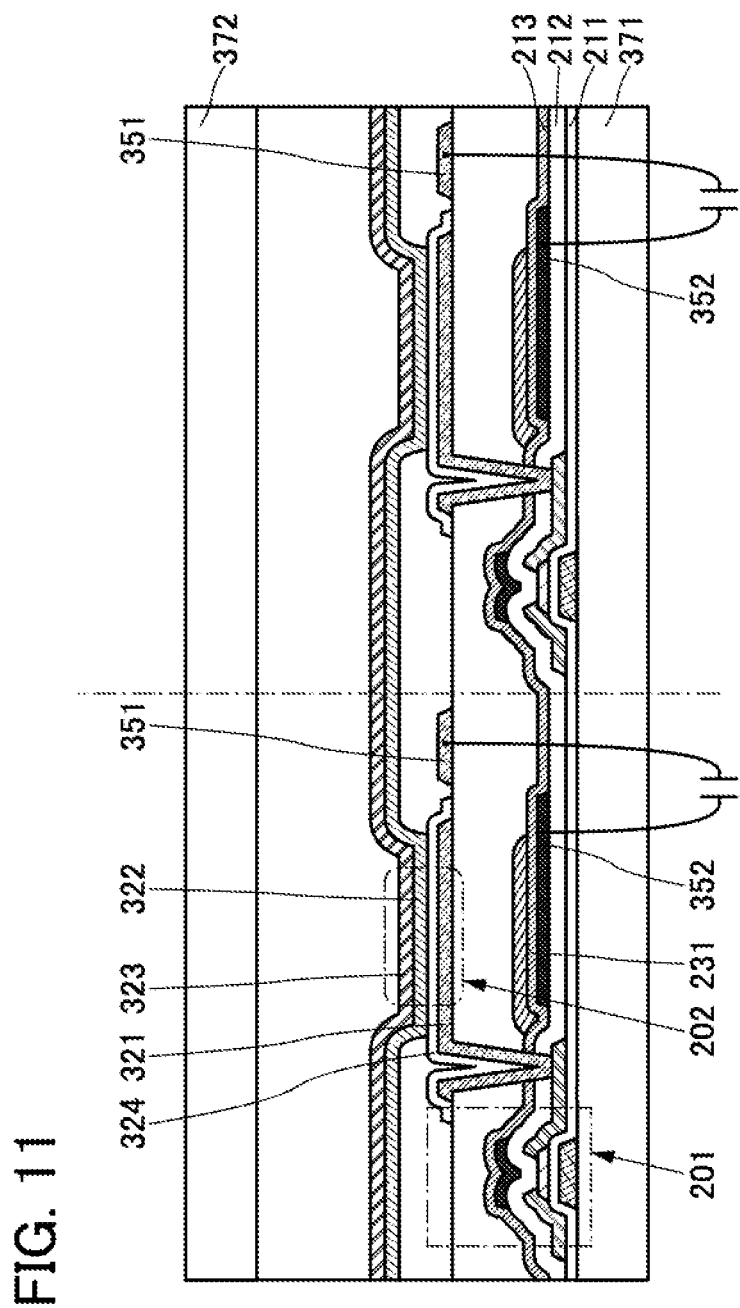
FIG. 11 A cross-sectional view for illustrating one embodiment of the present invention.
Figure 12:
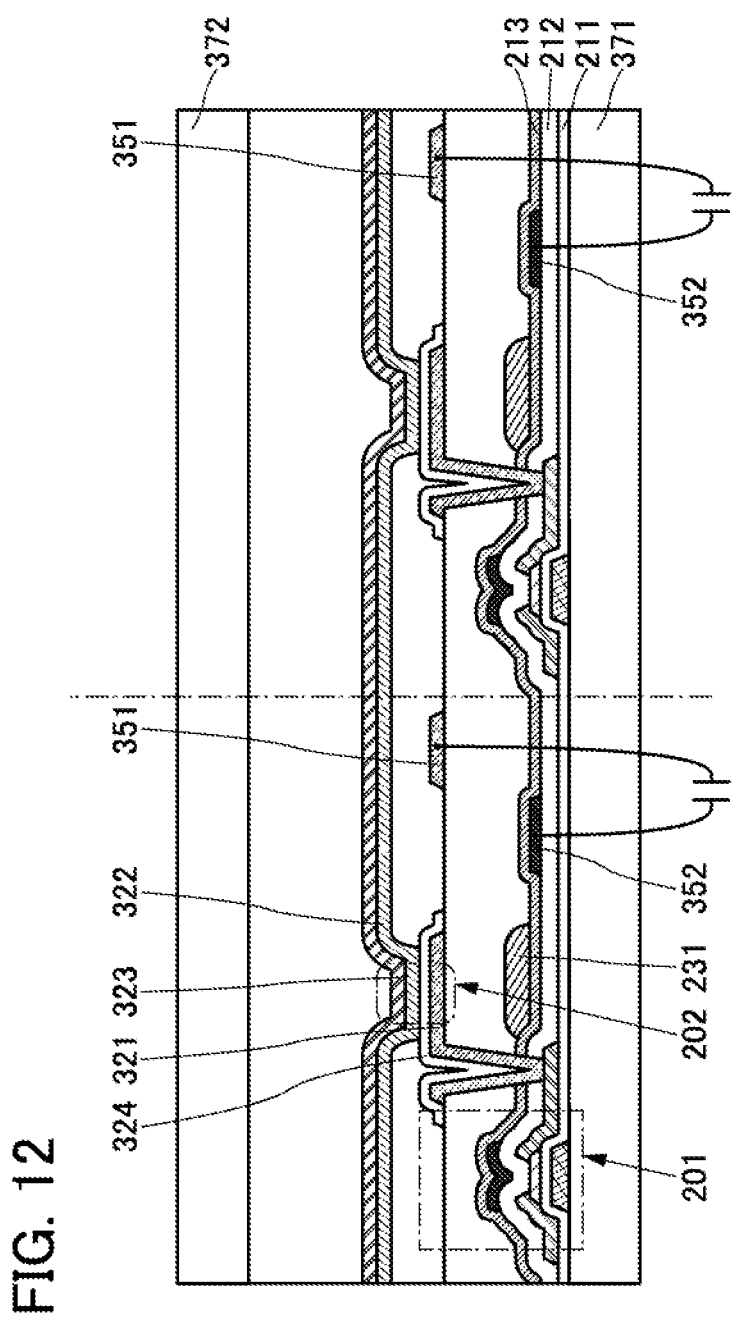
FIG. 12 A cross-sectional view for illustrating one embodiment of the present invention.

As illustrated in FIG. 11, the conductive layer 352 may be provided so as to overlap with at least one of the conductive layer 321, the optical adjustment layer 324, the EL layer 322, the conductive layer 323, and the coloring layer 231. As illustrated in FIG. 12, the conductive layer 352 may be provided so as not to overlap with the conductive layer 321, the optical adjustment layer 324, the EL layer 322, the conductive layer 323, and the coloring layer 231.

<Cross-Sectional Structural Example 3>

Figure 13:
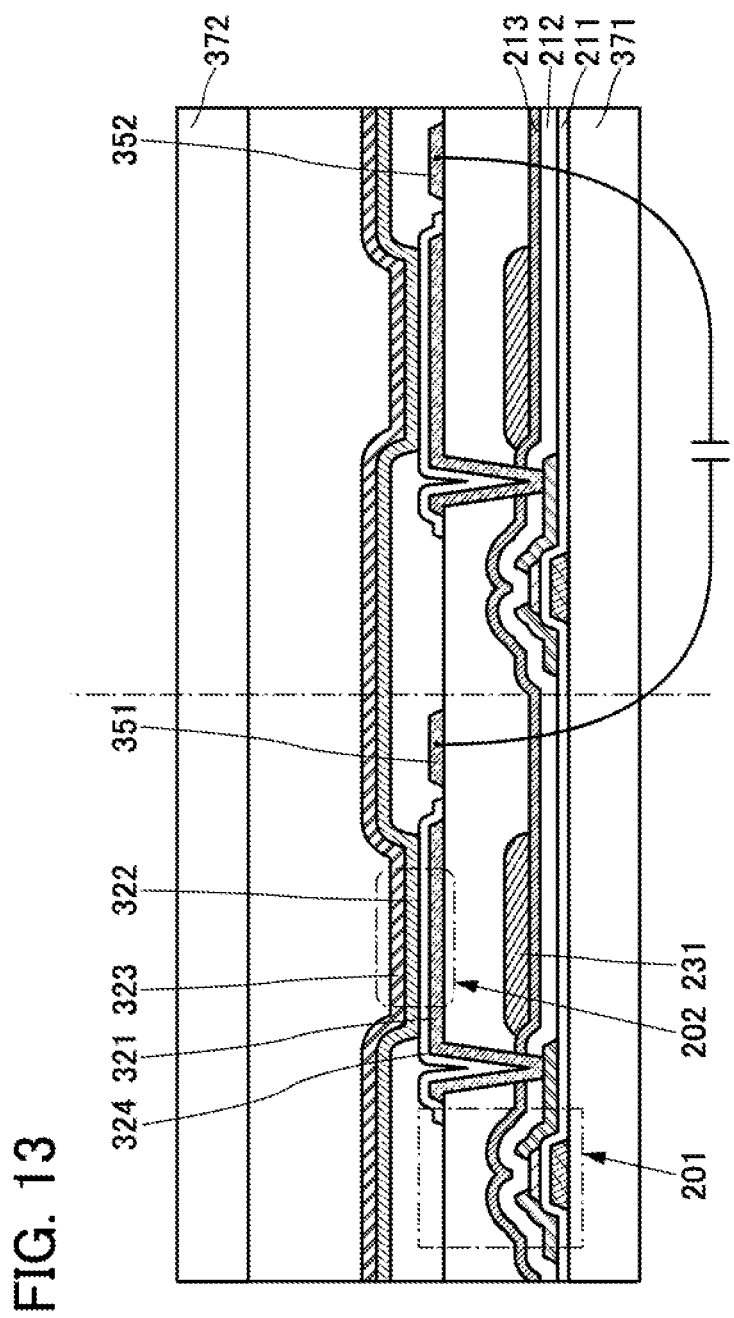
FIG. 13 A cross-sectional view for illustrating one embodiment of the present invention.

In an example illustrated in FIG. 13, both the conductive layer 351 and the conductive layer 352 included in the touch sensor are formed on the same plane as the conductive layer 321.

Here, sensing can be performed by utilizing the capacitance formed between the conductive layer 351 in one sub-pixel and the conductive layer 352 in another sub-pixel.

<Cross-Sectional Structural Example 4>

Figure 14:
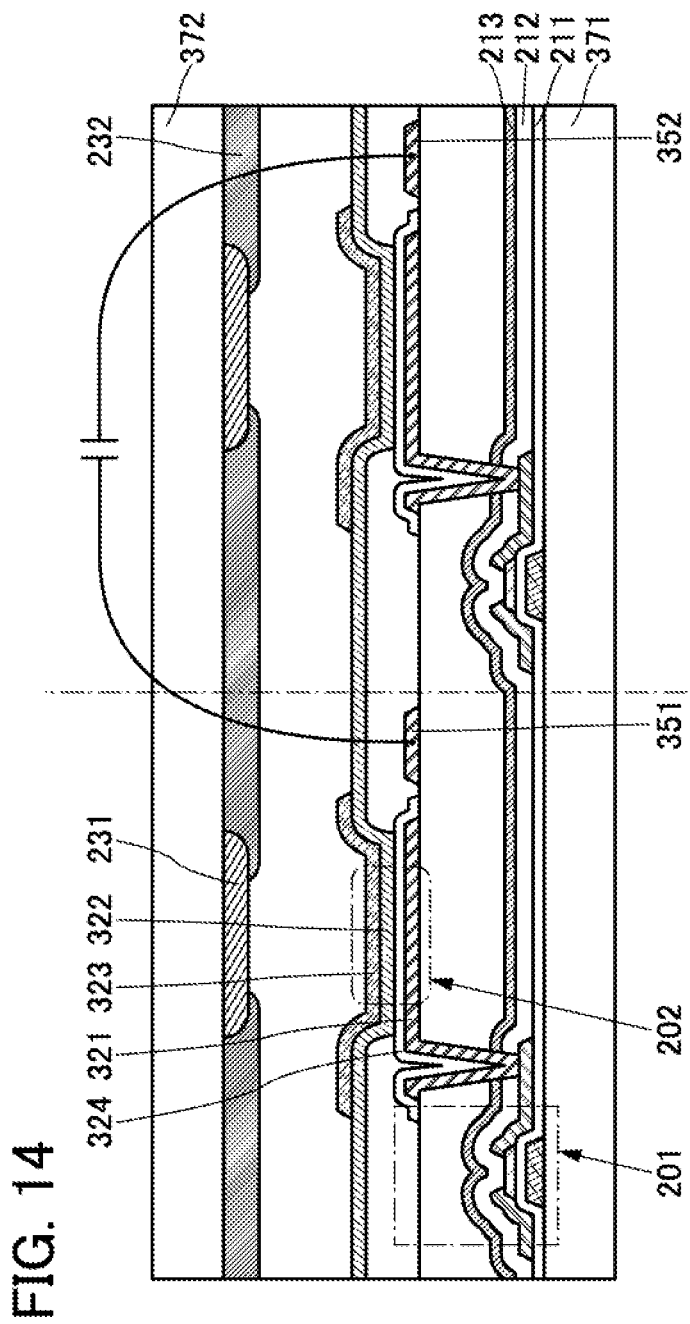
FIG. 14 A cross-sectional view for illustrating one embodiment of the present invention.

FIG. 14 illustrates a cross-sectional structural example of a touch panel including a top emission light-emitting device which emits light through the substrate 372.

In the light-emitting element 202, the conductive layer 321 has reflectivity, and the conductive layer 323 has a light-transmitting property.

The conductive layer 323 includes an opening at least in a region which overlaps with part of the conductive layer 351. Furthermore, the conductive layer 323 may have a slit or an opening, or may have a comb-like shape.

The conductive layer 351 and the conductive layer 352 are formed on the same plane as the conductive layer 321.

In the example illustrated in FIG. 14, sensing can be performed by utilizing the capacitance formed between the conductive layer 351 in one sub-pixel and the conductive layer 352 in another sub-pixel.

Figure 15:
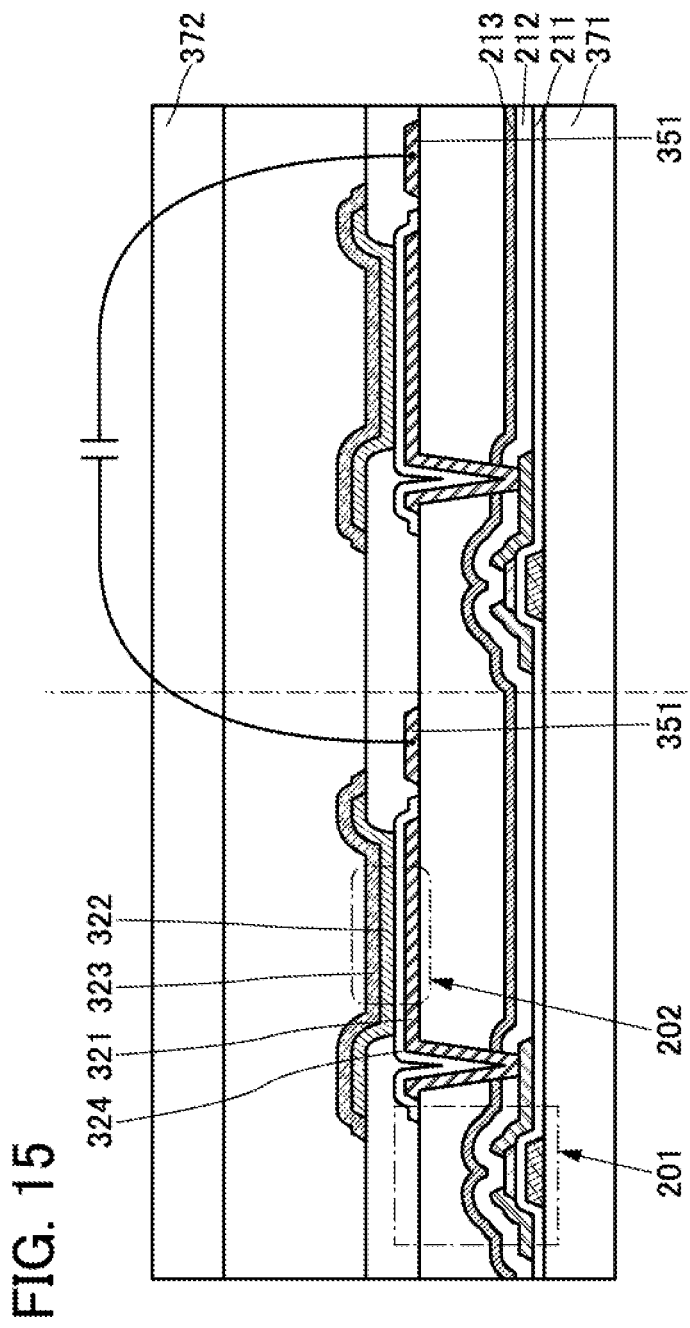
FIG. 15 A cross-sectional view for illustrating one embodiment of the present invention.

FIG. 15 illustrates an example in which the EL layer 322 is formed by a separate coloring method. In that case, an end portion of the EL layer 322 is covered with the conductive layer 323 as illustrated in FIG. 15, so that the diffusion of impurities into the EL layer 322 can be suppressed, leading to higher reliability. In the example illustrated in FIG. 15, the coloring layer 231 and the like are not provided.

<Cross-Sectional Structural Example 5>

Figure 16:
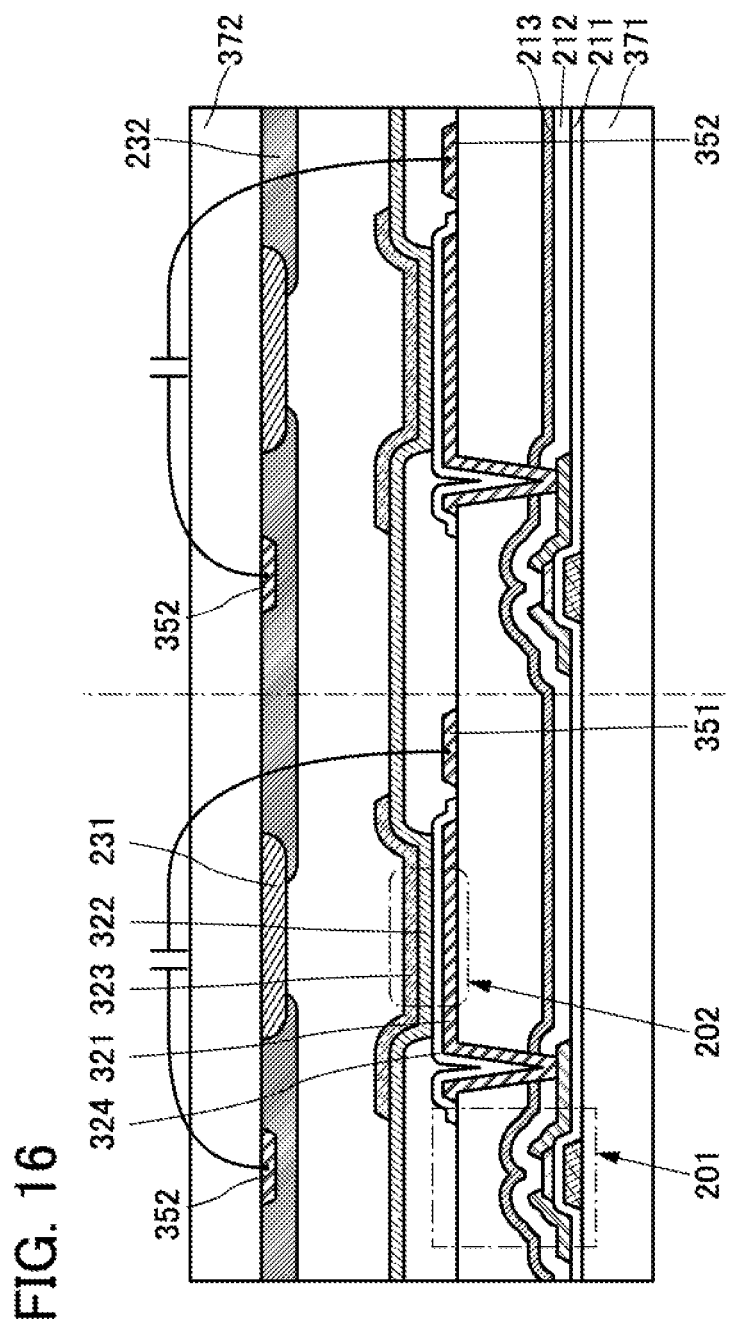
FIG. 16 A cross-sectional view for illustrating one embodiment of the present invention.

FIG. 16 illustrates an example in which the conductive layer 352 included in the touch sensor is formed on one surface on the substrate 372 (counter substrate) side in the structure illustrated in FIG. 14. Furthermore, the structure illustrated in FIG. 16 is a touch panel including a top-emission light-emitting device.

Figure 17:
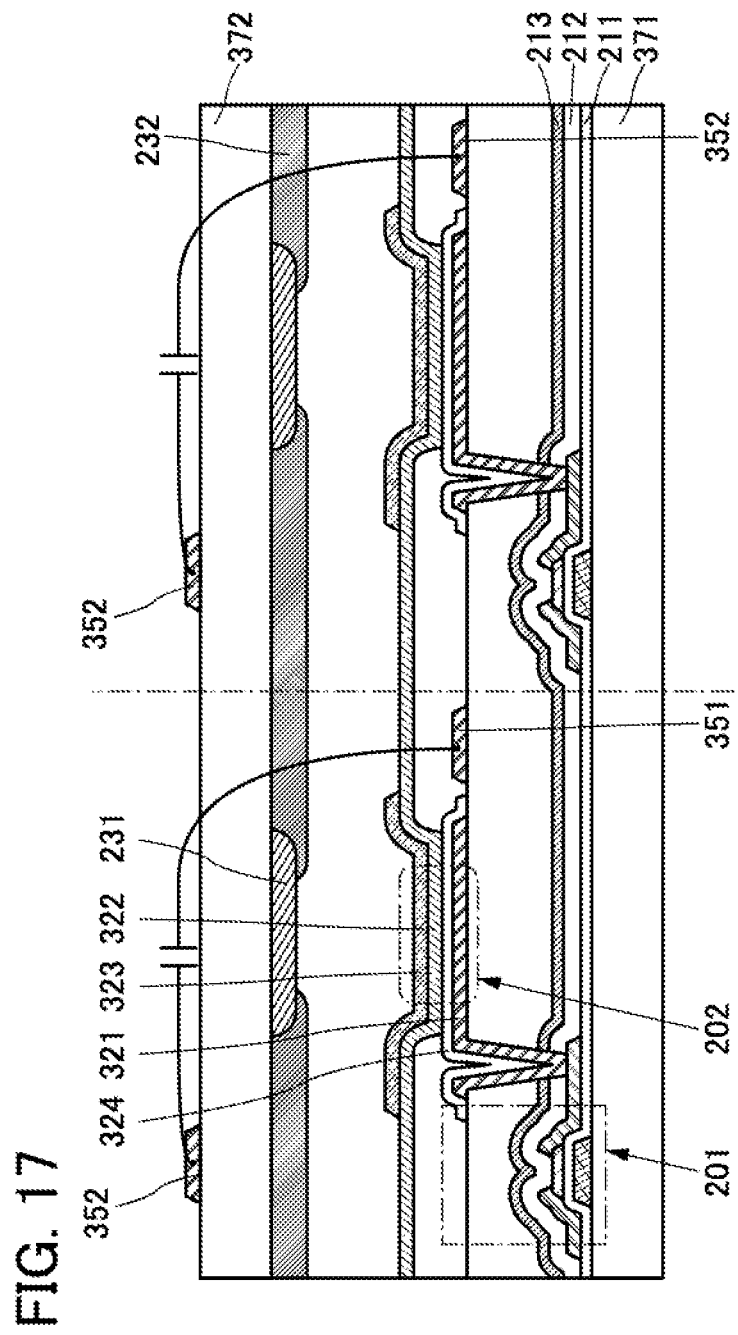
FIG. 17 A cross-sectional view for illustrating one embodiment of the present invention.

Furthermore, the conductive layer 351 included in the touch sensor is formed on the same plane as the conductive layer 321. The conductive layer 323 includes an opening at least in a region which overlaps with part of the conductive layer 351. The conductive layer 352 included in the touch sensor may be formed on an opposite surface on the substrate 372 (counter substrate) side as illustrated in FIG. 17.

Figure 18:
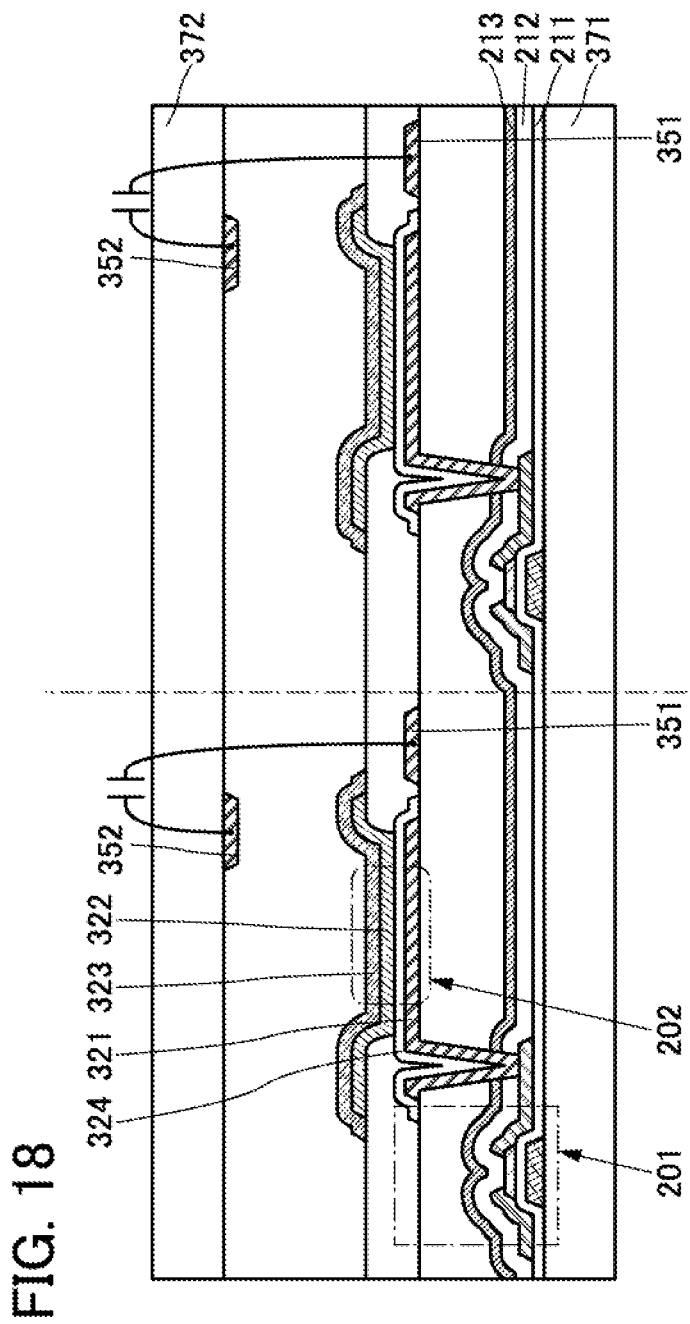
FIG. 18 A cross-sectional view for illustrating one embodiment of the present invention.
Figure 19:
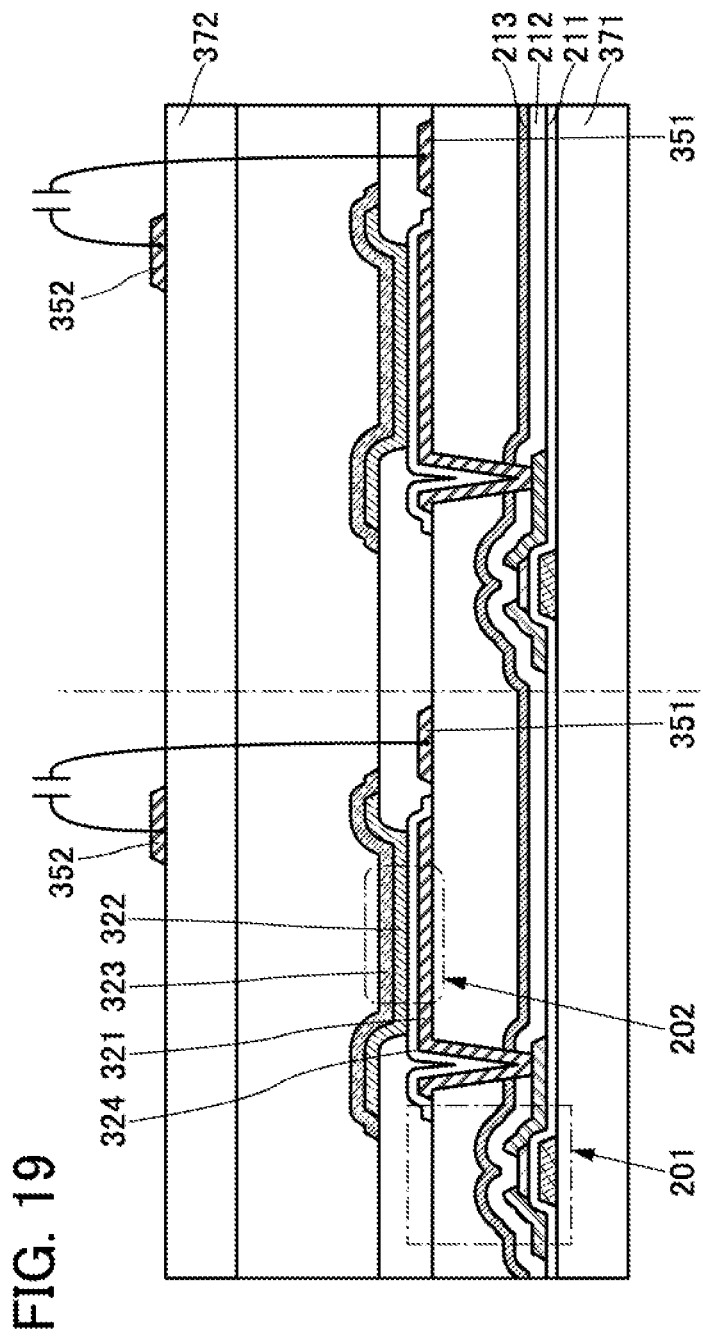
FIG. 19 A cross-sectional view for illustrating one embodiment of the present invention.

FIG. 18 illustrates an example in which the EL layer 322 is formed by a separate coloring method in the structure of FIG. 16. FIG. 19 illustrates an example in which the EL layer 322 is formed by a separate coloring method in the structure of FIG. 17.

<Cross-Sectional Structural Example 6>

Figure 20:
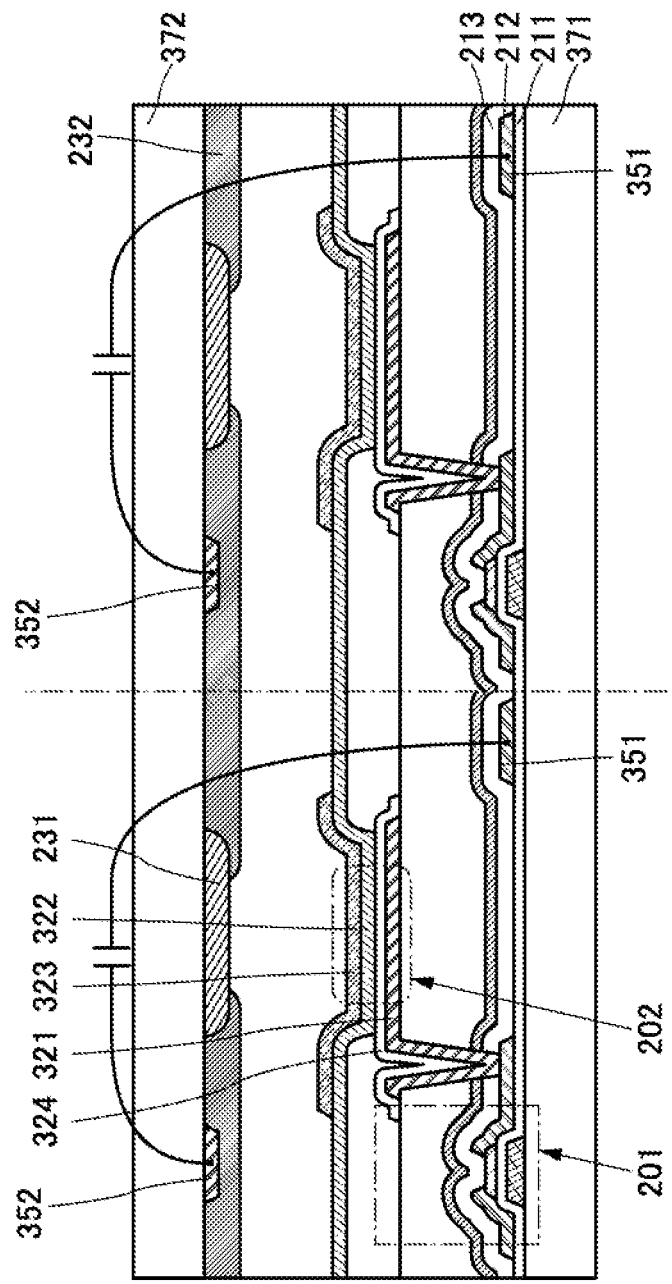
FIG. 20 A cross-sectional view for illustrating one embodiment of the present invention.

FIG. 20 illustrates an example in which the conductive layer 352 included in the touch sensor is formed on one surface on the substrate 372 (counter substrate) side, and the conductive layer 351 included in the touch sensor is formed on the one surface on the substrate 372 (counter substrate) side and is formed on the same plane as an electrode serving as a source or a drain of the transistor 201 in the structure illustrated in FIG. 14. Furthermore, the structure illustrated in FIG. 20 is a touch panel including a top-emission light-emitting device.

Figure 21:
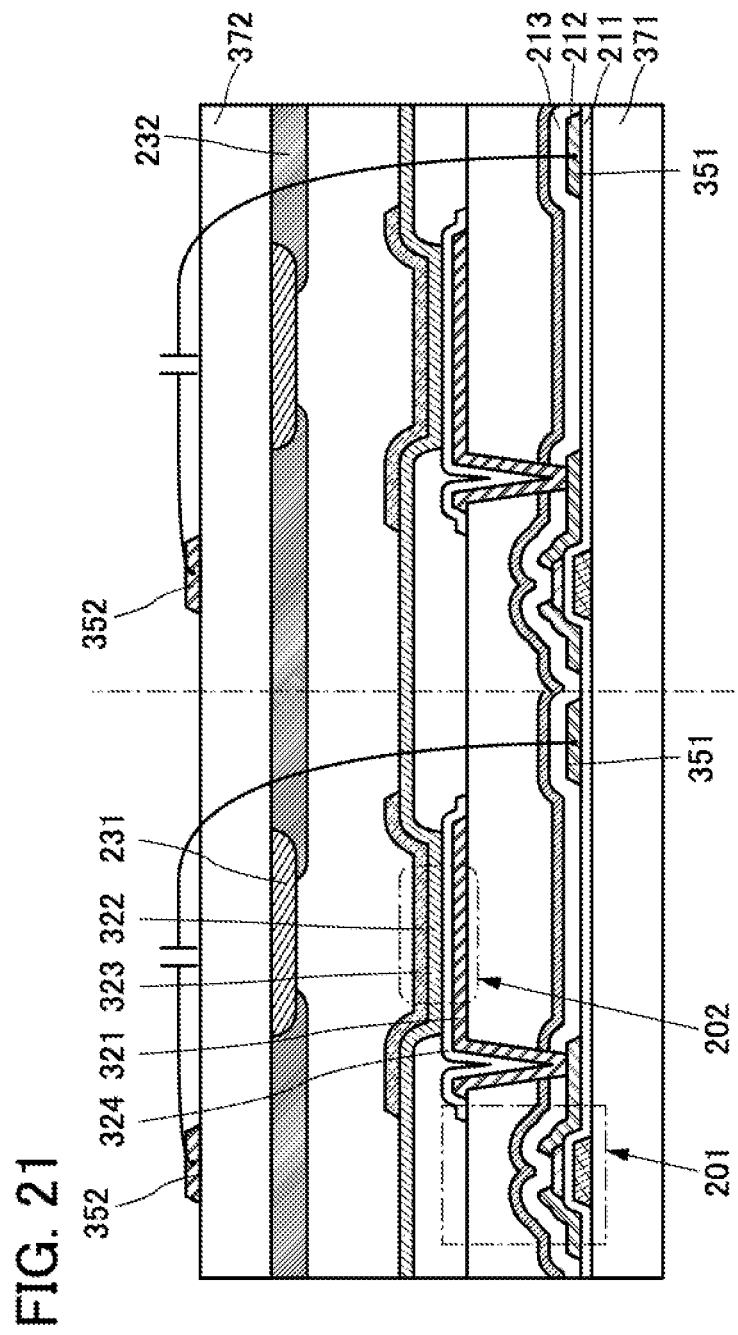
FIG. 21 A cross-sectional view for illustrating one embodiment of the present invention.

Furthermore, the conductive layer 351 included in the touch sensor is formed on the same plane as the conductive layer 321. The conductive layer 323 includes an opening at least in a region which overlaps with part of the conductive layer 351. The conductive layer 352 included in the touch sensor may be formed on an opposite surface on the substrate 372 (counter substrate) side as illustrated in FIG. 21.

Figure 22:
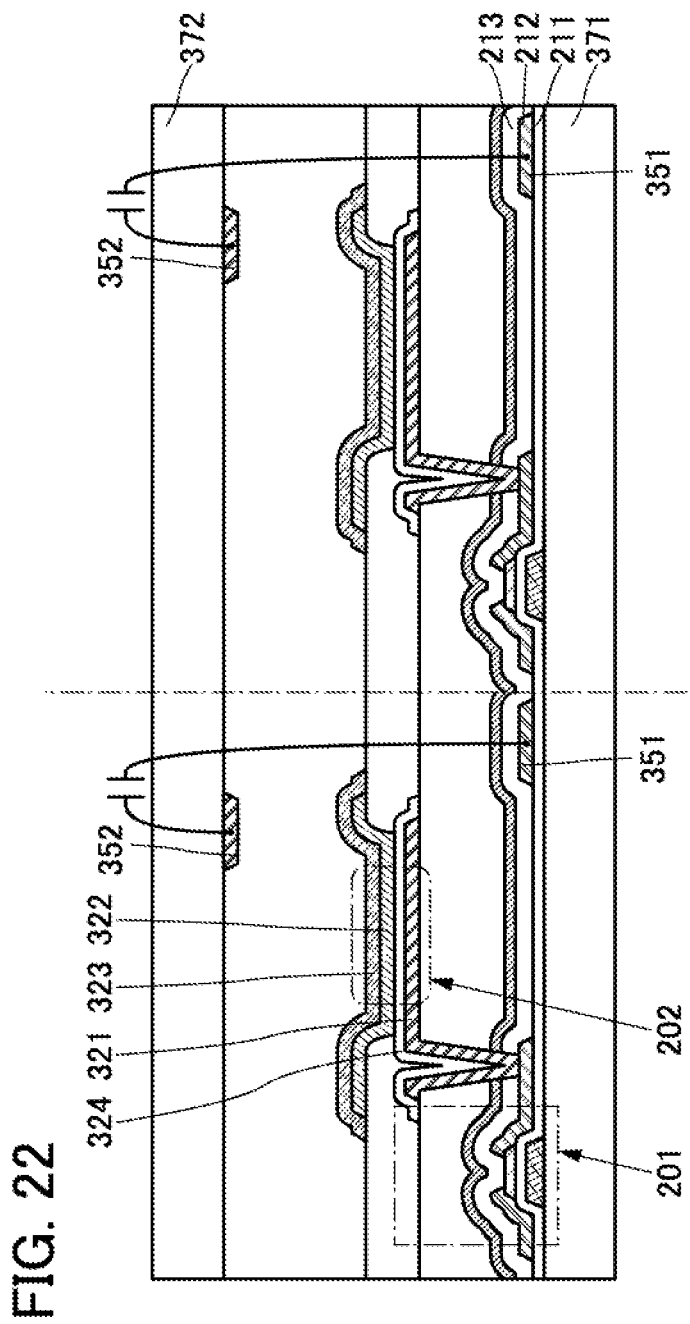
FIG. 22 A cross-sectional view for illustrating one embodiment of the present invention.
Figure 23:
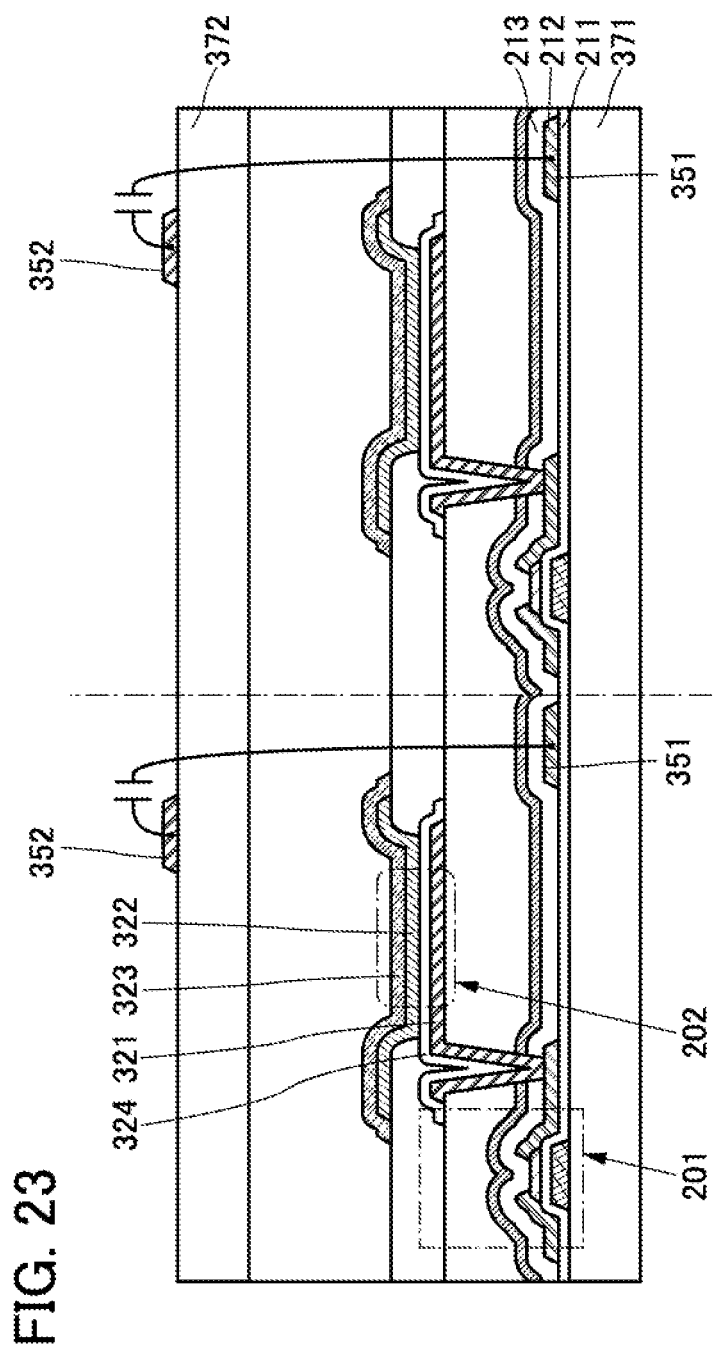
FIG. 23 A cross-sectional view for illustrating one embodiment of the present invention.
Figure 36:
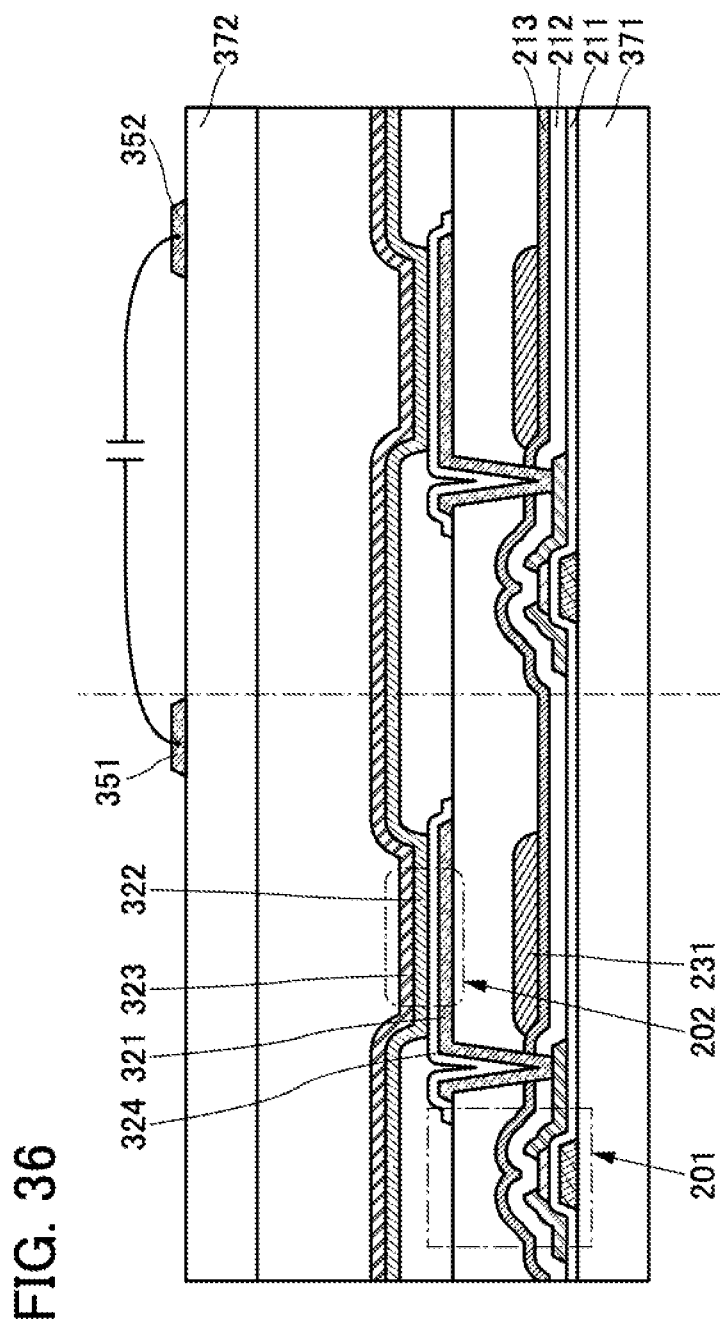
FIG. 36 A cross-sectional view for illustrating one embodiment of the present invention.

FIG. 22 illustrates an example in which the EL layer 322 is formed by a separate coloring method in the structure of FIG. 20. FIG. 23 illustrates an example in which the EL layer 322 is formed by a separate coloring method in the structure of FIG. 21. As illustrated in FIG. 36, the conductive layer 351 and the conductive layer 352 may be provided on the substrate 372 side to form an on-cell type.

<Components>

The above components are described below.

<Substrate>

A material having a flat surface can be used for the substrate included in the touch panel. The substrate through which light emitted from the display element is extracted is formed using a material that transmits the light. For example, a material such as glass, quartz, ceramics, sapphire, or an organic resin can be used. Alternatively, a single crystal semiconductor substrate or a polycrystalline semiconductor substrate made of silicon, silicon carbide, or the like, a compound semiconductor substrate made of silicon germanium or the like, an SOI substrate, or the like may be used. Still alternatively, any of these substrates provided with a semiconductor element may be used as the substrate.

In the case where a glass substrate is used as the substrate, a large glass substrate having any of the following sizes can be used: the 6th generation (1500 mm×1850 mm), the 7th generation (1870 mm×2200 mm), the 8th generation (2200 mm×2400 mm), the 9th generation (2400 mm×2800 mm), and the 10th generation (2950 mm×3400 mm). Thus, a large-sized display device can be manufactured. Alternatively, a flexible substrate may be used as the substrate, and a transistor, a capacitor, or the like may be provided directly over the flexible substrate.

The weight and thickness of the touch panel can be decreased by using a thin substrate. Furthermore, a flexible touch panel can be obtained by using a substrate that has such a thickness to have flexibility.

As glass, for example, alkali-free glass, barium borosilicate glass, aluminoborosilicate glass, or the like can be used.

As materials having flexibility and a light-transmitting property with respect to visible light, glass that has such a thickness to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, a polytetrafluoroethylene (PTFE) resin, and the like are given, for example. In particular, a material whose thermal expansion coefficient is low is preferred, and for example, a polyamide imide resin, a polyimide resin, PET, or the like can be suitably used. A substrate in which a glass fiber is impregnated with an organic resin or a substrate whose thermal expansion coefficient is reduced by mixing an organic resin with an inorganic filler can also be used. A substrate using such a material is lightweight, and thus, a touch panel using this substrate can also be lightweight.

Since the substrate through which light is not extracted does not need to have a light-transmitting property, a metal substrate using a metal material or an alloy material, a ceramic substrate, a semiconductor substrate, or the like can be used as well as the above-described substrates. A metal material and an alloy material, which have high thermal conductivity, are preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, more preferably greater than or equal to 20 μm and less than or equal to 50 μm.

There is no particular limitation on a material of the metal substrate, but it is preferable to use, for example, aluminum, copper, nickel, or a metal alloy such as an aluminum alloy or stainless steel.

In addition, it is preferable to use a substrate subjected to insulation treatment, e.g., a conductive substrate whose surface is oxidized or provided with an insulating film. The insulating film may be formed by, for example, a coating method such as a spin-coating method or a dipping method, an electrodeposition method, an evaporation method, a sputtering method, or the like. An oxide film may be formed on the substrate surface by exposure to or heating in an oxygen atmosphere or by an anodic oxidation method or the like.

The flexible substrate may have a stacked structure of a layer of any of the above-mentioned materials and a hard coat layer (e.g., a silicon nitride layer) which protects a surface of the touch panel from damage or the like, a layer (e.g., an aramid resin layer) which can disperse pressure, or the like. Furthermore, to suppress a decrease in the lifetime of the display element due to moisture or the like, an insulating film with low water permeability, such as a film containing nitrogen and silicon such as a silicon nitride film or a silicon oxynitride film, or a film containing nitrogen and aluminum such as an aluminum nitride film, may be provided.

The substrate may be formed by stacking a plurality of layers. In particular, when a structure including a glass layer is used, a barrier property against water and oxygen can be improved and thus a highly reliable touch panel can be provided.

For example, a substrate in which a glass layer, an adhesive layer, and an organic resin layer are stacked in this order from the side closer to a display element can be used. The thickness of the glass layer is greater than or equal to 20 μm and less than or equal to 200 μm, preferably greater than or equal to 25 μm and less than or equal to 100 μm. With such a thickness, the glass layer can have both a high barrier property against water and oxygen and high flexibility. In addition, the thickness of the organic resin layer is greater than or equal to 10 μm and less than or equal to 200 μm, preferably greater than or equal to 20 μm and less than or equal to 50 μm. Providing such an organic resin layer, occurrence of a crack or a break in the glass layer can be suppressed and mechanical strength can be improved. With such a substrate that includes such a composite material of a glass material and an organic resin, a highly reliable and flexible touch panel can be provided.

<Transistor>

The transistors each include a conductive layer functioning as a gate electrode, the semiconductor layer, a conductive layer functioning as a source electrode, a conductive layer functioning as a drain electrode, and an insulating layer functioning as a gate insulating layer. The above shows the case where a bottom-gate transistor is used.

Note that there is no particular limitation on the structure of the transistor included in the touch panel of one embodiment of the present invention. For example, a planar transistor, a staggered transistor, or an inverted staggered transistor may be used. A top-gate transistor or a bottom-gate transistor may be used. Gate electrodes may be provided above and below a channel. There is no particular limitation on a semiconductor material used for the transistor, and an oxide semiconductor, silicon, or germanium can be used, for example.

There is no particular limitation on the crystallinity of a semiconductor material used for the transistor, and an amorphous semiconductor or a semiconductor having crystallinity (a microcrystalline semiconductor, a polycrystalline semiconductor, a single crystal semiconductor, or a semiconductor partly including crystal regions) may be used. A semiconductor having crystallinity is preferably used, in which case deterioration of the transistor characteristics can be suppressed.

In addition, as a semiconductor material for the semiconductor layer of the transistor, an element of Group 14, a compound semiconductor, or an oxide semiconductor can be used, for example. A semiconductor containing silicon, a semiconductor containing gallium arsenide, an oxide semiconductor containing indium, or the like can be typically used.

In particular, an oxide semiconductor is preferably used as a semiconductor in which a channel of the transistor is formed. In particular, an oxide semiconductor having a wider band gap than silicon is preferably used. A semiconductor material having a wider band gap and a lower carrier density than silicon is preferably used because the off-state current of the transistor can be reduced.

For example, the oxide semiconductor preferably contains at least indium (In) or zinc (Zn). More preferably, an oxide represented by In-M-Zn oxide (M is a metal such as Al, Ti, Ga, Ge, Y, Zr, Sn, La, Ce, Hf, or Nd) is included.

As the semiconductor layer, it is particularly preferable to use an oxide semiconductor film including a plurality of crystal parts. The c-axes of the crystal parts are oriented substantially perpendicular to a surface on which the semiconductor layer is formed or the top surface of the semiconductor layer, and adjacent crystal parts have no grain boundary.

Such an oxide semiconductor without grain boundary prevents a crack in an oxide semiconductor film from being caused by stress generated when the display panel is curved. Consequently, such an oxide semiconductor is preferably used for a flexible touch panel that is curved when used.

Moreover, the use of such an oxide semiconductor for the semiconductor layer makes it possible to provide a highly reliable transistor in which a change in the electrical characteristics is suppressed.

In addition, charge accumulated in a capacitor through the transistor can be retained for a long time because of low off-state current of the transistor. The use of such a transistor in pixels allows a driver circuit to stop while the gray level of an image displayed in display regions is maintained. As a result, a display device with extremely low power consumption can be obtained.

The semiconductor layer preferably includes a film represented by an In-M-Zn oxide that contains, for example, at least indium (In), zinc (Zn), and M (a metal such as Al, Ti, Ga, Y, Zr, La, Ce, Sn, or Hf). In order to reduce variations in electrical characteristics of the transistor including the oxide semiconductor, the oxide semiconductor preferably contains a stabilizer in addition to the above elements.

Examples of the stabilizer, including metals that can be used as M, are gallium (Ga), tin (Sn), hafnium (Hf), aluminum (Al), and zirconium (Zr). Other examples of the stabilizer are lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu).

As an oxide semiconductor included in the semiconductor layer, any of the following oxides can be used, for example: an In—Ga—Zn-based oxide, an In—Al—Zn-based oxide, an In—Sn—Zn-based oxide, an In—Hf—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

Note that here, an "In—Ga—Zn-based oxide" means an oxide containing In, Ga, and Zn as its main components, and there is no limitation on the ratio of In:Ga:Zn. Furthermore, a metal element in addition to In, Ga, and Zn may be contained.

The semiconductor layer and the conductive layer may include the same metal elements contained in the above oxides. The use of the same metal elements for the semiconductor layer and the conductive layer can reduce the manufacturing cost. For example, when metal oxide targets with the same metal composition are used, the manufacturing cost can be reduced. Furthermore, when metal oxide targets with the same metal composition are used, the same etching gas or the same etchant can be used in processing the oxide semiconductor film. Note that even when the semiconductor layer and the conductive layer include the same metal elements, they have different compositions in some cases. For example, a metal element in a film is released during the manufacturing process of the transistor and the capacitor, which might result in different metal compositions.

Note that in the case where the semiconductor layer includes an In-M-Zn oxide, when the summation of In and M is assumed to be 100 atomic %, the atomic proportions of In and M, not taking Zn and O into consideration, are preferably higher than 25 atomic % and lower than 75 atomic %, respectively, more preferably higher than 34 atomic % and lower than 66 atomic %, respectively.

The energy gap of the semiconductor layer is 2 eV or more, preferably 2.5 eV or more, more preferably 3 eV or more. In this manner, the off-state current of the transistor can be reduced by using an oxide semiconductor having a wide energy gap.

The thickness of the semiconductor layer is greater than or equal to 3 nm and less than or equal to 200 nm, preferably greater than or equal to 3 nm and less than or equal to 100 nm, more preferably greater than or equal to 3 nm and less than or equal to 50 nm.

In the case where the semiconductor layer includes an In-M-Zn oxide (M represents Al, Ti, Ga, Ge, Y, Zr, Sn, La, Ce, Hf, or Nd), it is preferable that the atomic ratio of metal elements of a sputtering target used for forming a film of the In-M-Zn oxide satisfy In≥M and Zn≥M As the atomic ratio of the metal elements of such a sputtering target, In:M:Zn=1:1:1, In:M:Zn=1:1:1.2, In:M:Zn=3:1:2, and 4:2:3 are preferable. Note that the atomic ratio in the formed semiconductor layer varies from the above atomic ratio of metal elements of the sputtering target within a range of ±40% as an error.

An oxide semiconductor film with a low carrier density is used as the semiconductor layer. For example, an oxide semiconductor film whose carrier density is lower than or equal to $1\times10^{17}/cm^3$, preferably lower than or equal to $1\times10^{15}/cm^3$, more preferably lower than or equal to $1\times10^{13}/cm^3$, more preferably lower than or equal to $1\times10^{11}/cm^3$ is used as the semiconductor layer.

Note that, without limitation to the compositions and materials described above, a material with an appropriate composition may be used depending on required semiconductor characteristics and electrical characteristics (e.g., field-effect mobility and threshold voltage) of the transistor. Furthermore, to obtain required semiconductor characteristics of the transistor, it is preferable that the carrier density, the impurity concentration, the defect density, the atomic ratio of a metal element to oxygen, the interatomic distance, the density, and the like of the semiconductor layer be set to be appropriate.

When silicon or carbon which is one of elements belonging to Group 14 is contained in the semiconductor layer, oxygen vacancies are increased, and the semiconductor layer has n-type conductivity. Thus, the concentration of silicon or carbon (measured by secondary ion mass spectrometry) of the semiconductor layer is lower than or equal to $2\times10^{18}$ atoms/$cm^3$, preferably lower than or equal to $2\times10^{17}$ atoms/$cm^3$.

Furthermore, the concentration of alkali metal or alkaline earth metal in the semiconductor layer, which is measured by secondary ion mass spectrometry, is lower than or equal to $1\times10^{18}$ atoms/$cm^3$, preferably lower than or equal to $2\times10^{16}$ atoms/$cm^3$. Alkali metal and alkaline earth metal might generate carriers when bonded to an oxide semiconductor, in which case the off-state current of the transistor might be increased. Therefore, it is preferable to reduce the concentration of alkali metal or alkaline earth metal in the semiconductor layer.

When nitrogen is contained in the semiconductor layer, electrons serving as carriers are generated to increase the carrier density, so that the semiconductor layer easily has n-type conductivity. Thus, a transistor including an oxide semiconductor which contains nitrogen is likely to be normally on. For this reason, nitrogen in the oxide semiconductor film is preferably reduced as much as possible; the concentration of nitrogen which is measured by secondary ion mass spectrometry is preferably set to, for example, lower than or equal to $5\times10^{18}$ atoms/$cm^3$.

The semiconductor layer may have a non-single-crystal structure, for example. The non-single-crystal structure includes a CAAC-OS (C Axis Aligned-Crystalline Oxide Semiconductor) which is described later, a polycrystalline structure, a microcrystalline structure which is described later, or an amorphous structure, for example. Among the non-single-crystal structures, an amorphous structure has the highest density of defect states, whereas CAAC-OS has the lowest density of defect states.

The semiconductor layer may have an amorphous structure, for example. An oxide semiconductor film having an amorphous structure has disordered atomic arrangement and no crystalline component, for example. Alternatively, an oxide film having an amorphous structure has, for example, an absolutely amorphous structure and no crystal part.

Note that the semiconductor layer may be a mixed film including two or more of the following: a region having an amorphous structure, a region having a microcrystalline structure, a region having a polycrystalline structure, a CAAC-OS region, and a single-crystal structure. The mixed film may include, for example, two or more of a region having an amorphous structure, a region having a microcrystalline structure, a region having a polycrystalline structure, a CAAC-OS region, and a region having a single-crystal structure. Furthermore, the mixed film has a stacked-layer structure of two or more of a region having an amorphous structure, a region having a microcrystalline structure, a region having a polycrystalline structure, a CAAC-OS region, and a region having a single-crystal structure in some cases.

Alternatively, silicon is preferably used as a semiconductor in which a channel of the transistor is formed. Silicon may be amorphous silicon but is preferably silicon having crystallinity. For example, microcrystalline silicon, polycrystalline silicon, single crystal silicon, or the like is preferably used. In particular, polycrystalline silicon can be formed at a lower temperature than single crystal silicon and has higher field-effect mobility and higher reliability than amorphous silicon. The use of such a polycrystalline semiconductor in pixels increases the aperture ratio of the pixels. Even in the case where pixels are provided at extremely high resolution, a gate driver circuit and a source driver circuit can be formed over the same substrate as the pixels, and the number of components of an electronic device can be reduced.

<Conductive Layer>

As materials for a conductive layer such as a gate, a source, and a drain of a transistor, and a wiring or an electrode included in the touch panel, a single-layer structure or a layered structure using a metal such as aluminum, titanium, chromium, nickel, copper, yttrium, zirconium, molybdenum, silver, tantalum, or tungsten, or an alloy containing any of these metals as its main component can be used. For example, a single-layer structure of an aluminum film containing silicon; a two-layer structure in which an aluminum film is stacked over a titanium film; a two-layer structure in which an aluminum film is stacked over a tungsten film; a two-layer structure in which a copper film is stacked over a copper-magnesium-aluminum alloy film; a two-layer structure in which a copper film is stacked over a titanium film; a two-layer structure in which a copper film is stacked over a tungsten film; a three-layer structure in which a titanium film or a titanium nitride film, an aluminum film or a copper film over the titanium film or the titanium nitride film, and a titanium film or a titanium nitride film thereover are stacked; a three-layer structure in which a molybdenum film or a molybdenum nitride film, an aluminum film or a copper film over the molybdenum film or the molybdenum nitride film, and a molybdenum film or a molybdenum nitride film thereover are stacked; and the like are given. Note that a transparent conductive material containing indium oxide, tin oxide, or zinc oxide may also be used. In addition, copper containing manganese is preferably used because controllability of shape by etching is increased.

In addition, as a light-transmitting conductive material, a conductive oxide such as indium oxide, indium tin oxide, indium zinc oxide, zinc oxide, or zinc oxide to which gallium is added, or graphene can be used. It is also possible to use a metal material such as gold, silver, platinum, magnesium, nickel, tungsten, chromium, molybdenum, iron, cobalt, copper, palladium, or titanium; or an alloy material containing any of these metal materials. Alternatively, a nitride of the metal material (e.g., titanium nitride) or the like may be used. Note that in the case of using the metal material or the alloy material (or the nitride thereof), the film thickness is set small enough to transmit light. Alternatively, a stacked film of any of the above materials can be used for the conductive layers. For example, a stacked film of an alloy of silver and magnesium and indium tin oxide or the like is preferably used because the conductivity can be increased. They can also be used for conductive layers such as a variety of wirings and electrodes included in a touch panel, and an electrode (e.g., a pixel electrode or a common electrode) included in a display element.

Alternatively, for the conductive layer, an oxide semiconductor similar to that of the semiconductor layer is preferably used. In that case, it is preferable that the conductive layer be formed to have a lower electric resistance than a region in the semiconductor layer where a channel is formed.

For example, such a conductive layer can be used as the conductive layer functioning as the second gate electrode of the transistor. Alternatively, it can be used as another light-transmitting conductive layer.

<Insulating Layer>

As an insulating material that can be used for the insulating layers, the overcoat, the spacer, and the like, a resin such as an acrylic or an epoxy, a resin having a siloxane bond, and an inorganic insulating material such as silicon oxide, silicon oxynitride, silicon nitride oxide, silicon nitride, or aluminum oxide can be used.

<Adhesive Layer>

For the adhesive layer, a curable resin such as a heat curable resin, a photocurable resin, or a two-component type curable resin can be used. For example, a resin such as an acrylic resin, a polyurethane, an epoxy resin, or a resin having a siloxane bond can be used.

<Connection Layer>

For the connection layer, an anisotropic conductive film (ACF: Anisotropic Conductive Film), an anisotropic conductive paste (ACP: Anisotropic Conductive Paste), or the like can be used.

<Coloring Layer>

Examples of a material that can be used for the coloring layer include a metal material, a resin material, and a resin material containing a pigment or dye.

<Light-Emitting Element>

As the light-emitting element, a self-luminous element can be used, and an element whose luminance is controlled by current or voltage is included in the category of the light-emitting element. For example, a light-emitting diode (LED), an organic EL element, an inorganic EL element, or the like can be used.

The light-emitting element may be a top-emission type, a bottom-emission type, or a dual-emission type. A conductive film that transmits visible light is used as the electrode through which light is extracted. In addition, a conductive film that reflects visible light is preferably used as the electrode through which light is not extracted.

The EL layer includes at least a light-emitting layer. In addition to the light-emitting layer, the EL layer may further include a layer containing any of a substance with a high hole-injection property, a substance with a high hole-transport property, a hole-blocking material, a substance with a high electron-transport property, a substance with a high electron-injection property, a substance with a bipolar property (a substance with a high electron-transport property and a high hole-transport property), and the like.

For the EL layer, either a low-molecular compound or a high-molecular compound can be used, and an inorganic compound may also be included. Each of the layers included in the EL layer can be formed by a method such as an evaporation method (including a vacuum evaporation method), a transfer method, a printing method, an inkjet method, or a coating method.

When a voltage higher than the threshold voltage of the light-emitting element is applied between a cathode and an anode, holes are injected to the EL layer from the anode side and electrons are injected from the cathode side. The injected electrons and holes are recombined in the EL layer and a light-emitting substance contained in the EL layer emits light.

In the case where a light-emitting element emitting white light is used as the light-emitting element, the EL layer preferably contains two or more kinds of light-emitting substances. For example, the light-emitting substances are selected such that the colors of light emission of two or more light-emitting substances are complementary to each other, so that white light emission can be obtained. For example, it is preferable to contain two or more selected from light-emitting substances emitting light of R (red), G (green), B (blue), Y (yellow), O (orange), and the like and light-emitting substances emitting light containing two or more colors of spectral components of R, G, and B. In addition, a light-emitting element whose emission spectrum has two or more peaks in the wavelength range of a visible light region (e.g., 350 nm-750 nm) is preferably used. In addition, an emission spectrum of a material having a peak in a yellow wavelength range preferably includes spectral components also in green and red wavelength ranges.

More preferably, a light-emitting layer containing a light-emitting material emitting light of one color and a light-emitting layer containing a light-emitting material emitting light of another color are stacked in the EL layer. For example, the plurality of light-emitting layers in the EL layer may be stacked in contact with each other or may be stacked with a separation layer therebetween. For example, between a fluorescent light-emitting layer and a phosphorescent light-emitting layer, a separation layer may be provided.

The separation layer can be provided, for example, to prevent energy transfer by the Dexter mechanism (particularly, triplet energy transfer) from a phosphorescent material or the like in an excited state which is generated in the phosphorescent light-emitting layer to a fluorescent material or the like in the fluorescent light-emitting layer. The thickness of the separation layer may be several nanometers. Specifically, the thickness of the separation layer is greater than or equal to 0.1 nm and less than or equal to 20 nm, greater than or equal to 1 nm and less than or equal to 10 nm, or greater than or equal to 1 nm and less than or equal to 5 nm. The separation layer contains a single material (preferably, a bipolar substance) or a plurality of materials (preferably, a hole-transport material and an electron-transport material).

The separation layer may be formed using a material contained in a light-emitting layer in contact with the separation layer. This facilitates the manufacture of the light-emitting element and reduces the drive voltage. For example, in the case where the phosphorescent light-emitting layer contains a host material, an assist material, and the phosphorescent material (a guest material), the separation layer may contain the host material and the assist material. In other words, the separation layer includes a region that does not contain the phosphorescent material, and the phosphorescent light-emitting layer includes a region that contains the phosphorescent material in the above structure. Accordingly, the separation layer and the phosphorescent light-emitting layer can be evaporated depending on whether the phosphorescent material is contained or not. With such a structure, the separation layer and the phosphorescent light-emitting layer can be formed in the same chamber. Thus, the manufacturing cost can be reduced.

In addition, the light-emitting element may be a single element including one EL layer or a tandem element in which a plurality of EL layers are stacked with a charge generation layer therebetween.

<Material for Conductive Layer (Electrode) of Touch Sensor>

At least one of the pair of conductive layers of the touch sensor is preferably formed using the same material as the common electrode, the pixel electrode, or the like of the EL element.

Alternatively, at least one of the conductive layers of the touch sensor may be formed of a meshed metal film (also referred to as a metal mesh).

By providing a metal film directly on or below at least one of the conductive layer in the X direction and the conductive layer (electrode) in the Y direction of the touch sensor, the resistance of the conductive layer can be reduced. In that case, a stacked structure of a conductive film including a metal oxide and a conductive film including a metal is preferably used, because these conductive films can be formed by a patterning technique using a half tone mask and thus the process can be simplified.

[Wiring for Connecting Conductive Layers (Electrodes) of Touch Sensor]

In a region of the touch sensor where the conductive layer in the X direction crosses the conductive layer in the Y direction, a bridge structure using another conductive layer is formed in such a manner that, for example, by using a conductive layer on the same plane as the gate electrode of the transistor, conductive layers are connected in the lateral direction parallel to the gate line throughout the pixels. Alternatively, by using a conductive layer on the same plane as the source electrode and the drain electrode of the transistor, the conductive layers are connected in the vertical direction parallel to the source line throughout the pixels. In that case, a contact portion can be formed in the pixel. Alternatively, the same conductive layer as the conductive layer functioning as the common electrode or a conductive layer on the same plane as the conductive layer functioning as the pixel electrode may also be used.

<Conductive Layer (Electrode) of Touch Sensor and Conductive Layer (Electrode) of EL Element>

A conductive layer (electrode) having a slit on the upper side can be used as the pixel electrode, and a conductive layer (electrode) provided in a plurality of pixels on the lower side can be used as the common electrode.

Alternatively, a conductive layer (electrode) having a slit on the upper side can be used as the common electrode, and a conductive layer (electrode) having a slit on the upper side can be used as the common electrode.

The conductive layer in the X direction of the touch sensor can be formed on the same plane as the conductive layer functioning as the pixel electrode or the conductive layer functioning as the gate, the source, or the drain of the transistor. Alternatively, the conductive layer in the Y direction of the touch sensor can be formed on the same plane as the conductive layer functioning as the pixel electrode or the conductive layer functioning as the gate, the source, or the drain of the transistor.

In addition, the conductive layer in the X direction of the touch sensor may be one of a conductive layer to which a pulse voltage is applied and a conductive layer for sensing a current. In that case, the conductive layer in the Y direction of the touch sensor may be the other thereof.

The conductive layer functioning as the common electrode may be provided in a plurality of pixels. For example, it may be electrically connected to a common wiring formed using a conductive layer on the same plane as the gate electrode of the transistor. In that case, one conductive layer functioning as the common electrode may have an island shape.

<Counter Substrate>

When a substrate (counter substrate) that faces the substrate (element substrate) provided with the transistor and the like is provided with the conductive layer in the X direction or the conductive layer in the Y direction of the touch sensor, a light-blocking layer is preferably provided closer to the viewing side than the conductive layer.

<Driving Method>]

The touch sensor can be driven by, for example, sensing of the corresponding row in a period between horizontal periods (gate selection periods) in driving of the pixel. Alternatively, one frame period may be divided in two periods; writing to all pixels may be performed in the former period, and sensing may be performed in the latter period.

At least part of this embodiment can be implemented in combination with any of the other embodiments or at least another part of this embodiment described in this specification as appropriate.

(Embodiment 2)

In this embodiment, an example of a transistor which can be used as the transistor 201 described in the above embodiment is described with reference to drawings. Note that the transistor described in this embodiment can also be used as the transistor 11, the transistor 12, or the like described in the above embodiment. Note that the transistor described in this embodiment can be used as not only a transistor included in a pixel but also a transistor included in a driver circuit.

The touch panel of one embodiment of the present invention can be fabricated by using a transistor with any of various structures, such as a bottom-gate transistor or a top-gate transistor. Therefore, a material for a semiconductor layer or the structure of a transistor can be easily changed depending on the existing production line.

<Bottom-Gate Transistor>

FIG. 24(A1) is a cross-sectional view of a transistor 810 that is a channel-protective transistor, which is a type of bottom-gate transistor. In FIG. 24(A1), the transistor 810 is formed over a substrate 771. The transistor 810 includes an electrode 746 over the substrate 771 with an insulating layer 772 provided therebetween. The transistor 810 includes a semiconductor layer 742 over the electrode 746 with an insulating layer 726 provided therebetween. The electrode 746 can function as a gate electrode. The insulating layer 726 can function as a gate insulating layer.

The transistor 810 includes an insulating layer 741 over a channel formation region in the semiconductor layer 742. The transistor 810 includes an electrode 744a and an electrode 744b which are partly in contact with the semiconductor layer 742 and over the insulating layer 726. The electrode 744a can function as one of a source electrode and a drain electrode. The electrode 744b can function as the other of the source electrode and the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrode 744a and the electrode 744b. Thus, the channel formation region in the semiconductor layer 742 can be prevented from being etched at the time of forming the electrode 744a and the electrode 744b. In accordance with one embodiment of the present invention, a transistor with favorable electrical characteristics can be provided.

The transistor 810 includes an insulating layer 728 over the electrode 744a, the electrode 744b, and the insulating layer 741 and includes an insulating layer 729 over the insulating layer 728.

The insulating layer 772 may be a stack of a plurality of insulating layers, for example. Furthermore, the semiconductor layer 742 may be a stack of a plurality of semiconductor layers, for example. Furthermore, the electrode 746 may be a stack of a plurality of conductive layers, for example. Furthermore, the insulating layer 726 may be a stack of a plurality of insulating layers, for example. Furthermore, the electrode 744a and the electrode 744b may each be a stack of a plurality of conductive layers, for example. Furthermore, the insulating layer 741 may be a stack of a plurality of insulating layers, for example. Furthermore, the insulating layer 728 may be a stack of a plurality of insulating layers, for example. Furthermore, the insulating layer 729 may be a stack of a plurality of insulating layers, for example.

The conductive layer, the semiconductor layer, the insulating layer, and the like used in the transistor disclosed in this embodiment can be formed using a material and a method disclosed in any of the other embodiments.

In the case where an oxide semiconductor is used for the semiconductor layer 742, a material capable of removing oxygen from part of the semiconductor layer 742 to generate oxygen vacancies is preferably used for regions of the electrode 744a and the electrode 744b that are in contact with at least the semiconductor layer 742. The carrier concentration in the regions of the semiconductor layer 742 where oxygen vacancies are generated is increased, so that the regions become n-type regions (n$^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrodes 744a and 744b. Accordingly, the electrical characteristics of the transistor, such as the field-effect mobility and the threshold voltage, can be favorable.

In the case where a semiconductor such as silicon is used for the semiconductor layer 742, a layer that functions as an n-type semiconductor or a p-type semiconductor is preferably provided between the semiconductor layer 742 and the electrode 744a and between the semiconductor layer 742 and the electrode 744b. The layer that functions as an n-type semiconductor or a p-type semiconductor can function as the source region or the drain region in the transistor.

The insulating layer 729 is preferably formed using a material that can prevent or reduce diffusion of impurities into the transistor from the outside. Note that the formation of the insulating layer 729 may be omitted.

Note that when an oxide semiconductor is used for the semiconductor layer 742, heat treatment may be performed before and/or after the insulating layer 729 is formed. The heat treatment can fill oxygen vacancies in the semiconductor layer 742 by diffusing oxygen contained in the insulating layer 729 or other insulating layers into the semiconductor layer 742. Alternatively, the insulating layer 729 may be formed while the heat treatment is performed, so that oxygen vacancies in the semiconductor layer 742 can be filled.

A transistor 811 illustrated in FIG. 24(A2) is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is positioned between a gate electrode and the back gate electrode. Thus, the back gate electrode can function in a manner similar to that of the gate electrode. The potential of the back gate electrode may be the same as that of the gate electrode or may be a ground potential (GND potential) or a predetermined potential. By changing the potential of the back gate electrode independently of the gate electrode, the threshold voltage of the transistor can be changed.

Note that the electrode 723 may be provided between the insulating layer 728 and the insulating layer 729.

Note that in the case where one of the electrode 746 and the electrode 723 is referred to as a "gate electrode", the other can be referred to as a "back gate electrode". For example, in the transistor 811, in the case where the electrode 723 is referred to as a "gate electrode", the electrode 746 is referred to as a "back gate electrode". In the case where the electrode 723 is used as a "gate electrode", the transistor 811 is a kind of top-gate transistor. Alternatively, one of the electrode 746 and the electrode 723 may be referred to as a "first gate electrode", and the other may be referred to as a "second gate electrode".

By providing the electrode 746 and the electrode 723 with the semiconductor layer 742 provided therebetween and setting the potentials of the electrode 746 and the electrode 723 to be the same, a region of the semiconductor layer 742 through which carriers flow is enlarged in the film thickness direction; thus, the number of transferred carriers is increased. As a result, the on-state current and field-effect mobility of the transistor 811 are increased.

Therefore, the transistor 811 can be a transistor having a comparatively high on-state current for its area. That is, the area of the transistor 811 can be small for a required on-state current. Therefore, a semiconductor device having a high degree of integration can be provided.

Furthermore, the gate electrode and the back gate electrode are formed using conductive layers and thus each have a function of preventing an electric field generated outside the transistor from influencing the semiconductor layer in which the channel is formed (in particular, an electric field blocking function against static electricity and the like). When the back gate electrode is formed larger than the semiconductor layer such that the semiconductor layer is covered with the back gate electrode, the electric field blocking function can be enhanced.

Furthermore, the electrode 746 and the electrode 723 are provided so that the function of blocking electric field toward the semiconductor layer 742 can be enhanced. This reduces degradation by a stress test (e.g., a −GBT (Gate Bias-Temperature) stress test in which negative electric charge is applied to a gate). Furthermore, a change in gate voltage (rising voltage) at which on-state current starts flowing depending on drain voltage can be reduced. Note that this effect is obtained when the electrode 746 and the electrode 723 have the same potential or different potentials.

When the back gate electrode is formed using a light-blocking conductive film, light can be prevented from entering the semiconductor layer from the back gate electrode side. Therefore, photodegradation of the semiconductor layer can be prevented, and deterioration in electrical characteristics of the transistor, such as a shift of the threshold voltage, can be prevented.

In accordance with one embodiment of the present invention, a transistor with high reliability can be provided. Moreover, a semiconductor device with high reliability can be provided.

FIG. 24(B1) is a cross-sectional view of a channel-protective transistor 820 that is a type of bottom-gate transistor. The transistor 820 has substantially the same structure as the transistor 810 but is different from it in that the insulating layer 741 covers an end portion of the semiconductor layer 742. Furthermore, the semiconductor layer 742 is electrically connected to the electrode 744a through an opening formed by selectively removing part of the insulating layer 741 which overlaps with the semiconductor layer 742. Furthermore, the semiconductor layer 742 is electrically connected to the electrode 744b through another opening formed by selectively removing part of the insulating layer 729 which overlaps with the semiconductor layer 742.

A transistor 821 illustrated in FIG. 24(B2) is different from the transistor 820 in that the electrode 723 that can function as a back gate electrode is provided over the insulating layer 729.

The insulating layer 741 provided to cover an end portion of the semiconductor layer 742 can prevent the semiconductor layer 742 from being exposed at the time of forming the electrode 744a and the electrode 744b. Thus, the semiconductor layer 742 can be prevented from being reduced in thickness at the time of forming the electrode 744a and the electrode 744b.

Furthermore, the length between the electrode 744a and the electrode 746 and the length between the electrode 744b and the electrode 746 in the transistor 820 and the transistor 821 are larger than those in the transistor 810 and the transistor 811. Thus, the parasitic capacitance generated between the electrode 744a and the electrode 746 can be reduced. Moreover, the parasitic capacitance generated between the electrode 744b and the electrode 746 can be reduced. In accordance with one embodiment of the present invention, a transistor with favorable electrical characteristics can be provided.

A transistor 825 illustrated in FIG. 24(C1) is a channel-etched transistor that is a type of bottom-gate transistor. In the transistor 825, the electrode 744a and the electrode 744b are formed without providing the insulating layer 741. Thus, part of the semiconductor layer 742 that is exposed at the time of forming the electrode 744a and the electrode 744b is etched in some cases. However, since the insulating layer 741 is not provided, the productivity of the transistor can be increased.

The transistor 825 illustrated in FIG. 24(C2) is different from the transistor 825 in that the electrode 723 which can function as a back gate electrode is provided over the insulating layer 729.

<Top-Gate Transistor>

FIG. 25(A1) is a cross-sectional view of a transistor 830 that is a type of top-gate transistor. The transistor 830 includes the semiconductor layer 742 over the insulating layer 772, the electrode 744a in contact with part of the semiconductor layer 742 and the electrode 744b in contact with part of the semiconductor layer 742 that are over the semiconductor layer 742 and the insulating layer 772, the insulating layer 726 over the semiconductor layer 742, the electrode 744a, and the electrode 744b, and the electrode 746 over the insulating layer 726.

Since the electrode 746 overlaps with neither the electrode 744a nor the electrode 744b in the transistor 830, the parasitic capacitance generated between the electrode 746 and the electrode 744a and the parasitic capacitance generated between the electrode 746 and the electrode 744b can be reduced. Furthermore, after the formation of the electrode 746, an impurity 755 is introduced into the semiconductor layer 742 using the electrode 746 as a mask, so that an impurity region can be formed in the semiconductor layer 742 in a self-aligned manner (see FIG. 25(A3)). In accordance with one embodiment of the present invention, a transistor with favorable electrical characteristics can be provided.

Note that the introduction of the impurity 755 can be performed with an ion implantation apparatus, an ion doping apparatus, or a plasma treatment apparatus.

As the impurity 755, for example, at least one kind of element of Group 13 elements and Group 15 elements can be used. In the case where an oxide semiconductor is used for the semiconductor layer 742, it is possible to use at least one kind of element of a rare gas, hydrogen, and nitrogen as the impurity 755.

A transistor 831 illustrated in FIG. 25(A2) is different from the transistor 830 in that the electrode 723 and an insulating layer 727 are included. The transistor 831 includes the electrode 723 formed over the insulating layer 772 and the insulating layer 727 formed over the electrode 723. The electrode 723 can function as a back gate electrode. Thus, the insulating layer 727 can function as a gate insulating layer.

Like the transistor 811, the transistor 831 has a high on-state current for its area. That is, the area of the transistor 831 can be small for a required on-state current. In accordance with one embodiment of the present invention, the area of a transistor can be reduced. Therefore, in accordance with one embodiment of the present invention, a semiconductor device having a high degree of integration can be provided.

A transistor 840 illustrated in FIG. 25(B1) is a type of top-gate transistor. The transistor 840 is different from the transistor 830 in that the semiconductor layer 742 is formed after the formation of the electrode 744a and the electrode 744b. A transistor 841 illustrated in FIG. 25(B2) is different from the transistor 840 in that the electrode 723 and the insulating layer 727 are included. In the transistor 840 and the transistor 841, part of the semiconductor layer 742 is formed over the electrode 744a and another part of the semiconductor layer 742 is formed over the electrode 744b.

Like the transistor 811, the transistor 841 has a high on-state current for its area. That is, the area of the transistor 841 can be small for a required on-state current. In accordance with one embodiment of the present invention, the area of a transistor can be reduced. Therefore, in accordance with one embodiment of the present invention, a semiconductor device having a high degree of integration can be provided.

A transistor 842 illustrated in FIG. 26(A1) is a type of top-gate transistor. The transistor 842 is different from the transistor 830 or the transistor 840 in that the electrode 744a and the electrode 744b are formed after the formation of the insulating layer 729. The electrode 744a and the electrode 744b are electrically connected to the semiconductor layer 742 through openings formed in the insulating layer 728 and the insulating layer 729.

Furthermore, part of the insulating layer 726 that does not overlap with the electrode 746 is removed, and the impurity 755 is introduced into the semiconductor layer 742 using the electrode 746 and the insulating layer 726 that is left as a mask, so that an impurity region can be formed in the semiconductor layer 742 in a self-aligned manner (see FIG. 26(A3)). The transistor 842 includes a region where the insulating layer 726 extends beyond an end portion of the electrode 746. The semiconductor layer 742 in a region into which the impurity 755 is introduced through the insulating layer 726 has a lower impurity concentration than the semiconductor layer 742 in a region into which the impurity 755 is introduced without through the insulating layer 726. Thus, an LDD (Lightly Doped Drain) region is formed in a region of the semiconductor layer 742 which is adjacent to the electrode 746.

A transistor 843 illustrated in FIG. 26(A2) is different from the transistor 842 in that the electrode 723 is included. The transistor 843 includes the electrode 723 that is formed over the substrate 771 and overlaps with the semiconductor layer 742 with the insulating layer 772 provided therebetween. The electrode 723 can function as a back gate electrode.

As in a transistor 844 illustrated in FIG. 26(B1) and a transistor 845 illustrated in FIG. 26(B2), the insulating layer 726 in a region that does not overlap with the electrode 746 may be completely removed. Alternatively, as in a transistor 846 illustrated in FIG. 26(C1) and a transistor 847 illustrated in FIG. 26(C2), the insulating layer 726 may be left.

In the transistor 842 to the transistor 847, after the formation of the electrode 746, the impurity 755 is introduced into the semiconductor layer 742 using the electrode 746 as a mask, so that an impurity region can be formed in the semiconductor layer 742 in a self-aligned manner. In accordance with one embodiment of the present invention, a transistor with favorable electrical characteristics can be provided. Furthermore, in accordance with one embodiment of the present invention, a semiconductor device having a high degree of integration can be provided.

<S-Channel Transistor>

FIG. 27 illustrates an example of the structure of a transistor using an oxide semiconductor for the semiconductor layer 742. In a transistor 850 illustrated in FIG. 27, a semiconductor layer 742*b* is formed over a semiconductor layer 742*a*, and a semiconductor layer 742*c* covers a top surface of the semiconductor layer 742*b* and side surfaces of the semiconductor layer 742*b* and the semiconductor layer 742*c*. FIG. 27(A) is a top view of the transistor 850. FIG. 27(B) is a cross-sectional view (cross-sectional view in the channel length direction) taken along the dashed-dotted line X1-X2 in FIG. 27(A). FIG. 27(C) is a cross-sectional view (cross-sectional view in the channel width direction) taken along the dashed-dotted line Y1-Y2 in FIG. 27(A).

The transistor 850 includes an electrode 743 functioning as a gate electrode. The electrode 743 can be formed using a material and a method similar to those of the electrode 746. The electrode 743 is formed of two conductive layers in this embodiment.

Each of the semiconductor layer 742*a*, the semiconductor layer 742*b*, and the semiconductor layer 742*c* is formed using a material containing either In or Ga or both of them. Typical examples are an In—Ga oxide (an oxide containing In and Ga), an In—Zn oxide (an oxide containing In and Zn), and an In-M-Zn oxide (an oxide containing In, an element M, and Zn. The element M is one or more kinds of elements selected from Al, Ti, Ga, Y, Zr, La, Ce, Nd, and Hf and is a metal element having a higher strength of bonding with oxygen than that of In).

The semiconductor layer 742*a* and the semiconductor layer 742*c* are preferably formed using a material containing one or more kinds of metal elements contained in the semiconductor layer 742*b*. With the use of such a material, interface states are less likely to be generated at the interface between the semiconductor layer 742*a* and the semiconductor layer 742*b* and at the interface between the semiconductor layer 742*c* and the semiconductor layer 742*b*. Accordingly, carriers are not likely to be scattered or captured at the interfaces, which results in an improvement in field-effect mobility of the transistor. Furthermore, variation in threshold voltage of the transistor can be reduced. Thus, a semiconductor device having favorable electrical characteristics can be obtained.

Each of the thicknesses of the semiconductor layer 742*a* and the semiconductor layer 742*c* is greater than or equal to 3 nm and less than or equal to 100 nm, preferably greater than or equal to 3 nm and less than or equal to 50 nm. The thickness of the semiconductor layer 742*b* is greater than or equal to 3 nm and less than or equal to 700 nm, preferably greater than or equal to 3 nm and less than or equal to 100 nm, further preferably greater than or equal to 3 nm and less than or equal to 50 nm.

In the case where the semiconductor layer 742*b* includes an In-M-Zn oxide and the semiconductor layer 742*a* and the semiconductor layer 742*c* each also include an In-M-Zn oxide, the semiconductor layer 742*a* and the semiconductor layer 742*c* each have the atomic ratio where $In:M:Zn=x_1:y_1:z_1$, and the semiconductor layer 742*b* has an atomic ratio where $In:M:Zn=x_2:y_2:z_2$, for example. In that case, the compositions of the semiconductor layer 742*a*, the semiconductor layer 742*c*, and the semiconductor layer 742*b* can be determined so that $y_1/x_1$ is larger than $y_2/x_2$. It is preferable that the compositions of the semiconductor layer 742*a*, the semiconductor layer 742*c*, and the semiconductor layer 742*b* be determined so that $y_1/x_1$ is 1.5 times or more as large as $y_2/x_2$. It is more preferable that the compositions of the semiconductor layer 742*a*, the semiconductor layer 742*c*, and the semiconductor layer 742*b* be determined so that $y_1/x_1$ is twice or more as large as $y_2/x_2$. It is more preferable that the compositions of the semiconductor layer 742*a*, the semiconductor layer 742*c*, and the semiconductor layer 742*b* be determined so that $y_1/x_1$ is three times or more as large as $y_2/x_2$. It is preferable that $y_1$ be greater than or equal to $x_1$ because the transistor can have stable electrical characteristics. However, when $y_1$ is three times or more as large as $x_1$, the field-effect mobility of the transistor is reduced; accordingly, $y_1$ is preferably smaller than three times $x_1$. When the semiconductor layer 742*a* and the semiconductor layer 742*c* have the above compositions, the semiconductor layer 742*a* and the semiconductor layer 742*c* can each be a layer in which oxygen vacancies are less likely to be generated than in the semiconductor layer 742*b*.

Note that in the case where the semiconductor layer 742*a* and the semiconductor layer 742*c* each include an In-M-Zn oxide, the percentages of In and the element M when the summation of In and M is assumed to be 100 atomic % are preferably as follows: the percentage of In is lower than 50 atomic % and the percentage of the element M is higher than or equal to 50 atomic %. The percentages of In and the element M are more preferably as follows: the percentage of In is lower than 25 atomic % and the percentage of the element M is higher than or equal to 75 atomic %. In the case where the semiconductor layer 742*b* includes an In-M-Zn oxide, the percentages of In and the element M when the summation of In and M is assumed to be 100 atomic % are preferably as follows: the percentage of In is higher than or equal to 25 atomic % and the percentage of the element M is lower than 75 atomic %. The percentages of In and the element M are more preferably as follows: the percentage of In is higher than or equal to 34 atomic % and the percentage of the element M is lower than 66 atomic %.

For example, an In—Ga—Zn oxide that is formed using a target having an atomic ratio of In:Ga:Zn=1:3:2, 1:3:4, 1:3:6, 1:6:4, or 1:9:6, an In—Ga oxide that is formed using a target having an atomic ratio of In:Ga=1:9, or gallium oxide can be used for each of the semiconductor layer 742a containing In or Ga and the semiconductor layer 742c containing In or Ga. Furthermore, an In—Ga—Zn oxide that is formed using a target having an atomic ratio of In:Ga:Zn=3:1:2, 1:1:1, 5:5:6, or 4:2:4.1 can be used for the semiconductor layer 742b. Note that the atomic ratio of each of the semiconductor layer 742a, the semiconductor layer 742b, and the semiconductor layer 742b may vary within a range of ±20% of any of the above-described atomic ratios as an error.

To give stable electrical characteristics to the transistor including the semiconductor layer 742b, it is preferable that impurities and oxygen vacancies in the semiconductor layer 742b be reduced to obtain a highly purified oxide semiconductor layer and accordingly the semiconductor layer 742b can be regarded as an intrinsic or substantially intrinsic oxide semiconductor layer. Furthermore, it is preferable that at least the channel formation region of the semiconductor layer 742b be regarded as an intrinsic or substantially intrinsic semiconductor layer.

Note that the substantially intrinsic oxide semiconductor layer refers to an oxide semiconductor layer in which the carrier density is higher than or equal to $1\times10^{-9}/cm^3$ and lower than $8\times10^{11}/cm^3$, preferably lower than $1\times10^{11}/cm^3$, more preferably lower than $1\times10^{10}/cm^3$.

Figure 28A:
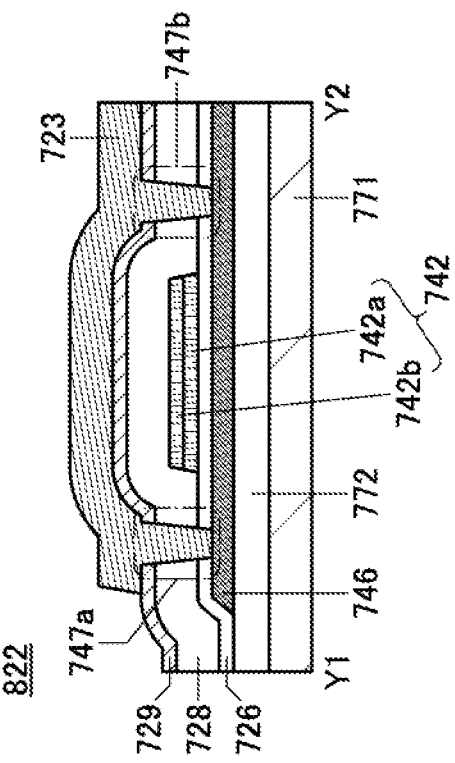
FIG. 28 A top view and cross-sectional views for illustrating one embodiment of the present invention.
Figure 28B:
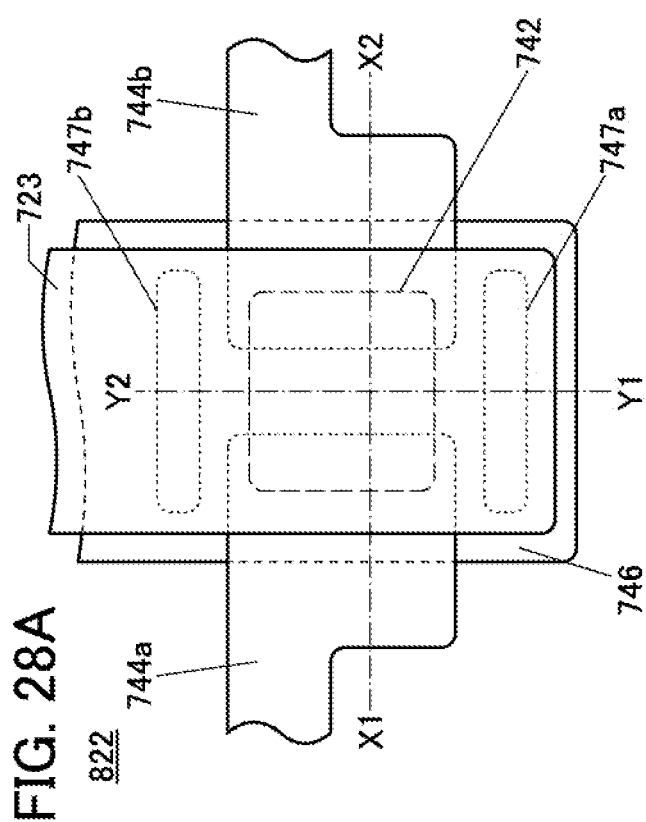
Figure 28C:
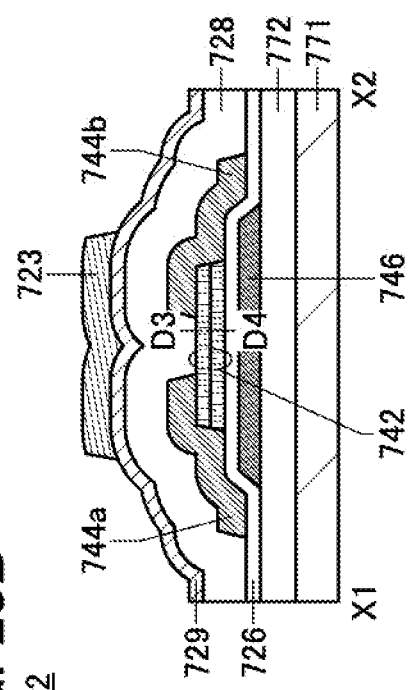

FIG. 28 illustrates an example of the structure of a transistor using an oxide semiconductor for the semiconductor layer 742. In a transistor 822 illustrated in FIG. 28, the semiconductor layer 742b is formed over the semiconductor layer 742a. The transistor 822 is a kind of bottom-gate transistor including a back gate electrode. FIG. 28(A) is a top view of the transistor 822. FIG. 28(B) is a cross-sectional view (cross-sectional view in the channel length direction) taken along the dashed-dotted line X1-X2 in FIG. 28(A). FIG. 28(C) is a cross-sectional view (cross-sectional view in the channel width direction) taken along the dashed-dotted line Y1-Y2 in FIG. 28(A).

The electrode 723 provided over the insulating layer 729 is electrically connected to the electrode 746 through an opening 747a and an opening 747b provided in the insulating layer 726, the insulating layer 728, and the insulating layer 729. Thus, the same potential is supplied to the electrode 723 and the electrode 746. Furthermore, either of the opening 747a and the opening 747b may be omitted. Both of the opening 747a and the opening 747b may be omitted. In the case where both the opening 747a and the opening 747b are omitted, different potentials can be supplied to the electrode 723 and the electrode 746.

<Energy Band Structure of Oxide Semiconductor>

Figure 32A:
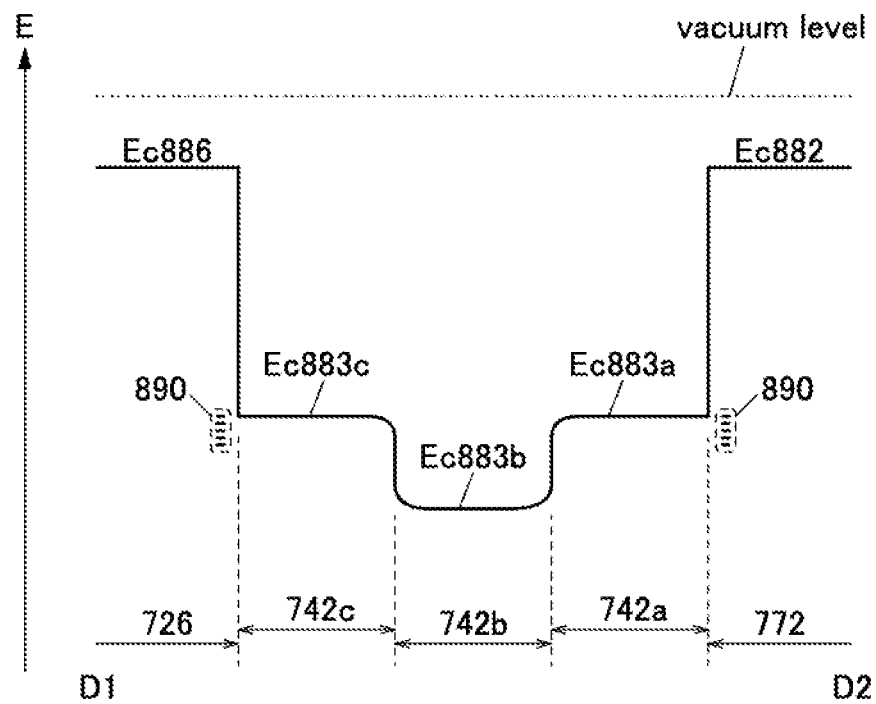
FIG. 32 Energy band diagrams for illustrating embodiments of the present invention.
Figure 32B:
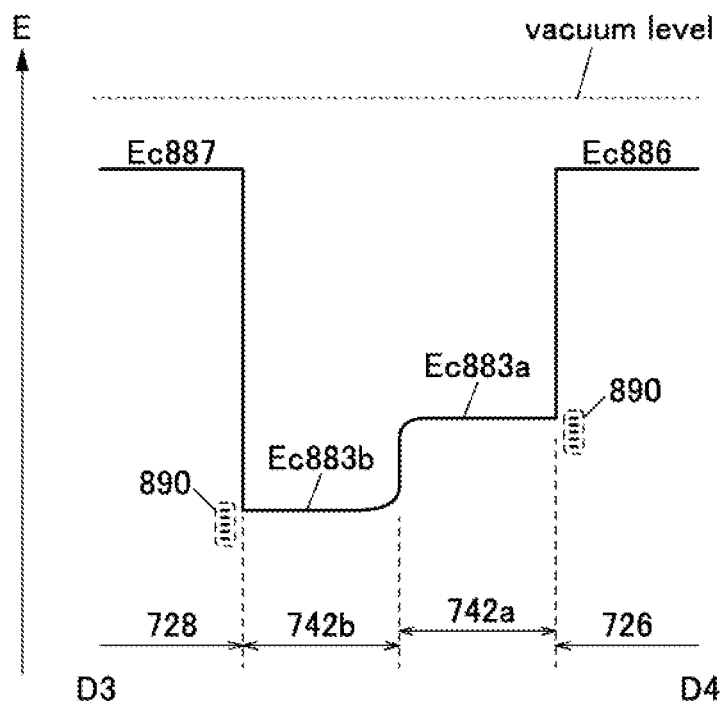

Here, the function and effect of the semiconductor layer 742 that is a stacked layer including the semiconductor layer 742a, the semiconductor layer 742b, and the semiconductor layer 742c are described with an energy band structure diagram shown in FIG. 32(A) and FIG. 32(B). FIG. 32(A) is the energy band structure diagram showing a portion along the dashed-dotted line D1-D2 in FIG. 27(B). FIG. 32(A) illustrates the energy band structure of a channel formation region of the transistor 850.

In FIG. 32(A), Ec882, Ec883a, Ec883b, Ec883c, and Ec886 indicate the energy of the conduction band minimum of the insulating layer 772, the semiconductor layer 742a, the semiconductor layer 742b, the semiconductor layer 742c, and the insulating layer 726, respectively.

Here, a difference in energy between the vacuum level and the conduction band minimum (also referred to as "electron affinity") corresponds to a value obtained by subtracting an energy gap from a difference in energy between the vacuum level and the valence band maximum (also referred to as an ionization potential). Note that the energy gap can be measured with a spectroscopic ellipsometer (e.g., UT-300 by HORIBA JOBIN YVON S.A.S.). Furthermore, the energy difference between the vacuum level and the valence band maximum can be measured with an ultraviolet photoelectron spectroscopy (UPS: Ultraviolet Photoelectron Spectroscopy) device (e.g., VersaProbe by ULVAC-PHI, Inc.).

Note that an In—Ga—Zn oxide which is formed using a target having an atomic ratio of In:Ga:Zn=1:3:2 has an energy gap of approximately 3.5 eV and an electron affinity of approximately 4.5 eV. An In—Ga—Zn oxide which is formed using a target having an atomic ratio of In:Ga:Zn=1:3:4 has an energy gap of approximately 3.4 eV and an electron affinity of approximately 4.5 eV. An In—Ga—Zn oxide which is formed using a target having an atomic ratio of In:Ga:Zn=1:3:6 has an energy gap of approximately 3.3 eV and an electron affinity of approximately 4.5 eV. An In—Ga—Zn oxide which is formed using a target having an atomic ratio of In:Ga:Zn=1:6:2 has an energy gap of approximately 3.9 eV and an electron affinity of approximately 4.3 eV. An In—Ga—Zn oxide which is formed using a target having an atomic ratio of In:Ga:Zn=1:6:8 has an energy gap of approximately 3.5 eV and an electron affinity of approximately 4.4 eV. An In—Ga—Zn oxide which is formed using a target having an atomic ratio of In:Ga:Zn=1:6:10 has an energy gap of approximately 3.5 eV and an electron affinity of approximately 4.5 eV. An In—Ga—Zn oxide which is formed using a target having an atomic ratio of In:Ga:Zn=1:1:1 has an energy gap of approximately 3.2 eV and an electron affinity of approximately 4.7 eV. An In—Ga—Zn oxide which is formed using a target having an atomic ratio of In:Ga:Zn=3:1:2 has an energy gap of approximately 2.8 eV and an electron affinity of approximately 5.0 eV.

Since the insulating layer 772 and the insulating layer 726 are insulators, Ec882 and Ec886 are closer to the vacuum level (have a smaller electron affinity) than Ec883a, Ec883b, and Ec883c.

In addition, Ec883a is closer to the vacuum level than Ec883b. Specifically, Ec883a is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

In addition, Ec883c is closer to the vacuum level than Ec883b. Specifically, Ec883c is preferably closer to the vacuum level than Ec883b by 0.05 eV or more, 0.07 eV or more, 0.1 eV or more, or 0.15 eV or more and 2 eV or less, 1 eV or less, 0.5 eV or less, or 0.4 eV or less.

In the vicinity of the interface between the semiconductor layer 742a and the semiconductor layer 742b and the vicinity of the interface between the semiconductor layer 742b and the semiconductor layer 742c, mixed regions are formed; thus, the energy of the conduction band minimum continuously changes. In other words, no state or few states exist at these interfaces.

Accordingly, electrons transfer mainly through the semiconductor layer 742b in the stacked-layer structure having the above energy band structure. Therefore, even when states exist at the interface between the semiconductor layer 742a and the insulating layer 724 or at the interface between the semiconductor layer 742c and the insulating layer 726, the states hardly influence the transfer of the electrons. In addition, the states do not exist or hardly exist at the interface between the semiconductor layer 742a and the semiconductor layer 742b and at the interface between the semiconductor layer 742c and the semiconductor layer 742b; thus, transfer of electrons is not prohibited in the regions. Consequently, high field-effect mobility can be obtained in the transistor having the stacked-layer structure of the above oxide semiconductors.

Note that although trap states 890 due to impurities or defects might be formed in the vicinity of the interface between the semiconductor layer 742a and the insulating layer 772 and in the vicinity of the interface between the semiconductor layer 742c and the insulating layer 726 as shown in FIG. 32(A), the semiconductor layer 742b can be apart from the trap states owing to the existence of the semiconductor layer 742a and the semiconductor layer 742c.

In particular, in the transistor described in this embodiment, an upper surface and a side surface of the semiconductor layer 742b are in contact with the semiconductor layer 742c, and a lower surface of the semiconductor layer 742b is in contact with the semiconductor layer 742a. In this manner, the semiconductor layer 742b is covered with the semiconductor layer 742a and the semiconductor layer 742c, whereby the influence of the trap states can be further reduced.

Note that in the case where the energy difference between Ec883a or Ec883c and Ec883b is small, electrons in the semiconductor layer 742b might reach the trap states by passing over the energy difference. The electrons are captured by the trap states, which generates negative fixed electric charge at the interface with the insulating layer, causing the threshold voltage of the transistor to be shifted in the positive direction.

Therefore, each of the energy differences between Ec883b, and Ec883a and Ec883c is set to be greater than or equal to 0.1 eV, preferably greater than or equal to 0.15 eV, in which case a variation in the threshold voltage of the transistor can be reduced and the transistor can have favorable electrical characteristics.

Furthermore, each of the band gaps of the semiconductor layer 742a and the semiconductor layer 742c is preferably wider than that of the semiconductor layer 742b.

FIG. 32(B) is the energy band structure diagram showing a portion along the dashed-dotted line D3-D4 in FIG. 28(B). FIG. 32(B) shows the energy band structure of a channel formation region of the transistor 822.

In FIG. 32(B), Ec887 represents the energy of the conduction band minimum of the insulating layer 728. The semiconductor layer 742 is formed using two layers, the semiconductor layer 742a and the semiconductor layer 742b; thus, the transistor can be manufactured with improved productivity. Note that since the semiconductor layer 742c is not provided, the transistor is easily affected by the trap states 890 but can have higher field-effect mobility than a transistor including one semiconductor layer as the semiconductor layer 742.

In accordance with one embodiment of the present invention, a transistor with a small variation in electrical characteristics can be provided. Accordingly, a semiconductor device with a small variation in electrical characteristics can be provided. In accordance with one embodiment of the present invention, a transistor with high reliability can be provided. Accordingly, a semiconductor device with high reliability can be provided.

An oxide semiconductor has an energy gap as wide as 3.0 eV or more and a high visible-light transmissivity. In a transistor obtained by processing an oxide semiconductor under appropriate conditions, the off-state current at ambient temperature (e.g., 25° C.) can be lower than or equal to 100 zA ($1 \times 10^{-19}$ A), lower than or equal to 10 zA ($1 \times 10^{-20}$ A), and further lower than or equal to 1 zA ($1 \times 10^{-21}$ A). Therefore, a semiconductor device with low power consumption can be achieved.

In accordance with one embodiment of the present invention, a transistor with low power consumption can be provided. Accordingly, a display element or a semiconductor device such as a display device with low power consumption can be provided. Alternatively, a display element or a semiconductor device such as a display device with high reliability can be provided.

The transistor 850 illustrated in FIG. 27 is described again. When the semiconductor layer 742b is provided over a projection of the insulating layer 772, the side surfaces of the semiconductor layer 742b can also be covered with the electrode 743. Thus, the transistor 850 has a structure in which the semiconductor layer 742b can be electrically surrounded by an electric field of the electrode 743. Such a structure of a transistor in which a semiconductor layer in which a channel is formed is electrically surrounded by an electric field of a conductive film is called a surrounded channel (s-channel) structure. A transistor with an s-channel structure is referred to as an "s-channel-type transistor" or an "s-channel transistor".

In an s-channel structure, a channel can be formed in the whole (bulk) of the semiconductor layer 742b. In an s-channel structure, the drain current of the transistor can be increased, so that a larger amount of on-state current can be obtained. Furthermore, the entire channel formation region of the semiconductor layer 742b can be depleted by an electric field of the electrode 743. Accordingly, the off-state current of the transistor with an s-channel structure can be further reduced.

Note that when the projection of the insulating layer 772 is increased in height and the channel width is shortened, the effects of an s-channel structure to increase the on-state current and reduce the off-state current can be enhanced. An exposed part of the semiconductor layer 742a may be removed at the time of forming the semiconductor layer 742b. In that case, the side surfaces of the semiconductor layer 742a and the semiconductor layer 742b may be aligned with each other.

As in a transistor 851 illustrated in FIG. 29, the electrode 723 may be provided below the semiconductor layer 742 with an insulating layer provided therebetween. FIG. 29(A) is a top view of the transistor 851. FIG. 29(B) is a cross-sectional view taken along the dashed-dotted line X1-X2 in FIG. 29(A). FIG. 29(C) is a cross-sectional view taken along the dashed-dotted line Y1-Y2 in FIG. 29(A).

Figure 30A:
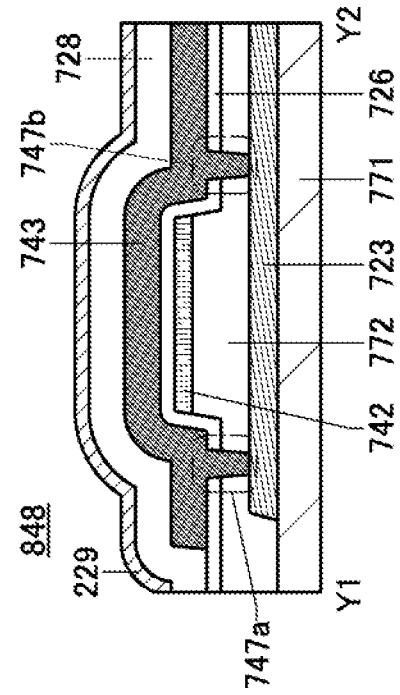
FIG. 30 A top view and cross-sectional views for illustrating one embodiment of the present invention.

As in a transistor 852 illustrated in FIG. 30, an insulating layer 775 may be provided over the electrode 743, and a layer 725 may be provided over the insulating layer 775. FIG. 30(A) is a top view of the transistor 852. FIG. 30(B) is a cross-sectional view taken along the dashed-dotted line X1-X2 in FIG. 30(A). FIG. 30(C) is a cross-sectional view taken along the dashed-dotted line Y1-Y2 in FIG. 30(A).

Although the layer 725 is provided over the insulating layer 775 in FIG. 30, the layer 725 may be provided over the insulating layer 728 or over the insulating layer 729. The layer 725 formed using a material with a light-blocking property can prevent a variation in characteristics, a decrease in reliability, or the like of the transistor caused by light irradiation. Note that when the layer 725 is formed at least larger than the semiconductor layer 742b such that the semiconductor layer 742b is covered with the layer 725, the above effects can be improved. The layer 725 can be formed using an organic material, an inorganic material, or a metal material. In the case where the layer 725 is formed using a conductive material, voltage can be supplied to the layer 725 or the layer 725 may be brought into an electrically floating state.

Figure 31C:
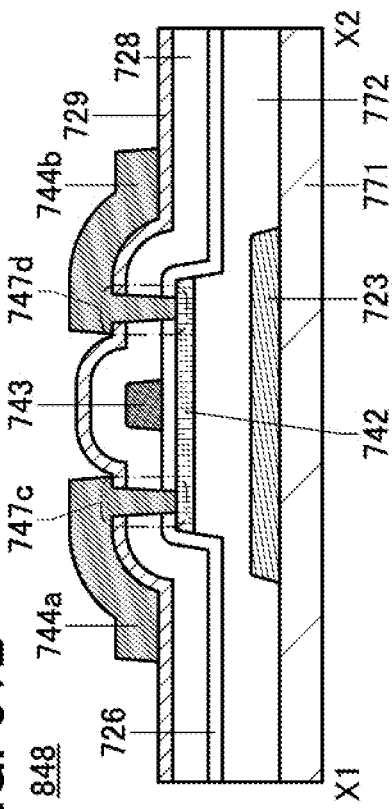
FIG. 31 A top view and cross-sectional views for illustrating one embodiment of the present invention.
Figure 31B:
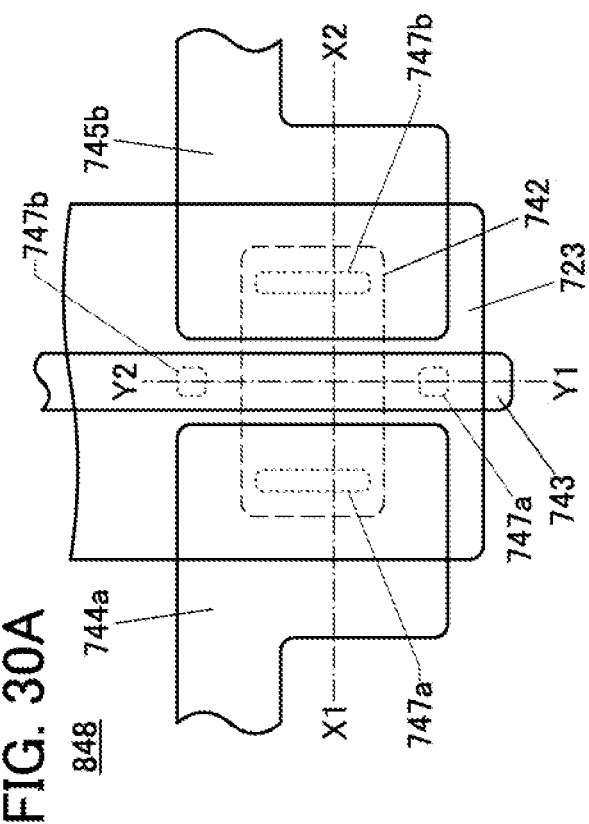

FIG. 31 illustrates an example of a transistor with an s-channel structure. A transistor 848 illustrated in FIG. 31 has almost the same structure as the transistor 847. In the transistor 848, the semiconductor layer 742 is formed over a projection of the insulating layer 772. The transistor 848 is a type of top-gate transistor including a back gate electrode. FIG. 31(A) is a top view of the transistor 848. FIG. 31(B) is a cross-sectional view taken along the dashed-dotted line X1-X2 in FIG. 31(A). FIG. 31(C) is a cross-sectional view taken along the dashed-dotted line Y1-Y2 in FIG. 31(A).

The electrode 744a provided over the insulating layer 729 is electrically connected to the semiconductor layer 742 through an opening 747c formed in the insulating layer 726, the insulating layer 728, and the insulating layer 729. The electrode 744b provided over the insulating layer 729 is electrically connected to the semiconductor layer 742 through an opening 747d formed in the insulating layer 726, the insulating layer 728, and the insulating layer 729.

The electrode 743 provided over the insulating layer 726 is electrically connected to the electrode 723 through the opening 747a and the opening 747b formed in the insulating layer 726 and the insulating layer 772. Accordingly, the same potential is supplied to the electrode 746 and the electrode 723. Furthermore, either of the opening 747a and the opening 747b may be omitted. Furthermore, both of the opening 747a and the opening 747b may be omitted. In the case where both the opening 747a and the opening 747b are omitted, different potentials can be supplied to the electrode 723 and the electrode 746.

Note that the semiconductor layer in the transistor with an s-channel structure is not limited to an oxide semiconductor.

This embodiment can be implemented in an appropriate combination with any of the structures described in the other embodiments.

(Embodiment 3)

In this embodiment, a touch panel module and electronic devices of embodiments of the present invention are described with reference to FIGS. 33 to 35.

Figure 33:
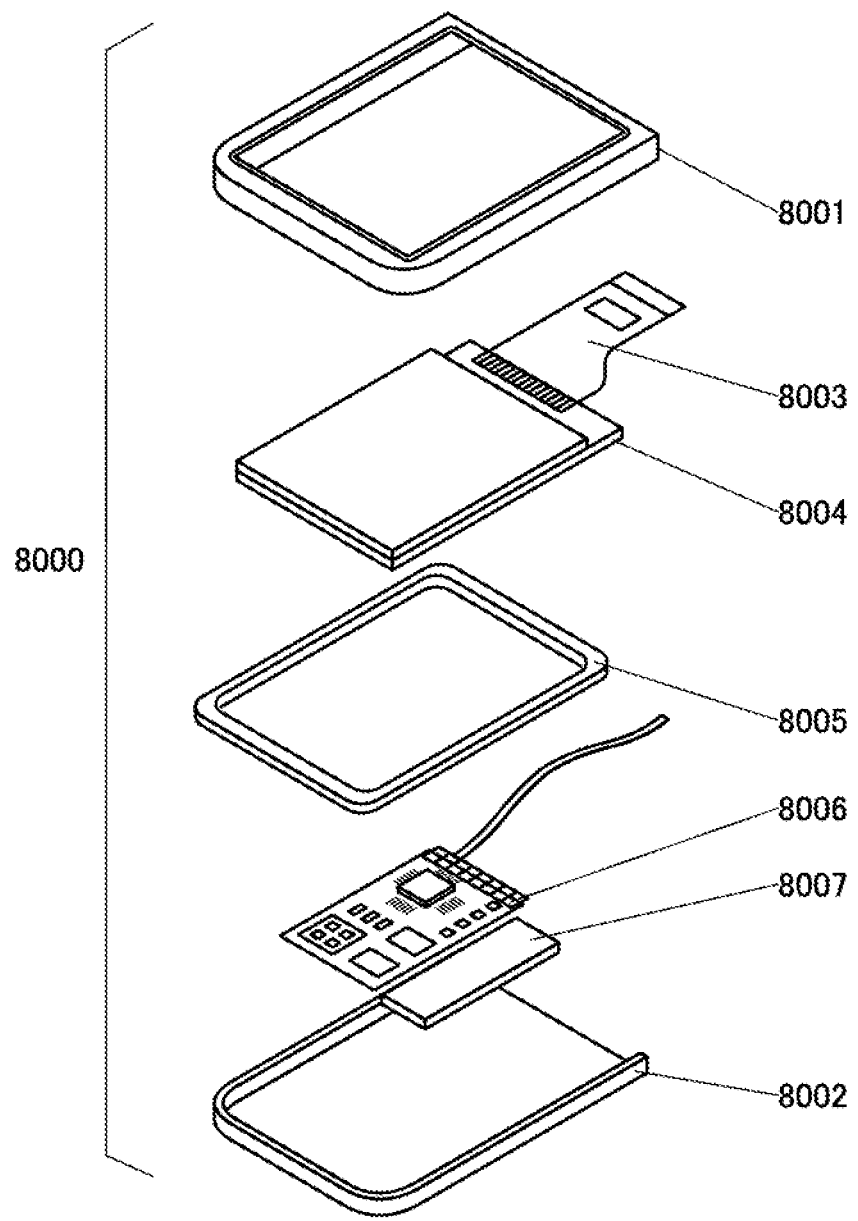
FIG. 33 A diagram for illustrating one embodiment of the present invention.

In a touch panel module 8000 illustrated in FIG. 33, a touch panel 8004 connected to an FPC 8003, a frame 8005, a printed board 8006, and a battery 8007 are provided between an upper cover 8001 and a lower cover 8002.

The touch panel of one embodiment of the present invention can be used as the touch panel 8004, for example.

The shapes and sizes of the upper cover 8001 and the lower cover 8002 can be changed as appropriate in accordance with the size of the touch panel 8004.

The frame 8005 protects the touch panel 8004 and also functions as an electromagnetic shield for blocking electromagnetic waves generated by the operation of the printed board 8006. The frame 8005 may function as a radiator plate.

The printed board 8006 is provided with a power supply circuit and a signal processing circuit for outputting a video signal and a clock signal. As a power source for supplying power to the power supply circuit, an external commercial power source or a power source using the battery 8007 provided separately may be used. The battery 8007 can be omitted in the case of using a commercial power source.

The touch panel 8004 may be additionally provided with a member such as a polarizing plate, a retardation plate, or a prism sheet.

FIGS. 34(A) to (H) and 35 illustrate electronic devices. These electronic devices can include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, odor, or infrared ray), a microphone 5008, and the like.

Figure 34A:
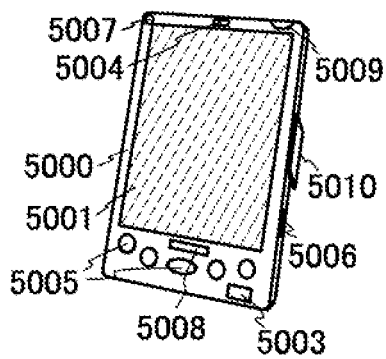
FIG. 34 Diagrams for illustrating embodiments of the present invention.
Figure 34B:
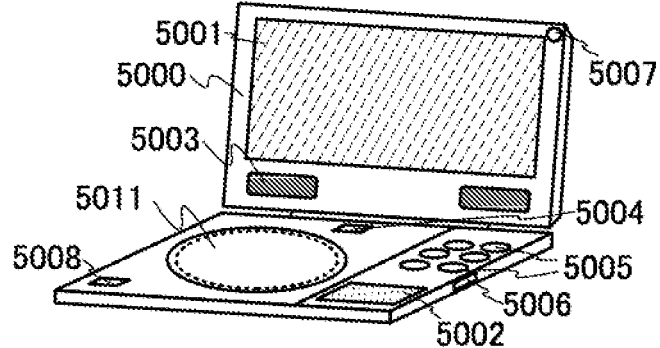
Figure 34C:
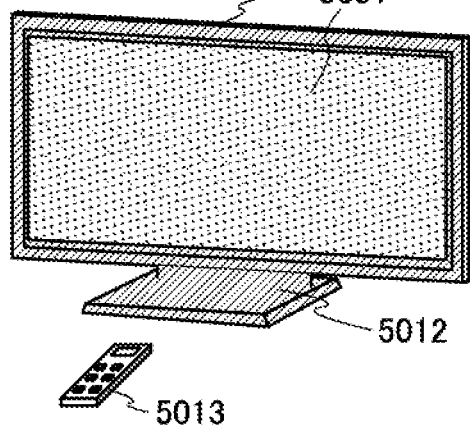
Figure 34D:
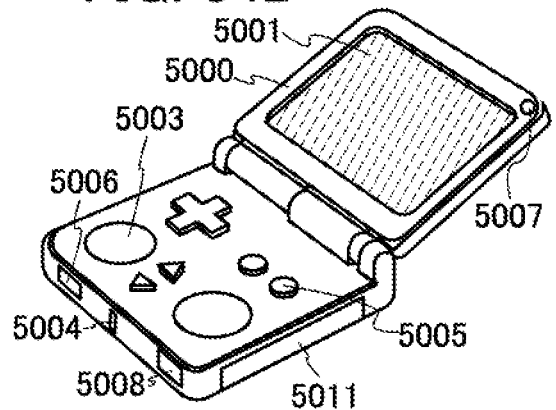
Figure 34E:
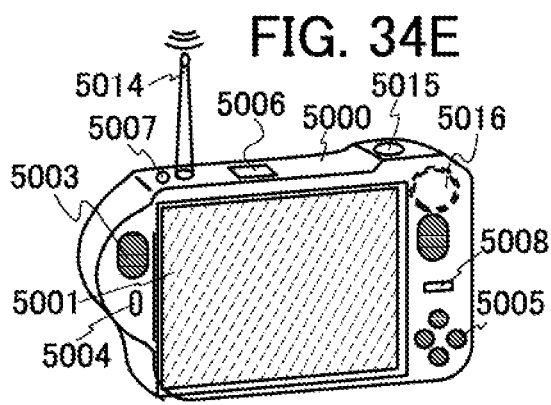
Figure 34F:
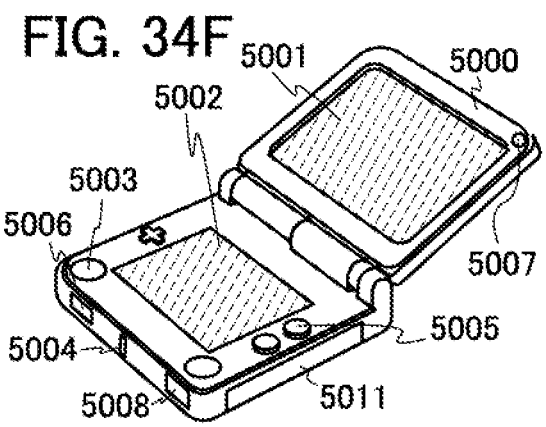
Figure 34G:
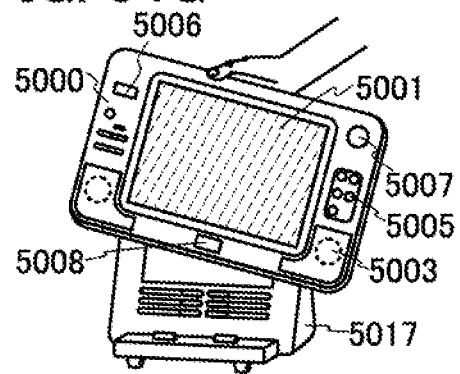
Figure 34H:
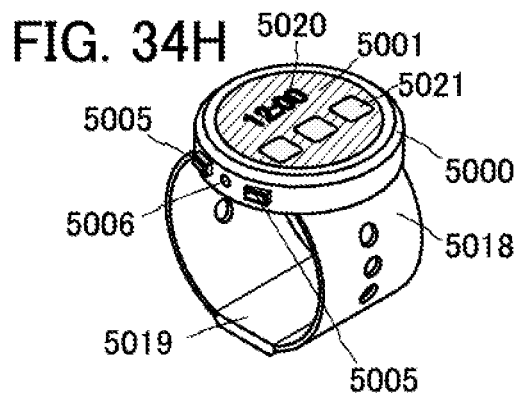
Figure 35A:
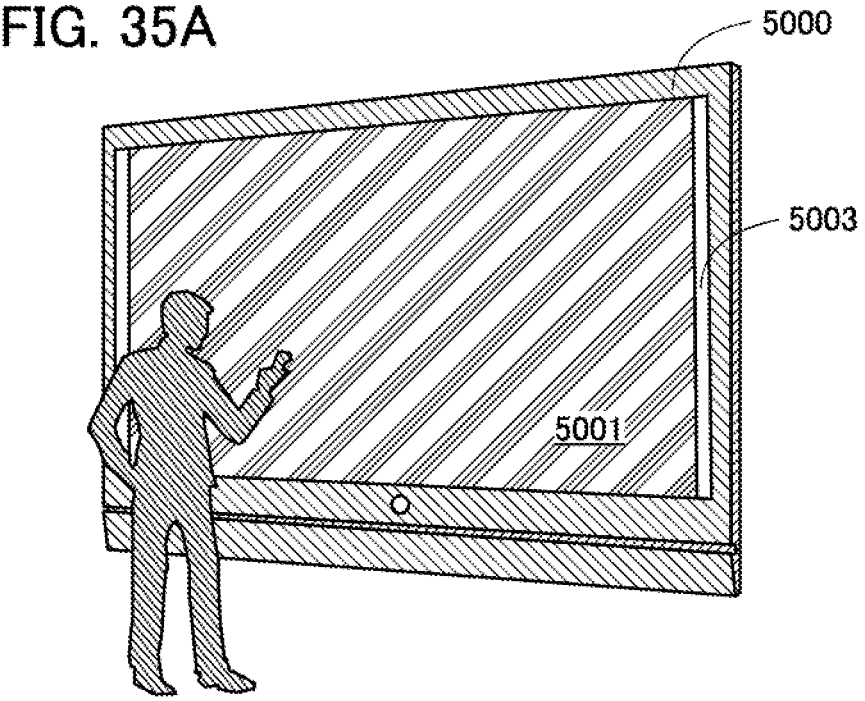
FIG. 35 Diagrams for illustrating embodiments of the present invention.
Figure 35B:
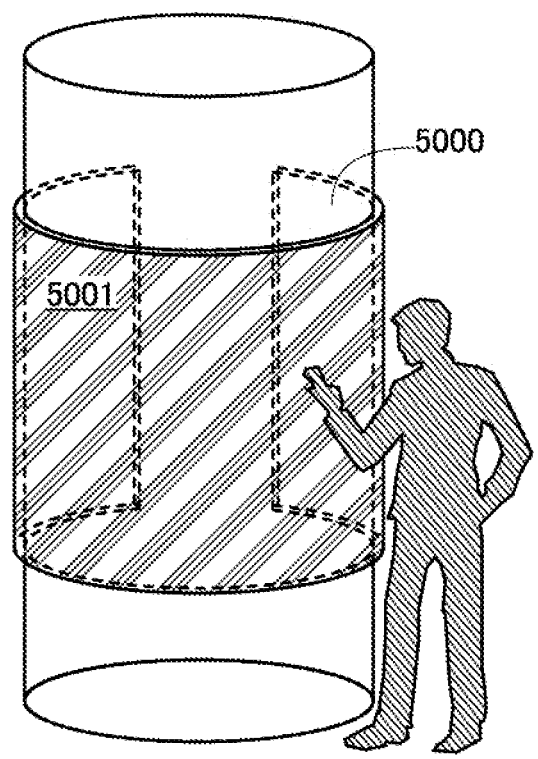

FIG. 34(A) illustrates a mobile computer, which can include a switch 5009, an infrared port 5010, and the like in addition to the above components. FIG. 34(B) illustrates a portable image reproducing device provided with a recording medium (e.g., a DVD reproducing device), which can include a second display portion 5002, a recording medium reading portion 5011, and the like in addition to the above components. FIG. 34(C) illustrates a television device, which can include a stand 5012 and the like in addition to the above components. The television device can be operated by an operation switch of the housing 5000 or a separate remote controller 5013. With operation keys of the remote controller 5013, channels and volume can be controlled, and images displayed on the display portion 5001 can be controlled. The remote controller 5013 may be provided with a display portion for displaying data output from the remote controller 5013. FIG. 34(D) illustrates a portable game machine, which can include the recording medium reading portion 5011 and the like in addition to the above components. FIG. 34(E) illustrates a digital camera that has a television reception function and can include an antenna 5014, a shutter button 5015, an image receiving portion 5016, and the like in addition to the above components. FIG. 34(F) illustrates a portable game machine, which can include the second display portion 5002, the recording medium reading portion 5011, and the like in addition to the above components. FIG. 34(G) illustrates a portable television receiver, which can include a charger 5017 capable of transmitting and receiving signals, and the like in addition to the above components. FIG. 34(H) illustrates a wrist-watch-type information terminal, which can include a band 5018, a clasp 5019, and the like in addition to the above components. The display portion 5001 mounted in the housing 5000 also serving as a bezel includes a non-rectangular display region. The display portion 5001 can display an icon 5020 indicating time, another icon 5021, and the like. FIG. 35(A) illustrates a digital signage (Digital Signage). FIG. 35(B) illustrates a digital signage mounted on a cylindrical pillar.

The electronic devices illustrated in FIGS. 34(A) to (H) and 35 can have a variety of functions, for example, a function of displaying a variety of data (a still image, a moving image, a text image, and the like) on the display portion, a touch panel function, a function of displaying a calendar, date, time, and the like, a function of controlling a process with a variety of software (programs), a wireless communication function, a function of being connected to a variety of computer networks with a wireless communication function, a function of transmitting and receiving a variety of data with a wireless communication function, a function of reading a program or data stored in a memory medium and displaying the program or data on the display portion, and the like. Furthermore, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an image receiving portion can have a function of shooting a still image, a function of taking a moving image, a function of automatically or manually correcting a shot image, a function of storing a shot image in a memory medium (an external memory medium or a memory medium incorporated in the camera), a function of displaying a shot image on the display portion, or the like. Note that functions that can be provided for the electronic devices illustrated in FIGS. 34(A) to (H) and 35 are not limited to those described above, and the electronic devices can have a variety of functions.

The electronic devices in this embodiment each include a display portion for displaying some sort of data. The touch panel of one embodiment of the present invention can be used in the display portion.

At least part of this embodiment can be implemented in combination with any of the other embodiments described in this specification as appropriate.

EXPLANATION OF REFERENCE

AMP_1OUT1 output signal
AMP_1OUT4 output signal
10 pixel
11 transistor
12 transistor
13 EL element
15 pixel electrode
16 light-emitting layer
17 common electrode
17_1 electrode
17_2 electrode
17_3 electrode
17_4 electrode
18 partition layer
20 electrode
21 scan line
22 signal line
23 current supply line
23_1 current supply line
23_2 current supply line
23_3 current supply line
23_4 current supply line
24 common electrode line
30 electrode
30_1 electrode
30_2 electrode
30_3 electrode
30_4 electrode
41 substrate
42 substrate
43 substrate
201 transistor
202 light-emitting element
212 insulating layer
213 insulating layer
231 coloring layer
310 touch panel
320 touch panel
321 conductive layer
322 EL layer
323 conductive layer
324 optical adjustment layer
351 conductive layer
352 conductive layer
371 substrate
372 substrate
373 FPC
374 IC
381 display portion
382 driver circuit
383 wiring
384 driver circuit
385 conductive layer
386 conductive layer
387 conductive layer
388 connection portion
389 connection portion
400 touch panel
400A touch panel module
400B touch panel module
401 display portion
402 touch sensor portion
411 display driver circuit
412 touch sensor driver circuit
413 timing controller
414 scan line driver circuit
415 signal line driver circuit
416A analog circuit
416B analog circuit
417 digital signal processing circuit
420 host controller
440 IC
451 substrate
452 counter substrate
453 FPC
454 IC
454A IC
454B IC
455 IC
455B IC
456 display portion
457 touch sensor portion
458 scan line driver circuit
459 PCB
460 IC
500 integrator circuit
500_1 integrator circuit
500_2 integrator circuit
500_3 integrator circuit
500_4 integrator circuit
501 operational amplifier
502 capacitor
503 switch
510 level shifter circuit
723 electrode
724 insulating layer
725 layer
726 insulating layer
727 insulating layer
728 insulating layer
729 insulating layer
741 insulating layer
742 semiconductor layer 742a semiconductor layer
742b semiconductor layer
742c semiconductor layer
743 electrode
744a electrode
744b electrode
746 electrode
747a opening
747b opening
747c opening
747d opening
755 impurity
771 substrate
772 insulating layer
775 insulating layer
810 transistor
811 transistor
820 transistor
821 transistor
822 transistor
825 transistor
830 transistor
831 transistor
840 transistor
841 transistor
842 transistor
843 transistor
844 transistor
845 transistor
846 transistor
847 transistor
848 transistor
850 transistor
851 transistor
852 transistor
882 Ec
883a Ec
883b Ec
883c Ec
886 Ec
887 Ec
890 trap states
4522 counter substrate
5000 housing
5001 display portion
5002 display portion
5003 speaker
5004 LED lamp
5005 operation key
5006 connection terminal
5007 sensor
5008 microphone
5009 switch
5010 infrared port
5011 recording medium reading portion
5012 stand
5013 remote controller
5014 antenna
5015 shutter button
5016 image receiving portion
5017 charger
5018 band
5019 clasp
5020 icon
5021 icon
6534 PCB
8000 touch panel module
8001 upper cover
8002 lower cover
8003 FPC
8004 touch panel
8005 frame
8006 printed board
8007 battery

The invention claimed is:

1. A touch panel comprising:
a pixel comprising a transistor, and a light-emitting element;
a touch sensor comprising a first electrode configured to supply a pulse signal, and a second electrode configured to sense a signal in accordance with the pulse signal; and
an integrator circuit comprising an operational amplifier, wherein:
the light-emitting element comprises a pixel electrode, a common electrode, and a light-emitting layer therebetween,
the operational amplifier comprises a first input terminal electrically connected to the second electrode, and a second input terminal electrically connected to the common electrode,
the second input terminal is configured to receive a first signal including a noise waveform generated in the common electrode,
the first input terminal is configured to receive a second signal including the noise waveform, and a signal waveform based on the pulse signal, and
the operational amplifier is configured to cancel the noise waveform by a difference between the first and second signals.

2. A touch panel comprising:
a pixel comprising a transistor, and a light-emitting element electrically connected to a current supply line through the transistor;
a touch sensor comprising a first electrode configured to supply a pulse signal, and a second electrode configured to sense a signal in accordance with the pulse signal; and
an integrator circuit comprising an operational amplifier, wherein:
the light-emitting element comprises a pixel electrode, a common electrode, and a light-emitting layer therebetween,
the operational amplifier comprises a first input terminal electrically connected to the second electrode, and a second input terminal electrically connected to the current supply line,
the second input terminal is configured to receive a first signal including a noise waveform generated in the current supply line,
the first input terminal is configured to receive a second signal including the noise waveform, and a signal waveform based on the pulse signal, and
the operational amplifier is configured to cancel the noise waveform by a difference between the first and second signals.

3. The touch panel according to claim 1, wherein the first and second electrodes are on a substrate side provided with the transistor.

4. The touch panel according to claim 2, wherein the first and second electrodes are on a substrate side provided with the transistor.

5. The touch panel according to claim 1, wherein one of the first and second electrodes is on a same layer as a conductive layer included in the transistor.

6. The touch panel according to claim 2, wherein one of the first and second electrodes is on a same layer as a conductive layer included in the transistor.

7. The touch panel according to claim 5, wherein the other of the first and second electrodes is on a counter substrate side.

8. The touch panel according to claim 6, wherein the other of the first and second electrodes is on a counter substrate side.

9. The touch panel according to claim 5, wherein the one of the first and second electrodes is on a layer below the pixel electrode.

10. The touch panel according to claim 6, wherein the one of the first and second electrodes is on a layer below the pixel electrode.

11. The touch panel according to claim 1, wherein the touch sensor is a mutual capacitive touch sensor.

12. The touch panel according to claim 2, wherein the touch sensor is a mutual capacitive touch sensor.

\* \* \* \* \*